United States Patent
Mu et al.

(10) Patent No.: US 9,489,275 B2
(45) Date of Patent: Nov. 8, 2016

(54) TECHNIQUES FOR ERROR HANDLING IN PARALLEL SPLITTING OF STORAGE COMMANDS

(71) Applicant: NETAPP, INC., Sunnyvale, CA (US)

(72) Inventors: Paul Yuedong Mu, Sunnyvale, CA (US); Paul Ngan, Sunnyvale, CA (US); Manoj Sundararajan, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 119 days.

(21) Appl. No.: 14/504,618

(22) Filed: Oct. 2, 2014

(65) Prior Publication Data

US 2016/0098330 A1 Apr. 7, 2016

(51) Int. Cl.
*G06F 11/00* (2006.01)
*G06F 11/20* (2006.01)
*G06F 3/06* (2006.01)
*H04L 1/08* (2006.01)
*G06F 11/07* (2006.01)

(52) U.S. Cl.
CPC ........... *G06F 11/2069* (2013.01); *G06F 3/065* (2013.01); *G06F 3/0619* (2013.01); *G06F 3/0689* (2013.01); *H04L 1/08* (2013.01); *G06F 11/07* (2013.01); *G06F 2201/85* (2013.01)

(58) Field of Classification Search
CPC .................................................. G06F 11/2069
USPC ................. 714/6.1, 6.11, 6.2, 6.12, 6.13, 6.3
See application file for complete search history.

(56) References Cited

U.S. PATENT DOCUMENTS

| | | | | |
|---|---|---|---|---|
| 6,880,052 B2 * | 4/2005 | Lubbers | ............. | G06F 11/2058 711/114 |
| 6,934,826 B2 * | 8/2005 | Lubbers | .................... | G06F 9/50 711/170 |
| 2006/0015296 A1 | 1/2006 | Aoki et al. | | |
| 2006/0031594 A1 * | 2/2006 | Kodama | ............. | G06F 11/2058 710/5 |
| 2008/0077686 A1 * | 3/2008 | Subhraveti | ......... | G06F 11/2097 709/224 |
| 2009/0049251 A1 * | 2/2009 | Bartfai | ............... | G06F 11/2056 711/154 |
| 2011/0246816 A1 | 10/2011 | Hsieh et al. | | |
| 2011/0276649 A1 * | 11/2011 | Pujol | ..................... | G06Q 10/10 709/208 |

OTHER PUBLICATIONS

Int. Search Report/Written Opinion cited in PCT Application No. PCT/US2015/053640 dated Mar. 29, 2016, 11 pgs.

* cited by examiner

*Primary Examiner* — Dieu-Minh Le
(74) *Attorney, Agent, or Firm* — Cooper Legal Group, LLC

(57) ABSTRACT

Various embodiments are generally directed to techniques for handling errors affecting the at least partially parallel performance of data access commands between nodes of a storage cluster system. An apparatus may include a processor component of a first node, an access component to perform a command received from a client device via a network to alter client device data stored in a first storage device coupled to the first node, a replication component to transmit a replica of the command to a second node via the network to enable performance of the replica by the second node at least partially in parallel, an error component to retry transmission of the replica based on a failure indicated by the second node and a status component to select a status indication to transmit to the client device based on the indication of failure and results of retrial of transmission of the replica.

29 Claims, 21 Drawing Sheets

TECHNIQUES FOR ERROR HANDLING IN PARALLEL SPLITTING OF STORAGE COMMANDS

BACKGROUND

Remotely accessed storage cluster systems may include multiple interconnected nodes that may be geographically dispersed to perform the storage of client device data in a fault-tolerant manner and to enable the speedy retrieval of that data. Each of such nodes may include multiple interconnected modules, each of which may be specialized to perform a portion of the tasks of storing and retrieving client device data. Distant communications may need to occur on short notice among multiple ones of such nodes to coordinate handling of an error that may arise in the performance of such tasks. Thus, the architectures of such storage cluster systems may be quite complex.

In contrast, client devices may not be configured to monitor and/or control aspects of such complex architectures or the complexities of the manner in which they achieve fault tolerance. Client devices may communicate with storage cluster systems using protocols that are not well suited to convey the details of such complexities, and client devices may employ operating systems that provide little flexibility in dealing with delays arising from such complexities.

DETAILED DESCRIPTION

Figure 1:
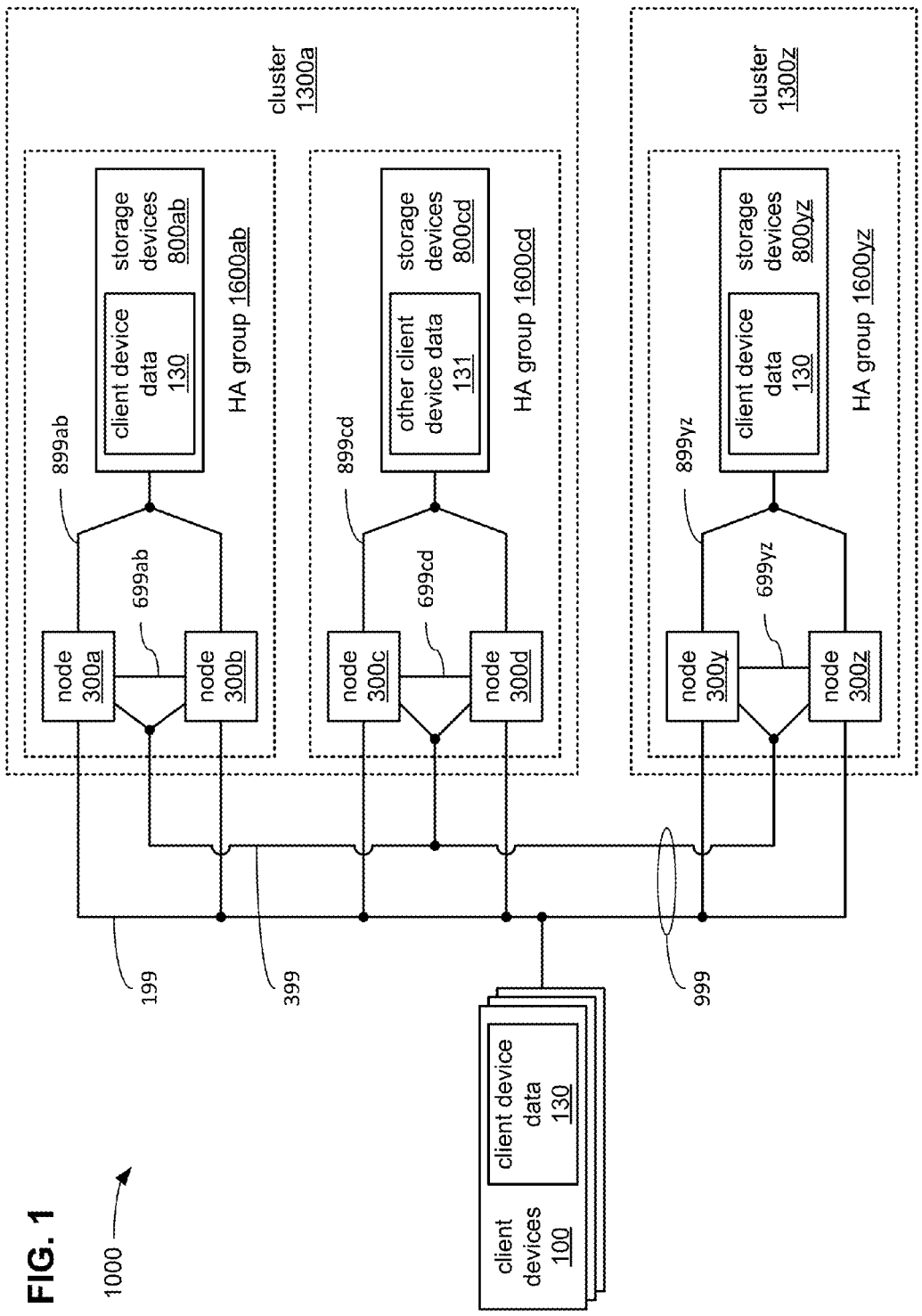
FIG. 1 illustrates an example embodiment of a storage cluster system.

Various embodiments are generally directed to techniques for handling and presenting indications of errors affecting the at least partially parallel performance of data access commands between nodes of a storage cluster system. More specifically, a data access command from a client device may be received at an active node where the data access command may be replicated and where the resulting replica data access command may transmitted to another active node to enable at least partially parallel performance of the data access command between the two active nodes. However, if an error affecting such partial parallel performance is detected, then a determination may be made as to whether to retry the performance by one of the two active nodes or retry that performance with an inactive node that is thereby caused to become a replacement active node. Also another determination may be made as to whether to transmit to the client device an indication that the data access command cannot be performed or that retrying of the data access command is underway.

In a storage cluster system, multiple nodes may be grouped into two or more clusters that may each be made up of one or more high availability (HA) groups of nodes. The two or more clusters may be positioned at geographically distant locations and may be coupled via one or more interconnects extending through networks such as the Internet or dedicated leased lines. A single node of a HA group of each cluster may be an active node that communicates with the other(s) via an active communications session to exchange replicas of data access commands to enable at least partially parallel performance of those data access commands to synchronize the state of the client device data between their HA groups. Further, one of those active nodes may additionally communicate with one or more client devices to receive requests for storage services and to translate those requests into the data access commands that are replicated for such at least partially parallel performance. Within each HA group, at least one other node may be an inactive node partnered with the active node and prepared via duplication of metadata among the nodes within the HA group to take over for the active node in response to an error.

Each of the nodes may include one or more of each of a management module (M-module), a network protocol module (N-module) and a data storage module (D-module). The M-module may couple an active node to a client interconnect to provide one or more client devices a mechanism by which at least a portion of the storage cluster system may be remotely configured. The N-module may couple an active node to the client interconnect to receive requests for storage services from the one or more client devices, and may translate a storage services request into at least one data access command. The D-module may be coupled to the N-module to receive the at least one data access command therefrom. The D-module may also couple a node to one or more storage devices to store client device data and from which client device data may be retrieved. Individual ones of those storage devices and/or groups of those storage devices may be designated and treated by the D-module as logical units (LUs). The D-module of an active node may define an aggregate within the storage space provided by a single LU or a group of LUs, and may define one or more volumes within the storage space of that aggregate. The client device data may be stored within one or more volumes so defined within that aggregate.

In addition to performing a data access command received from the N-module, the D-module of one active node of a first HA group may replicate the data access command and transmit the resulting replica of that data access command to another D-module of another active node of a second HA group to enable at least partially parallel performance of the data access command by the D-modules of the two active nodes. Such transmission of a replica data access command may be performed via an inter-cluster interconnect that may extend through the same network through which the client interconnect may extend. The D-module of that other node may reply to the transmission of the replica data access command with an indication of success or failure in the performance of the replica data access command.

Further, the D-module of at least one inactive node of each of the first and second HA groups may monitor the status of at least the D-module of the active node in that HA group for an indication of failure within that active node. Within each of the first and second HA groups, such monitoring may entail an exchange of signals between the active node and the at least one inactive node on a recurring basis in which the lack of receipt of a signal within an expected period of time may be taken as an indication of failure. Alternatively or additionally, such monitoring may entail an exchange of signals providing an explicit indication of status of performance of a data access command and/or status of a component of a node (e.g., the status of a M-module or a N-module). In response to an indication of a failure of the active node of one of the first or second HA groups, an inactive node of that HA group may effect a takeover of that active node in which that inactive node takes over the communications that were performed by that active node and/or takes over participation by that active node in at least partial parallel performance of data access commands.

A failure may occur within the active node of the first HA group that precludes that node from receiving requests for storage services from a client device, from translating the request into a data access command, from performing the data access command, from replicating the data access command and/or from transmitting a replica of the data access command to the active node of the second HA group via the active communications session. If the error is a short term failure that the active node of the first HA group is able to resolve within a relatively short period of time, then the active node of the first HA group may retry receiving or translating the request, may retry performing or replicating the data access command, or may retry transmitting the replica data access command to the active node of the second HA group. However, if the error is a long term failure that the active node of the first HA group cannot resolve within a relatively short period of time and/or that requires intervention by personnel to resolve, then an inactive node of the first HA group may take over for the active node of the first HA group. In so doing, that inactive node of the first HA group may become the new active node of the first HA group, and may cooperate with the active node of the second HA group to change the state of a communications session extending therebetween from inactive to active. Further, the active node of the second HA group may then change the state of the active communications session extending between it and what was the active node of the first HA group from active to inactive.

Alternatively or additionally, an error may occur within the active node of the second HA group that precludes that node from receiving a replica data access command from the active node of the first HA group via the active communications session, or from performing the replica data access commands despite successfully receiving the replica data access command. If the error is a short term failure that the active node of the second HA group is able to resolve within a relatively short period of time, then the active node of the first HA group may retry transmitting the replica data access command to the active node of the second HA group via the active communications session. However, if the error is a long term failure that the active node of the second HA group cannot resolve within a relatively short period of time and/or that requires intervention by personnel to resolve, then the active node of the first HA group may retry transmitting the replica data access command to an inactive node of the second HA group that may take over for the active node of the second HA group. In so doing, the active node of the first HA group may cooperate with that inactive node of the second HA group to change the state of a communications session extending therebetween from inactive to active. Further, the active node of the first HA group may change the state of the active communications session extending between it and what was the active node of the second HA group from active to inactive.

Regardless of whether a short term failure, a long term failure or no error occurs in the at least partially parallel performance of a data access command, the active node of the first HA group may transmit an indication of the status of performance of the storage service request from which the data access command was translated back to the client device from which the storage service request was received. The active node of the first HA group may recurringly transmit such status indications to that client device at an interval that falls within a specified maximum period of time in which some response to the storage service request must be provided to the client device. Depending on whether the performances of both of the active nodes is successful or the performance by one of the active nodes is precluded by a short term or long term failure, then the active node of the first HA group may provide a status indication of successful performance, of retrying of performance as currently underway, or of failure in performance. If performance by one of the active nodes is retried following a short term failure, then a status indication of retrying performance may be followed by a subsequent status indication of success. However, if performance by one of the active nodes is retried multiple times following a short term failure to the extent of reaching a specified limit of number of retrials or amount of time in which to engage in retrials, then the short term failure may be deemed a long term failure and a status indication of retrying performance may be followed by a subsequent status indication of failure.

In support of enabling exchanges of replica data access commands and responses thereto between an active node of the first HA group and an active node of the second HA group, the two active nodes may cooperate to form and maintain an active communications session therebetween through the inter-cluster interconnect. In such an active communications session, information concerning the current state of each of the two active nodes may be recurringly exchanged therebetween. Also, inactive nodes of the first and second HA groups may establish and maintain inactive communications sessions that extend between nodes of the first and second HA groups to support a takeover of the active node of either HA group by an inactive node of the same HA group in response to an error occurring within that active node. The two active nodes may exchange information concerning the inactive nodes of the first and second HA groups to enable the formation of those inactive communications sessions, thereby completing the mesh of communications sessions. In the event of an error resulting in the takeover of one of the active nodes by an inactive node, the active communications session between the two active nodes may become inactive while one of the inactive communications sessions may become the active communications session.

In support of forming and maintaining the mesh of communications sessions, the M-module, N-module and/or D-module of each active node may cooperate to derive, store and/or exchange metadata that includes indications of network addresses of multiple ones of the nodes of the first and second HA groups and/or other information pertinent to establishing at least a subset of the communications sessions of the mesh. Within each HA group, a M-module of an active node may receive information making up a portion of metadata and/or a N-module of the active node may perform tests to discover information making up another portion of metadata. One or both of the M-module and the N-module may then provide their portions of metadata to a D-module of the active node, and that D-module may generate the metadata from at least those portions of metadata. The D-module may then transmit a duplicate of the metadata to D-module(s) of one or more inactive nodes of the same HA group and may store a copy of the metadata within a volume and/or aggregate within one or more storage devices to which the D-modules of the active node and the one or more inactive nodes of the same HA group may share access. As a result, when one of such D-modules reboots following a reset or being powered up, that D-module may be able to retrieve information pertinent to its node establishing communications sessions with nodes of another HA group by retrieving the metadata from the one or more storage devices, and may then employ that information to form one or more of the communications sessions of the mesh more quickly. In embodiments in which different ones of the nodes in each of multiple HA groups may occasionally be rebooted for any of a variety of reasons, faster reestablishment of communications sessions following such a reboot may serve to minimize periods of time in which portions of such a mesh of communications sessions are not in place. Where errors are encountered that result in a change in which nodes and/or communications session(s) are active or inactive, the metadata stored within the one or more storage devices may be updated to enable faster reestablishment of communications sessions with the new configuration of active and inactive communications sessions following a reboot.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an example embodiment of a storage cluster system 1000 incorporating one or more client devices 100 and one or more clusters, such as the depicted clusters 1300*a* and 1300*z*. As depicted, the cluster 1300*a* may incorporate one or more of nodes 300*a-d* and sets of storage devices 800*ab* and 800*cd*, and the cluster 1300*z* may incorporate one or more of nodes 300*y-z* and a set of storage devices 800*yz*. As further depicted, the cluster 1300*a* may include a HA group 1600*ab* incorporating the nodes 300*a-b* as partners and the set of storage devices 800*ab*. The cluster 1300*a* may also include a HA group 1600*cd* incorporating the nodes 300*c-d* as partners and the set of storage devices 800*cd*. Correspondingly, the cluster 1300*z* may include a HA group 1600*yz* incorporating the nodes 300*y-z* as partners and the set of storage devices 800*yz*.

In some embodiments, the clusters 1300*a* and 1300*z* may be positioned at geographically distant locations to enable a degree of redundancy in storing and retrieving client device data 130 provided by one or more of the client devices 100 for storage. Such positioning may be deemed desirable to enable continued access to the client device data 130 by one or more of the client devices 100 despite a failure or other event that may render one or the other of the clusters 1300*a* or 1300*z* inaccessible to one or more of the client devices 100. As depicted, one or both of the clusters 1300*a* and 1300*z* may additionally store other client device data 131 that may be entirely unrelated to the client device data 130.

The formation of the HA group 1600*ab* with at least the two nodes 300*a* and 300*b* partnered to share access to the set of storage devices 800*ab* may enable a degree of fault tolerance in accessing the client device data 130 as stored within the set of storage devices 800*ab* by enabling one of the nodes 300*a-b* in an inactive state to take over for its partner in an active state (e.g., the other of the nodes 300*a-b*) in response to an error condition within that active one of the nodes 300*a-b*. Correspondingly, the formation of the HA group 1600*yz* with at least the two nodes 300*y* and 300*z* partnered to share access to the set of storage devices 800*yz* may similarly enable a degree of fault tolerance in accessing the client device data 130 as stored within the set of storage devices 800*yz* by similarly enabling one of the nodes 300*y-z* in an inactive state to similarly take over for its partner in active state (e.g., the other of the nodes 300*y-z*).

As depicted, any active one of the nodes 300*a-d* and 300*y-z* may be made accessible to the client devices 100 via a client interconnect 199. As also depicted, the nodes 300*a-d* and 300*y-z* may be additionally coupled via an inter-cluster interconnect 399. In some embodiments, the interconnects 199 and 399 may both extend through the same network 999. Each of the interconnects 199 and 399 may be implemented as virtual private networks (VPNs) defined using any of a variety of network security protocols through the network 999. The network 999 may be a single network limited to extending within a single building or other relatively limited area, may include a combination of connected networks extending a considerable distance, and/or may include the Internet. As an alternative to coexisting within the same network 999, the interconnects 199 and 399 may be implemented as entirely physically separate networks. By way of example, the client interconnect 199 may extend through the Internet to enable the client devices 100 to be positioned at geographically diverse locations, while the inter-cluster interconnect 399 may extend through a leased line between the two geographically distant locations at which each of the clusters 1300*a* and 1300*z* are positioned.

As depicted, the partnered nodes within each of the HA groups 1600*ab*, 1600*cd* and 1600*yz* may be additionally coupled via HA interconnects 699*ab*, 699*cd* and 699*yz*, respectively. As also depicted, the nodes within each of the HA groups 1600*ab*, 1600*cd* and 1600*yz* may be coupled to the sets of storage devices 800*ab*, 800*cd* and 800*yz* in a manner enabling shared access via storage interconnects 899*ab*, 899*cd* and 899*yz*, respectively. The partnered nodes and set of storage devices making up each of the HA groups 1600*ab*, 1600*cd* and 1600*yz* may be positioned within relatively close physical proximity to each other such that the interconnects 699*ab*, 899*ab*, 699*cd*, 899*cd*, 699*yz* and 899*yz* may each traverse a relatively short distance (e.g., extending within a room and/or within a cabinet).

More broadly, the network 999 and/or one or more of the interconnects 199, 399, 699*ab*, 699*cd* and 699*yz* may be based on any of a variety (or combination) of communications technologies by which signals may be exchanged, including without limitation, wired technologies employing electrically and/or optically conductive cabling, and wireless technologies employing infrared, radio frequency or other forms of wireless transmission. Each of the interconnects 899*ab*, 899*cd* and 899*yz* may be based on any of a variety of widely known and used storage interface standards, including and not limited to, SCSI, serially-attached SCSI (SAS), Fibre Channel, etc.

It should be noted that despite the depiction of specific quantities of clusters and nodes within the storage cluster system 1000, other embodiments are possible that incorporate different quantities of clusters and nodes. Similarly, despite the depiction of specific quantities of HA groups and nodes within each of the clusters 1300*a* and 1300*z*, other embodiments are possible that incorporate differing quantities of HA groups and nodes. Further, although each of the HA groups 1600*ab*, 1600*cd* and 1600*yz* is depicted as incorporating a pair of nodes 300*a-b*, 300*c-d* and 300*y-z*, respectively, other embodiments are possible in which one or more of the HA groups 1600*ab*, 1600*cd* and 1600*yz* may incorporate more than two nodes.

Figure 2A:
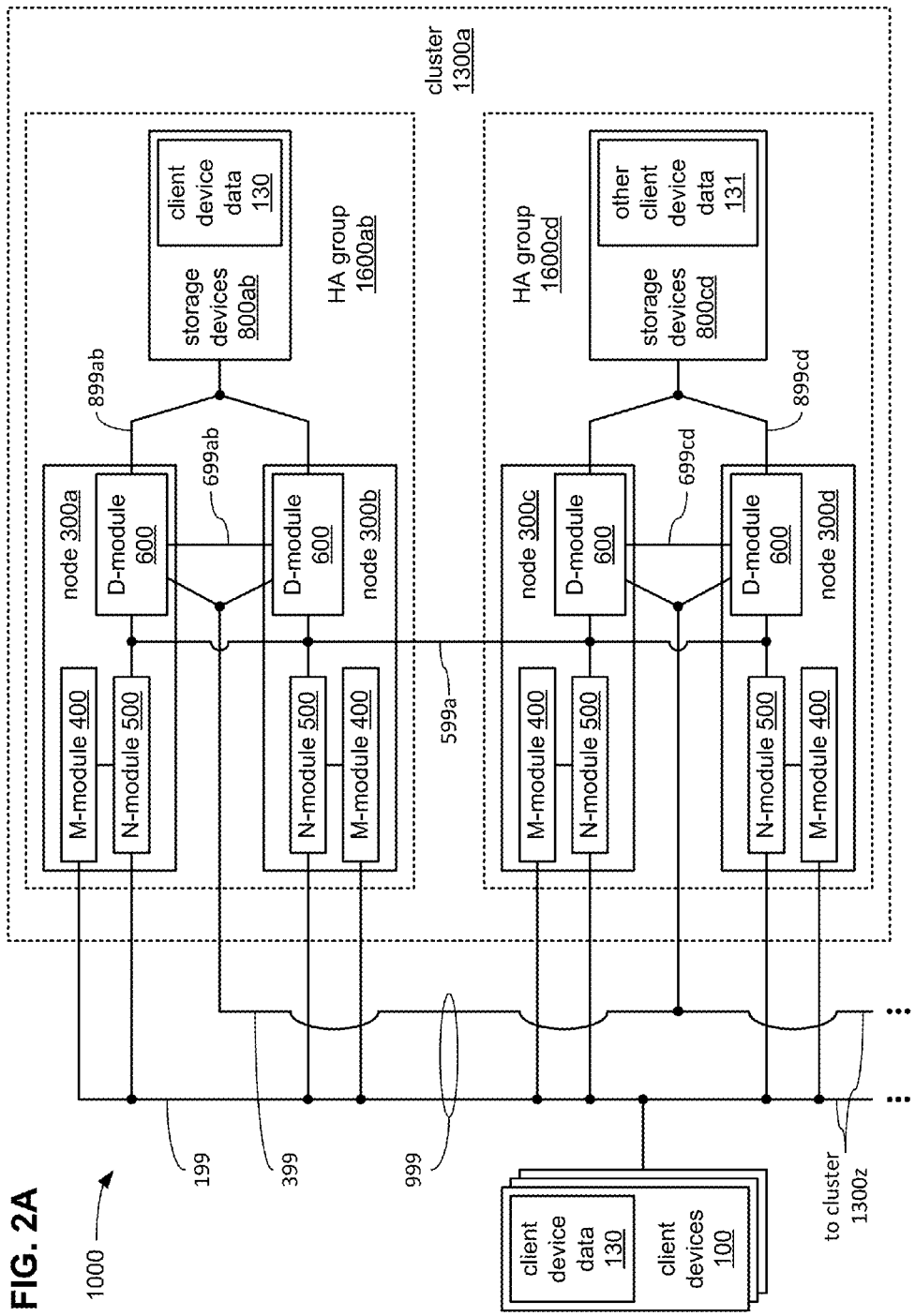
FIG. 2A illustrates an example embodiment of a pair of high availability groups of a cluster.
Figure 2B:
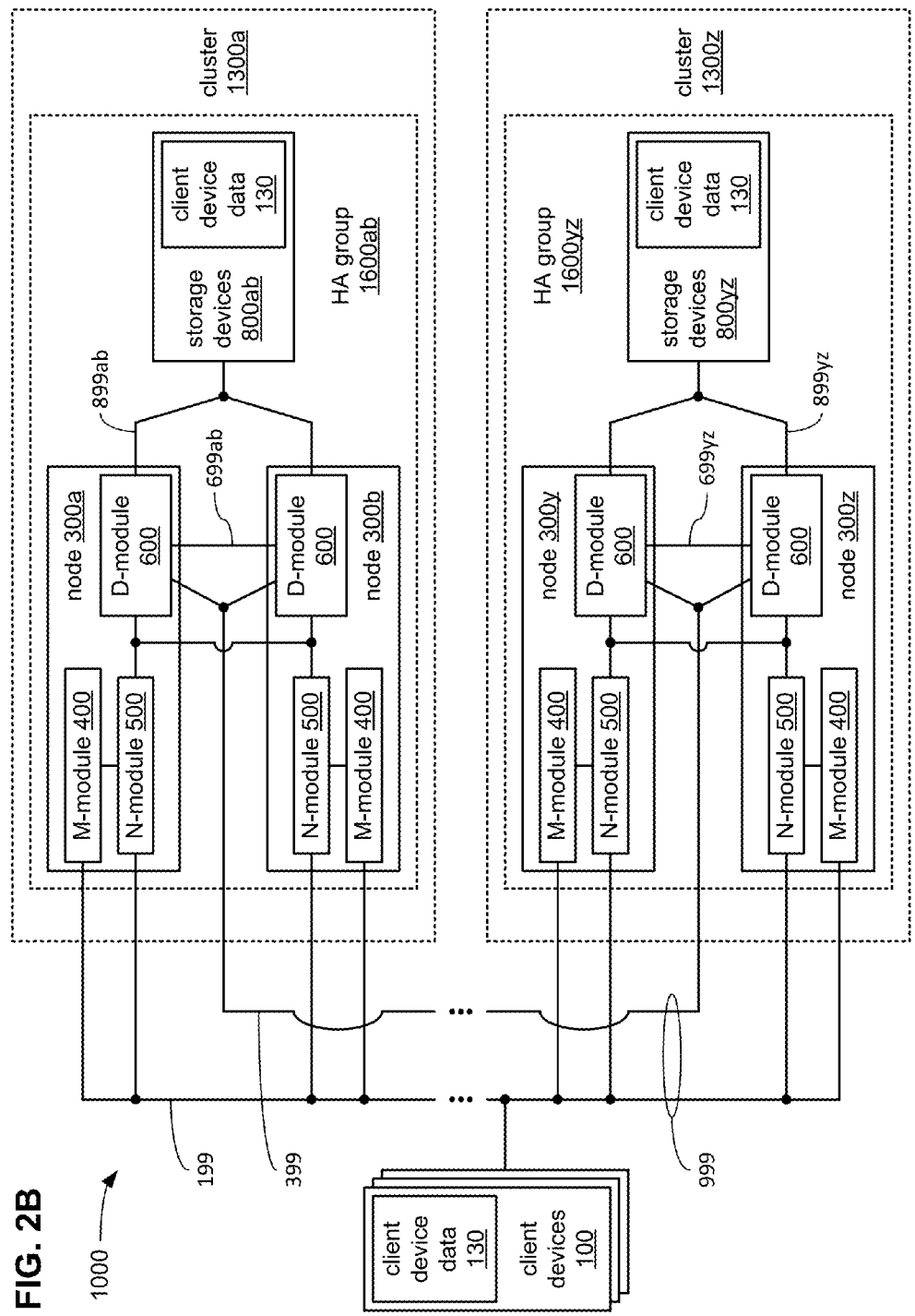
FIG. 2B illustrates an example embodiment of a pair of high availability groups of different clusters.

FIGS. 2A and 2B each illustrate a block diagram of an example portion of the storage cluster system 1000 in greater detail. More specifically, FIG. 2A depicts aspects of the nodes 300*a-d* and interconnections thereamong within the cluster 1300*a* in greater detail. FIG. 2B depicts aspects of the interconnections among the nodes 300*a-b* and 300*y-z*, including interconnections extending between the clusters 1300*a* and 1300*z*, in greater detail.

Referring to both FIGS. 2A and 2B, each of the nodes 300*a-d* and 300*y-z* may incorporate one or more of a M-module 400, a N-module 500 and a D-module 600. As depicted, each of the M-modules 400 and the N-modules 500 may be coupled to the client interconnect 199, by which each may be accessible to one or more of the client devices 100. The M-module 400 of one or more active ones of the nodes 300*a-d* and 300*y-z* may cooperate with one or more of the client devices 100 via the client interconnect 199 to allow an operator of one of the client devices 100 to configure various aspects of the manner in which the storage cluster system 1000 stores and provides access to the client device data 130 provided by one or more of the client devices 100. The N-module 500 of one or more active ones of the nodes 300*a-d* and 300*y-z* may receive and respond to requests for storage services received from one or more of the client devices 100 via the client interconnect 199, and may perform a protocol conversion to translate each storage service request into one or more data access commands.

As depicted, the D-modules 600 of all of the nodes 300*a-d* and 300*y-z* may be coupled to each other via the inter-cluster interconnect 399. Also, within each of the HA groups 1600*ab*, 1600*cd* and 1600*yz*, D-modules 600 of partnered nodes may share couplings to the sets of storage devices 800*ab*, 800*cd* and 800*yz*, respectively. More specifically, the D-modules 600 of the partnered nodes 300*a* and 300*b* may both be coupled to the set of storage devices 800*ab* via the storage interconnect 899*ab*, the D-modules 600 of the partnered nodes 300*c* and 300*d* may both be coupled to the set of storage devices 800*cd* via the storage interconnect 899*cd*, and the D-modules 600 of the nodes partnered 300*y* and 300*z* may both be coupled to the set of storage devices 800*yz* via the storage interconnect 899*yz*. The D-modules 600 of active ones of the nodes 300*a-d* and 300*y-z* may perform the data access commands derived by one or more of the N-modules 500 of these nodes from translating storage service requests received from one or more of the client devices 100.

Thus, the D-modules 600 of active ones of the nodes 300*a-d* and 300*y-z* may access corresponding ones of the sets of storage devices 800*ab*, 800*cd* and 800*yz* via corresponding ones of the storage interconnects 899*ab*, 899*cd* and 899*yz* to store and/or retrieve client device data 130 as part of performing the data access commands. The data access commands may be accompanied by portions of the client device data 130 to store and/or newer portions of the client device data 130 with which to update the client device data 130 as stored. Alternatively or additionally, the data access commands may specify portions of the client device data 130 to be retrieved from storage for provision back to one or more of the client devices 100.

Further, and referring to FIG. 2B, the D-module 600 of an active one of the nodes 300*a-b* and 300*y-z* of one of the clusters 1300*a* or 1300*z* may replicate the data access commands and transmit the resulting replica data access commands via the inter-cluster interconnect 399 to another active one of the nodes 300*a-b* and 300*y-z* of the other of the clusters 1300*a* or 1300*z* to enable at least partial parallel performance of the data access commands by two of the D-modules 600. In this way, the state of the client device data 130 as stored within one of the sets of storage devices 800*ab* or 800*yz* may be mirrored within the other of the sets of storage devices 800*ab* or 800*yz*, as depicted.

Such mirroring of the state of the client device data 130 between multiple sets of storage devices associated with different clusters that may be geographically distant from each other may be deemed desirable to address the possibility of the nodes of one of the clusters becoming inaccessible as a result of a regional failure of the client interconnect 199 (e.g., as a result of a failure of a portion of the network 999 through which a portion of the client interconnect extends in a particular geographic region). As familiar to those skilled in the art, the use of additional interconnect(s) between partnered nodes of a HA group (e.g., the HA interconnects 699$ab$, 699$cd$ and 699$yz$) tends to encourage physically locating partnered nodes of a HA group in close proximity to each other such that a localized failure of a network may render all nodes of a HA group inaccessible to the client devices 100. For example, a failure of a portion of a network that includes the client interconnect 199 in the vicinity of both of the nodes 300$a$ and 300$b$ may render both of the nodes 300$a$ and 300$b$ inaccessible to the client devices 100 such that the client device data 130 stored within the sets of storage devices 800$ab$ becomes inaccessible through either of the nodes 300$a$ or 300$b$. With both of the sets of the storage devices 800$ab$ and 800$yz$ mirroring the state of the client device data 130, the client devices 100 are still able to access the client device data 130 within the set of storage devices 800$yz$, despite the loss of access to the set of storage devices 800$ab$.

Referring again to both FIGS. 2A and 2B, and as previously discussed, the sharing of access via the storage interconnects 899$ab$, 899$cd$ and 899$yz$ to each of the sets of storage devices 800$ab$, 800$cd$ and 800$yz$, respectively, among partnered ones of the nodes 300$a$-$d$ and 300$y$-$z$ may enable continued access to one of the sets of storage devices 800$ab$, 800$cd$ and 800$yz$ in the event of a failure occurring within one of the nodes 300$a$-$d$ and 300$y$-$z$. As depicted, in support of enabling such continued access in spite of such a failure, D-modules 600 of partnered ones of the nodes 300$a$-$d$ and 300$y$-$z$ may be coupled within each of the HA groups 1600$ab$, 1600$cd$ and 1600$yz$ via the HA interconnects 699$ab$, 699$cd$ and 699$yz$, respectively. Through the HA interconnects 699$ab$, 699$cd$ or 699$yz$, D-modules 600 of each of these nodes may each monitor the status of the D-modules 600 their partners. More specifically, the D-modules 600 of the partnered nodes 300$a$ and 300$b$ may monitor each other through the HA interconnect 699$ab$, the D-modules 600 of the partnered nodes 300$c$ and 300$d$ may monitor each other through the HA interconnect 699$cd$, and the D-modules 600 of the partnered nodes 300$y$ and 300$z$ may monitor each other through the HA interconnect 699$yz$.

Such monitoring may entail recurring exchanges of "heartbeat" and/or other status signals (e.g., messages conveying the current state of performance of a data access command) via one or more of the HA interconnects 699$ab$, 699$cd$ or 699$yz$ in which an instance of an absence of receipt of such a signal within a specified recurring interval may be taken as an indication of a failure of the one of the D-modules 600 from which the signal was expected. Alternatively or additionally, such monitoring may entail awaiting an indication from a monitored one of the D-modules 600 that a failure of another component of one of the nodes 300$a$-$d$ or 300$y$-$z$ has occurred, such as a failure of a M-module 400 and/or of a N-module 500 of that one of the nodes 300$a$-$d$ or 300$y$-$z$. In response to such an indication of failure of an active one of the nodes 300$a$-$d$ or 300$y$-$z$ belonging to one of the HA groups 1600$ab$, 1600$cd$ or 1600$yz$, an inactive partner among the nodes 300$a$-$d$ or 300$y$-$z$ of the same one of the HA groups 1600$ab$, 1600$cd$ or 1600$yz$ may take over. Such a "takeover" between partnered ones of the nodes 300$a$-$d$ or 300$y$-$z$ may be a complete takeover inasmuch as the partner that is taking over may take over performance of all of the functions that were performed by the failing one of these nodes.

However, in some embodiments, at least the N-modules 500 and the D-modules 600 of multiple ones of the nodes 300$a$-$d$ and/or 300$y$-$z$ may be interconnected in a manner enabling a partial takeover in response to the failure of a portion of one of the nodes 300$a$-$d$ or 300$y$-$z$. Referring more specifically to FIG. 2A, the N-modules 500 of each of the nodes 300$a$-$d$ may be coupled to the D-modules 600 of each of the nodes 300$a$-$d$ via an intra-cluster interconnect 599$a$. In other words, within the cluster 1300$a$, all of the N-modules 500 and all of the D-modules 600 may be coupled to enable data access commands to be exchanged between N-modules 500 and D-modules 600 of different ones of the nodes 300$a$-$d$. Thus, by way of example, where the N-module 500 of the node 300$a$ has failed, but the D-module 600 of the node 300$a$ is still operable, the N-module 500 of its partner node 300$b$ (or of one of the nodes 300$c$ or 300$d$ with which the node 300$a$ is not partnered in a HA group) may take over for the N-module 500 of the node 300$a$.

Although the clusters 1300$a$ and 1300$z$ may be geographically distant from each other, within each of the clusters 1300$a$ and 1300$z$, nodes and/or components of nodes may be positioned within relatively close physical proximity to each other such that the intra-cluster interconnects 599$a$ and 599$z$ may each traverse a relatively short distance (e.g., extending within a room and/or within a single cabinet). More broadly, one or more of the intra-cluster interconnects 599$a$ and 599$z$ may be based on any of a variety (or combination) of communications technologies by which signals may be exchanged, including without limitation, wired technologies employing electrically and/or optically conductive cabling, and wireless technologies employing infrared, radio frequency or other forms of wireless transmission. By way of example, the intra-cluster interconnect 599$a$ may be made up of a mesh of point-to-point interconnects coupling each N-module 500 of each of the nodes 300$a$-$d$ to each D-module 600 of each of the nodes 300$a$-$d$. Alternatively, by way of another example, the intra-cluster interconnect 599$a$ may include a network switch (not shown) to which each of the N-modules 500 and each of the D-modules 600 of the nodes 300$a$-$d$ may be coupled.

It should be noted, however, that it may be deemed desirable to disallow (or at least limit instances of) such partial takeovers in favor of complete takeovers in which one node takes over all functions of another node in which a failure has occurred. This may be the result of portions of the intra-cluster interconnects 599$a$ and/or 599$z$ that extend between N-modules 500 and D-modules 600 within one or more of the nodes 300$a$-$d$ and/or 300$y$-$z$ having the capability to transfer commands and/or data significantly more quickly than portions of the intra-cluster interconnects 599$a$ and/or 599$z$ that extend between N-modules 500 and D-modules 600 of different nodes. Thus, in some embodiments, portions of the intra-cluster interconnects 599$a$ and/or 599$z$ that extend between different ones of the nodes 300$a$-$d$ or 300$y$-$z$, respectively, may not be used such that remain inactive.

It should also be noted that despite the depiction of only a single one of each of the M-module 400, the N-module 500 and the D-module 600 within each of the nodes 300$a$-$d$ and 300$y$-$z$, other embodiments are possible that may incorporate different quantities of one or more of the M-module 400, the N-module 500 and the D-module 600 within one or more of these nodes. By way of example, embodiments are possible in which one or more of the nodes 300a-d and/or 300y-z incorporate more than one N-module 500 to provide a degree of fault-tolerance within a node for communications with one or more of the client devices 100, and/or incorporate more than one D-module 600 to provide a degree of fault-tolerance within a node for accessing a corresponding one of the sets of storage devices 800ab, 800cd or 800yz.

Figure 3:
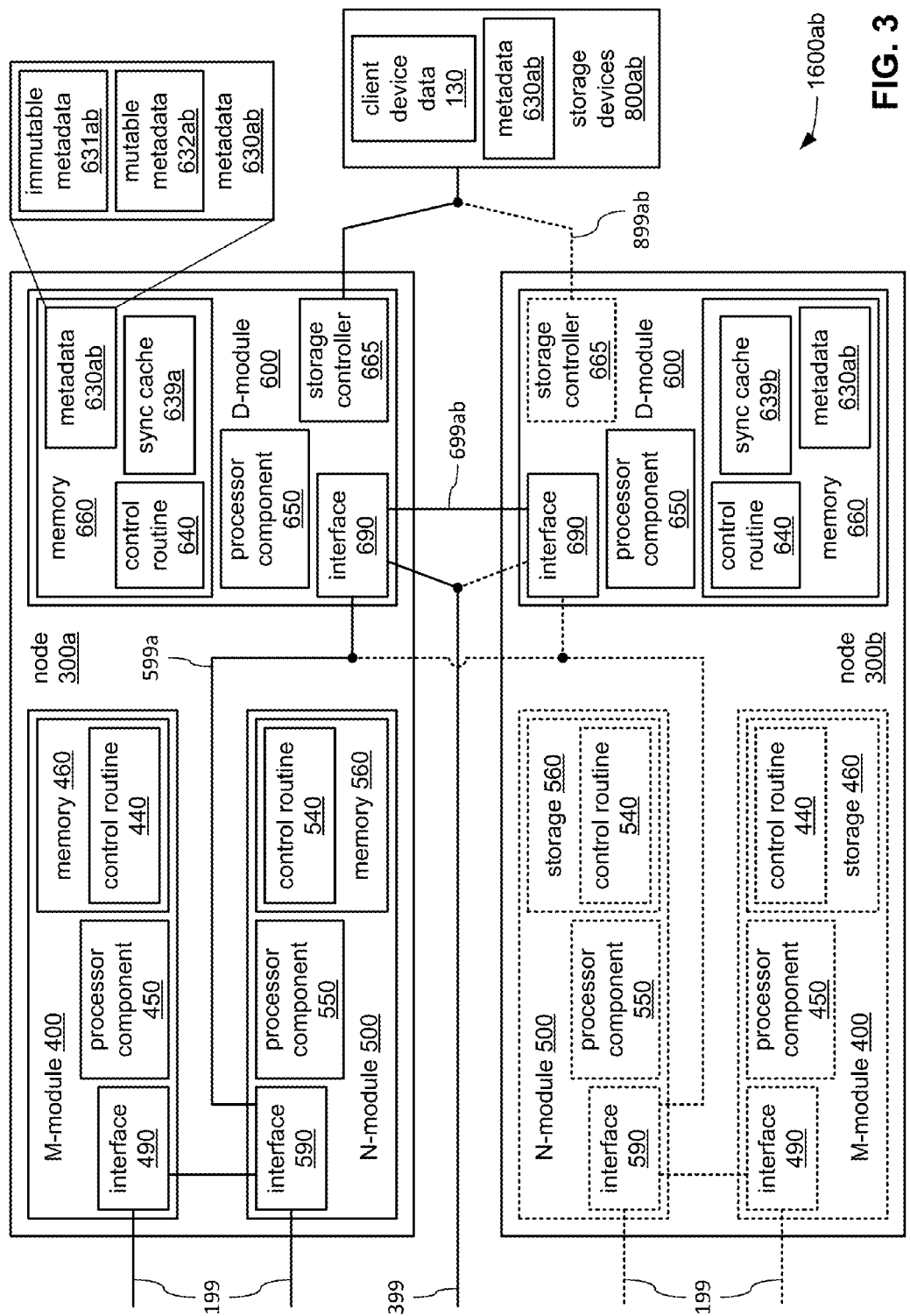
FIG. 3 illustrates an example embodiment of a HA group of partnered nodes.

FIG. 3 illustrates a block diagram of an example embodiment of the HA group 1600ab of the cluster 1300a of the storage cluster system 1000 in greater detail. As depicted, of the nodes 300a and 300b of the HA group 1600ab, the node 300a may be active to engage in communications with a client device 100 and perform operations altering the client device data 130 within the set of storage devices 800ab, while the node 300b may be inactive and awaiting a need to take over for the node 300a. More specifically, the M-module 400 and the N-module 500 may not engage in communications with the client devices 100 (as indicated with the M-module 400 and the N-module 500 being drawn with dotted lines). As also depicted, each of the nodes 300a-b may incorporate one or more of a M-module 400, a N-module 500 and a D-module 600.

In various embodiments, the M-module 400 of each of the nodes 300a-b incorporates one or more of a processor component 450, a memory 460 and an interface 490 to couple the M-module 400 to at least the client interconnect 199. The memory 460 may store a control routine 440. The control routine 440 may incorporate a sequence of instructions operative on the processor component 450 in its role as a main processor component of the M-module 400 to implement logic to perform various functions. As a result of the node 300a being active to engage in communications with one or more of the client devices 100 and to perform data access commands, the processor component 450 of the M-module 400 of the node 300a may be active to execute the control routine 440. However, as a result of the node 300b being inactive, the processor component 450 may not be active to execute the control routine 440 within the M-module 400 of the node 300b. However, if the node 300b takes over for the node 300a, then the control routine 440 within the node 300b may begin to be executed, while the control routine 440 within the node 300a may cease to be executed.

In executing the control routine 440, the processor component 450 of the M-module 400 of the active node 300a may operate the interface 490 to accept remotely supplied configuration information. Specifically, the processor component 450 may provide a web server, telnet access, instant messaging and/or other communications service(s) by which aspects of the operation of the node 300a, the HA group 1600ab, the cluster 1300a and/or other components of the storage cluster system 1000 may be remotely configured. In some embodiments, such remote configuration may emanate from one or more of the client devices 100. By way of example, security protocols by which each of the client devices 100 may be authenticated to allow access to the client device data 130 stored within the set of storage devices 800ab may be remotely configured, as well as what protocols may be employed in communications via the client interconnect 199, what file system may be employed in storing client device data 130 within the set of storage devices 800ab, what other one(s) of the nodes 300b-d or 300y-z may be partnered with the node 300a to form the HA group 1600ab, what other node and/or HA group may cooperate with the node 300a and/or the HA group 1600ab to provide further fault tolerance, what network addresses may be allocated to others of the nodes 300a-d and/or 300y-z on various interconnects, etc. As the processor component 450 receives such configuration information and/or subsequent to receiving such information, the processor component 450 may operate the interface 490 to relay it and/or updates thereto to the N-module 500 and/or the D-module 600 as a portion of metadata.

In various embodiments, the N-module 500 of each of the nodes 300a-b incorporates one or more of a processor component 550, a memory 560 and an interface 590 to couple the N-module 500 to one or both of the client interconnect 199 and the intra-cluster interconnect 599a. The memory 560 may store a control routine 540. The control routine 540 may incorporate a sequence of instructions operative on the processor component 550 in its role as a main processor component of the N-module 500 to implement logic to perform various functions. As a result of the node 300a being active to engage in communications with one or more of the client devices 100 and to perform data access commands, the processor component 550 of the N-module 500 of the node 300a may be active to execute the control routine 540. However, as a result of the node 300b being inactive, the processor component 550 may not be active to execute the control routine 540 within the N-module of the node 300b. However, if the node 300b takes over for the node 300a, then the control routine 540 within the node 300b may begin to be executed, while the control routine 540 within the node 300a may cease to be executed.

In executing the control routine 540, the processor component 550 of the N-module 500 of the active node 300a may operate the interface 590 to perform various tests to detect other devices with which to communicate and/or assign network addresses by which other devices may be contacted for communication. At least as part of rebooting following being reset or powered on, the processor component 550 may perform various tests on the inter-cluster interconnect 399 and/or the intra-cluster interconnect 599a to determine addresses and/or communications protocols for communicating with one or more components (e.g., M-modules 400, N-modules 500 and/or D-modules 600) of one or more of the nodes 300a-d and/or 300y-z. Alternatively or additionally, in embodiments in which at least a portion of the intra-cluster interconnect 599a supports internet protocol (IP) addressing, the processor component 550 may function in the role of a dynamic host control protocol (DCHP) server to assign such addresses. Also alternatively or additionally, the processor component 550 may receive configuration information from the M-module 400.

In some embodiments, configuration information received from the M-module 400 may be employed by the processor component 550 in performing such tests on the inter-cluster interconnect 399 and/or the intra-cluster interconnect 599a (e.g., the configuration information so received may include a range of IP addresses to be tested). As the processor component 550 performs such tests and/or subsequent to performing such tests, the processor component 550 may operate the interface 590 to relay indications of the results of those tests and/or updates thereto to the D-module 600 as a portion of metadata. Further, as the processor component 550 interacts with one or more of the client devices 100 and/or other devices, the processor component 550 may detect changes in information determined from the performance of various tests, and may operate the interface 590 to provide indications of those changes to the D-module 600 as portions of updated metadata.

In further executing the control routine 540, the processor component 550 may operate the interface 590 to exchange storage service requests, responses thereto and/or client device data 130 with one or more of the client devices 100 via the client interconnect 199. The client devices 100 and the N-module(s) 500 of one or more active ones of the nodes 300a-d and 300y-z may interact with each other via the client interconnect 199 in accordance with a client/server model for the handling of client device data 130. Stated differently, each of the client devices 100 may issue requests for storage services related to the storage of client device data 130 to one or more of the nodes 300a-d and 300y-z that are active to engage in communications with the client devices 100. In so doing, the client devices 100 and the N-module 500 may exchange packets over the client interconnect 199 in which storage service requests may be transmitted to the N-module 500, responses (e.g., indications of status of handling of the requests) may be transmitted to the client devices 100, and client device data 130 may be exchanged therebetween. The exchanged packets may utilize any of a variety of file-based access protocols, including and not limited to, Common Internet File System (CIFS) protocol or Network File System (NFS) protocol, over TCP/IP. Alternatively or additionally, the exchanged packets may utilize any of a variety of block-based access protocols, including and not limited to, Small Computer Systems Interface (SCSI) protocol encapsulated over TCP (iSCSI) and/or SCSI encapsulated over Fibre Channel (FCP).

Also in executing the control routine 540, the processor component 550 may operate the interface 590 to exchange commands and/or data, including client device data 130, with the D-module 600 via the intra-cluster interconnect 599a. Such exchanges of commands and/or data may or may not employ a protocol in which packets are used. In some embodiments, data access commands to effect exchanges of client device data 130 may be exchanged through the intra-cluster interconnect 599a in a manner that may be agnostic of any particular file system that may be selected for use in storing the client device data 130 within the set of storage devices 800ab. More specifically, the manner in which portions of client device data 130 may be referred to in data access commands to store and/or retrieve client device data 130 may entail identification of file names, identification of block identifiers, etc. in a manner meant to be independent of a selection of a file system.

Given the possible differences in protocols and/or other aspects of communications, the processor component 550 may be caused to translate between protocols employed in communications with one or more of the client devices 100 via the client interconnect 199 and protocols employed in communications with the D-module 600 via the intra-cluster interconnect 599a. Alternatively or additionally, one or more of the protocols employed in communications via the client interconnect 199 may employ file and/or block identification in a manner enabling a minimal degree of protocol translation between such communications and communications via the intra-cluster interconnect 599a.

In performing such protocol translations, the processor component 550 may be caused to relay a storage service request from one of the client devices 100 to the D-module 600 as one or more data access commands to store and/or retrieve client device data 130. More specifically, a request received via the client interconnect 199 for storage services to retrieve client device data 130 may be converted into one or more data access commands conveyed to the D-module 600 via the intra-cluster interconnect 599a to retrieve client device data 130 from the set of storage devices 800ab and to provide the client device data 130 to the N-module 500 to be relayed by the N-module 500 back to the requesting one of the client devices 100. Also, a request received via the client interconnect 199 for storage services to store client device data 130 may be converted into one or more data access commands conveyed to the D-module 600 via the intra-cluster interconnect 599a to store the client device data 130 within the set of storage devices 800ab.

In various embodiments, the D-module 600 of each of the nodes 300a-b incorporates one or more of a processor component 650, a memory 660, a storage controller 665 to couple the D-module 600 to the set of storage devices 800ab via the storage interconnect 899ab, and an interface 690 to couple the D-module 600 to one or more of the intra-cluster interconnect 599a, the inter-cluster interconnect 399 and the HA interconnect 699ab. The memory 660 stores one or more of a control routine 640 and metadata 630ab. Also, and as will be explained in greater detail, in the D-module 600 of the node 300a, a portion of the memory 660 may be allocated to serve as a synchronization cache (sync cache) 639a, while a portion of the memory 660 may be similarly allocated to serve as a synchronous cache 639b in the D-module of the node 300b. The control routine 640 incorporates a sequence of instructions operative on the processor component 650 in its role as a main processor component of the D-module 600 to implement logic to perform various functions. However, as a result of the node 300a being active to engage in communications with one or more of the client devices 100 and to perform data access commands, a different portion of the control routine 640 may be executed by the processor component 650 of the D-module 600 of the node 300a from a portion of the control routine 640 that may be executed by the processor component 650 of the D-module of the node 300b. As a result, different logic may be implemented by the executions of different portions of the control routine 640 within each of these D-modules 600.

In executing the control routine 640, the processor component 650 of the D-module 600 of the active node 300a may operate the interface 690 to receive portions of metadata and/or updates thereto from the M-module 400 and/or the N-module 500 via the intra-cluster interconnect 599a. Regardless of whether aspects of the operation of at least the node 300a are remotely configured via the M-module 400 and/or are configured based on the results of tests performed by the N-module 500, the processor component 650 may generate the metadata 630ab from those received metadata portions indicating the resulting configuration of those aspects, and may store the metadata 630ab within the memory 660 for subsequent use by the processor component 650. The processor component 650 may repeat the generation of the metadata 630ab in response to receiving updated portion(s) of metadata from the M-module 400, the N-module 500 and/or other possible sources of updated metadata portions, thereby creating an updated version of the metadata 630ab which the processor component 650 may store within the memory 660 in place of earlier version(s).

Following generation of the metadata 630ab and/or each updated version thereof, the processor component 650 may store the metadata 630ab within the set of storage devices 800ab for later retrieval. During subsequent rebooting of the D-module 600 of the node 300a, the processor component 650 may be caused by its execution of the control routine 640 to access the set of storage devices 800ab to retrieve the metadata 630ab. In this way, the processor component 650 retrieves indications of the manner in which various aspects of the operation of at least the node 300a are to be configured, including aspects of the manner in which the D-module 600 is to operate the set of storage devices 800ab and/or the manner in which the D-module 600 is to interact with other devices (e.g., the M-module 400 or the N-module 500 of the node 300a, and/or the N-module 500 or the D-module 600 of one or more of the other nodes 300b-d or 300y-z). It may be deemed desirable to enable the D-module 600 of the node 300a to obtain information concerning aspects of operation of at least the node 300a as quickly as possible by doing so independently of the M-module 400 and/or the N-module 500.

There may be occasions where multiple components of the node 300a, including more than one of the M-module 400, the N-module 500 and the D-module 600, are caused to reboot, including and not limited to, implementing updates, upgrades, expansions of storage space, repairs, etc. By storing the metadata 630ab within the set of storage devices 800ab for later retrieval following a rebooting of the D-module 600, the need for the D-module 600 to await completion of rebooting of the M-module 400 and/or the N-module 500 before being provided with metadata portions from which to again derive the metadata 630ab is avoided.

Alternatively or additionally, a situation may arise in which the M-module 400 and/or the N-module 500 may become inoperative. By way of example, where more than one of the M-module 400, the N-module 500 and the D-module 600 are rebooted, the M-module 400 and/or the N-module 500 may fail to successfully reboot such that either of the M-module 400 or N-module 500 remain unresponsive to any request from the D-module 600 to provide metadata portions making up the metadata 630ab for an extended period of time. Thus, the ability of the D-module 600 to independently retrieve the metadata 630ab may allow the D-module 600 to still cooperate with N-modules 500 and/or D-modules 600 of one or more of the other nodes 300b-d and/or 300y-z to provide fault-tolerant storage and retrieval of the client device data 130, despite the loss of at least some functionality of the node 300a.

Also following generation of the metadata 630ab and/or each updated version thereof, the processor component 650 of the D-module 600 of the node 300a may operate the interface 690 to transmit a duplicate of the metadata 630ab to the D-module 600 of the inactive node 300b via the HA interconnect 699ab to enable the node 300b to more speedily take over for the active node 300a in response to a failure within the node 300a. In this way, the node 300b is directly provided with the metadata 630ab and/or updated versions thereof to provide information needed by the node 300b to more readily take over communications with one or more client devices, take over communications with one or more others of the nodes 300c-d and/or 300y-z, and/or take over control of and/or access to the set of storage devices 800ab.

Still further following generation of the metadata 630ab and/or each updated version thereof, the processor component 650 of the D-module 600 of the node 300a may operate the interface 690 to transmit a portion of the metadata 630ab to the D-module 600 of an active one of the nodes 300y-z of the HA group 1600yz of the other cluster 1300z. Alternatively or additionally, the processor component 650 of the D-module 600 of the node 300a may operate the interface 690 to transmit metadata portion(s) received from the M-module 400 and/or the N-module 500 of the node 300a to the active one of the nodes 300y-z. Such metadata portion(s) may include indications of aspects of operation of all of the nodes 300a-b and 300y-z together in storing and/or providing access to the client device data 130, and may be provided to the active one of the nodes 300y-z as an input to other metadata that may be separately generated and/or maintained by the nodes 300y-z.

In further executing the control routine 640, the processor component 650 of the D-module 600 of the node 300a may operate the set of storage devices 800ab through the storage controller 665 to store and retrieve client device data 130 in response to data access commands to do so received via the intra-cluster interconnect 599a, as has been described. Again, the processor component 650 may be caused to retry the performance of a data access command to store or retrieve client device data 130 at least in response to the occurrence of a short term failure in performance. The processor component 650 may operate the interface 690 to receive the data access commands from and/or exchange data (including client device data 130) with the N-module 500 via the intra-cluster interconnect 599a.

In addition to operating the storage controller 665 to execute data access commands to store client device data 130 within the set of storage devices 800ab and/or retrieve client device data 130 therefrom, the processor component 650 of the D-module 600 of the node 300a may also replicate the data access commands and operate the interface 690 to transmit the resulting replica data access commands via the inter-cluster interconnect 399 to a D-module 600 of an active one of the nodes 300y-z of the HA group 1600yz of the other cluster 1300z. As has been discussed, the transmission of such replica data access commands to an active node of another HA group may provide an additional degree of fault tolerance in the storage and/or retrieval of client device data 130 in which the replica data access commands may be performed by an active node of another cluster at least partly in parallel with the performance of the original data access command by the node 300a. Again, the processor component 650 may be caused to retry the transmission of such replica data access commands to either the same active one of the nodes 300y-z within the HA group 1600yz and/or to a different inactive one of the nodes 300y-z within the HA group 1600yz in response to indications of errors in either the receipt or performance of the replica data access commands.

In support of such exchanges of replica data access commands and responses thereto between the D-module 600 of the node 300a and a D-module 600 of an active one of the nodes 300y-z, the processor component 650 of the D-module 600 of the node 300a may employ information included within the metadata 630ab to form an active communications session with the D-module 600 of that other active node through the inter-cluster interconnect 399. The processor component 650 may additionally form an inactive communications session with a D-module of the inactive one of the nodes 300y-z through the inter-cluster interconnect 399 in preparation for retrying a transmission of a replica data access command to the D-module 600 of that inactive node. Further, if the processor 650 retries the transmission of a replica data access command to the D-module 600 of that inactive one node, then the processor component 650 may act to change the state of the inactive communications session formed with the D-module 600 of that inactive node from inactive to active.

In executing the control routine 640, the processor component 650 of the D-module 600 of the inactive node 300b may operate the interface 690 to receive the metadata 630ab and/or updates thereto from the D-module 600 of the node 300a via the HA interconnect 699ab. The processor component 650 may then store the received metadata 630ab and/or the received updates thereto within the memory 660 for subsequent use. Again, provision of the metadata 630ab and updates thereto to the node 300b by the node 300a may be deemed desirable to enable the node 300b to more quickly take over for the node 300a (thereby transitioning from being an inactive node of the HA group 1600ab to becoming the active node of the HA group 1600ab) in response to a failure occurring within the node 300a. More specifically, with the metadata 630ab already provided to the D-module 600 of the node 300b, the need for the processor component 650 of the D-module 600 of the node 300b to take additional time to retrieve the metadata 630ab from other sources is alleviated. More precisely, the need for the processor component to retrieve the metadata 630ab from the set of storage devices 800ab, or to request portions of metadata from the M-module 400 and/or the N-module 500 of either of the nodes 300a or 300b upon taking over for the node 300a is alleviated.

As depicted, the metadata 630ab may include immutable metadata 631ab and mutable metadata 632ab. What pieces of metadata are included in each of the immutable metadata 631ab and the mutable metadata 632ab may be based on the relative frequency with which each piece of metadata is expected to change. By way of example, aspects of the storage of client device data 130 within the set of storage devices 800ab, such as a selection of file system, a RAID level, etc. may be deemed immutable as a result of being deemed less likely to change or likely to change less frequently than other metadata. In contrast, a network address of a M-module, a N-module or a D-module of one of the other nodes 300a-d or 300y-z with which the node 300a may communicate via one of the interconnects 399, 599a or 699ab may be deemed mutable as a result of being deemed more likely to change or likely to change more frequently than other metadata.

Since the mutable metadata 632ab includes indications of aspects of the operation of at least the node 300a that are deemed likely to change with greater frequency than similar indications included in the immutable metadata 631ab, the information included in at least the mutable metadata 632ab may more frequently become out of date. Following rebooting of the D-module 600 of the node 300a, if an attempt by the processor component 650 to employ information in the mutable metadata 632ab obtained from the storage devices 800ab to communicate with other components of the node 300a and/or with components of others of the nodes 300b-d and/or 300y-z is unsuccessful, then the processor component 650 may operate the interface 690 to transmit a request to the M-module 400 and/or the N-module 500 via the intra-cluster interconnect 599a for metadata portions that include updated versions of the information included in the mutable metadata 632ab. Depending on whether the M-module 400 and/or the N-module 500 are also rebooting, the processor component 650 may be caused to await completion of their rebooting and to then retransmit its request for those updated metadata portions. In response to receiving the request, the processor components 450 and/or 550 may be caused by execution of the control routines 440 and/or 540 to operate the interfaces 490 and/or 590, respectively, to transmit such updated metadata portions to the D-module 600 via the intra-cluster interconnect 599a. Upon receiving the updated information, the processor component 650 may then incorporate the updated information into the mutable metadata 632ab, again generate the metadata 630ab incorporating the updated mutable metadata 632ab, store the now updated metadata 630ab within the memory 660 and the set of storage devices 800ab, and employ the now updated metadata 630ab within the memory 660 to operate the interface 690 to make another attempt to communicate with other components of the node 300a and/or with components of others of the nodes 300b-d and/or 300y-z.

In some embodiments, if the attempt by the processor component 650 to communicate using the metadata 630ab incorporating the now updated mutable metadata 632ab is also unsuccessful, then the processor component 650 may operate the interface 690 to transmit a request to the M-module 400 and/or the N-module 500 for updated versions of the information making up the immutable metadata 631ab. It may be that an updated version of the immutable metadata 631ab includes indications of aspects of operation that are needed in conjunction with using the information contained within the updated version of the mutable metadata 632ab. Upon receiving the updated information, the processor component 650 may then incorporate the updated information into the immutable metadata 631ab, again generate the metadata 630ab incorporating the updated immutable metadata 631ab, store the now updated metadata 630ab within the memory 660 and the set of storage devices 800ab, and employ the now updated metadata 630ab to make a further attempt to communicate with other components of the node 300a and/or with components of others of the nodes 300b-d and/or 300y-z.

As part of determining whether one of the nodes 300a or 300b needs to take over for the other, the processor components 650 of the D-modules of each of the nodes 300a and 300b may cooperate to recurringly exchange indications of the status of their nodes via the HA interconnect 699ab extending therebetween. As previously discussed such exchanges of status indications may take the form of recurring "heartbeat" signals and/or indications of the current state of performing an operation (e.g., a performing a data access command). Again, an indication that a component of one of the nodes 300a-b has suffered a malfunction may be the lack of receipt of an expected heartbeat signal or other status indication by the other of the nodes 300a-b within a specified period of time (e.g., within a recurring interval of time). Where the D-module 600 of the active node 300a receives an indication of a failure within the inactive node 300b, the processor component 650 of the D-module 600 of the node 300a (or another component of the node 300a) may refrain from taking action to take over the node 300b, since the node 300b is inactive such that the node 300b may not be performing a task that requires a takeover of the node 300b.

However, where the D-module 600 of the inactive node 300b receives an indication of a failure within the active node 300a, the processor component 650 of the D-module 600 of the inactive node 300b (or another component of the inactive node 300b) may take action to take over the node 300a, since the node 300a is active to engage in communications with the client devices 100, to perform data access commands, and to cooperate with another active node to cause at least partial parallel performance of data access commands therebetween. By way of example, the processor component 650 of the D-module 600 of the node 300b may signal the N-module 500 of the node 300b to take over communications with one or more of the client devices 100 and/or may begin performing the data access commands that were performed by the processor component 650 of the D-module 600 of the node 300a. In taking over the performance of those data access commands, the processor component 650 of the D-module 600 of the node 300b may take over access to and control of the set of storage devices 800ab via the coupling that the D-modules 600 of both of the nodes 300a and 300b share to the set of storage devices 800ab through the storage interconnect 899ab.

Where the inactive node 300b does take over for the active node 300a in response to a failure occurring within the node 300a, the active and inactive roles of the nodes 300a and 300b may fully reverse, at least after the failure within the node 300a has been corrected. More specifically, the M-module 400 and the N-module 500 of the node 300b may become active to engage in communications with the client devices 100 via the client interconnect 199 to receive configuration information and storage service requests, and thereby take over for the M-module 400 and the N-module 500 of the node 300a, while the M-module 400 and the N-module 500 of the node 300a become inactive. Similarly, the D-module 600 of the node 300b may become active to perform and replicate data access commands, and to transmit replica data access commands to another active node via the inter-cluster interconnect 399 to cause at least partial parallel performance of the data access commands, and thereby take over for the D-module 600 of the node 300a, while the D-module 600 of the node 300a becomes inactive. However, in becoming active, the processor component 650 of the D-module 600 of the now inactive node 300a may cooperate with the processor component 650 of the D-module 600 of the node 300b to receive new versions of the metadata 630ab generated within the node 300b and to exchange indications of status with the D-module 600 of the node 300b via the HA interconnect 699ab to determine if the node 300a should subsequently take over for the now active node 300b.

The processor components 650 of the D-modules 600 of each of the nodes 300a and 300b may designate or otherwise use a portion of corresponding ones of the memories 660 as the synchronization caches 639a and 639b, respectively, in communications with D-module(s) 600 of others of the nodes 300a-d and/or 300y-z. More specifically, the processor components 650 of the D-modules 600 of the nodes 300a and 300b may employ the synchronization caches 639a and 639b, respectively, to buffer versions of the metadata 630ab and/or status indications exchanged therebetween. Alternatively or additionally, the processor component 650 of the D-module 600 of the node 300a may maintain and employ the synchronization cache 639a to buffer replica data access commands transmitted to another active node of another HA pair of another cluster and/or indications of status of performance of those replica data access commands received from that other active node.

Broadly, each of the client devices 100, the nodes 300a-d and 300y-z, the M-modules 400, the N-module 500, the D-modules 600 and/or the storage devices 800ab, 800cd and 800yz may be any of a variety of types of computing device, including without limitation, a desktop computer system, a data entry terminal, a laptop computer, a netbook computer, a tablet computer, a handheld personal data assistant, a smartphone, smart glasses, a smart wristwatch, a digital camera, a body-worn computing device incorporated into clothing, a computing device integrated into a vehicle (e.g., a car, a bicycle, a wheelchair, etc.), a server, a cluster of servers, a server farm, etc.

In some embodiments, one or more of the nodes 300a-d and 300y-z may be physically implemented as an assembly of one or more M-modules 400, one or more N-modules 500 and one or more D-modules 600 that are each implemented as separate computing devices coupled by a physical implementation of a corresponding one of the intra-cluster interconnect 599a or 599z. However, in other embodiments, more than one of the M-module(s) 400, the N-module(s) 500 and D-module(s) 600 of one or more of the nodes 300a-d and 300y-z may be implemented as sets of instructions that are executed as processes by a shared processor component (e.g., one of the processor components 450, 550 or 650). In such other embodiments, at least a portion of the intra-cluster interconnect 599a or 599z that does not extend between nodes may be implemented as a buffer or other data structure defined within a shared memory (e.g., one of the memories 460, 560 or 660) and employed to exchange data access commands, client device data 130 and metadata 630ab among the control routines 440, 540 and/or 640.

In the examples presented herein, one or more of the client devices 100 may be a computing device directly operated by one or more persons to generate and/or work with client device data 130, and one or more of the nodes 300a-d and 300y-z may be a computing device functioning as a server to remotely store such client device data 130, as well as to provide the client devices 100 with access thereto in a fault-tolerant manner. Alternatively or additionally, in examples presented herein, one or more of the client devices 100 may be a computing device functioning as a server to store and provide access to at least a portion of client device data 130, and one or more of the nodes 300a-d and 300y-z may be a computing device functioning as an additional server to augment the storage provided by one or more of the client devices 100.

Figure 4:
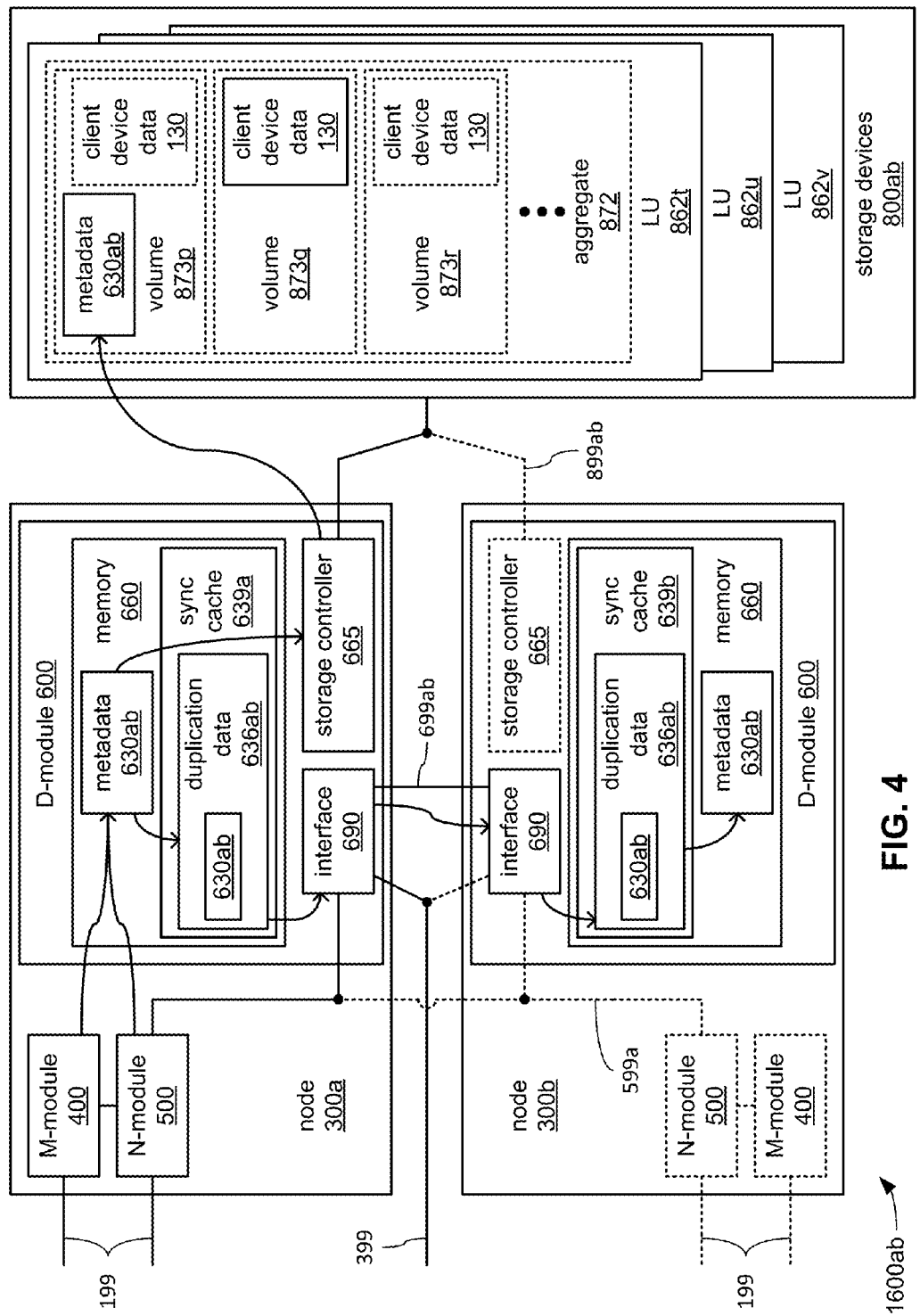
FIG. 4 illustrates an example embodiment of duplication and storage of metadata within a shared set of storage devices.

FIG. 4 illustrates a block diagram of another example embodiment of the HA group 1600ab of the cluster 1300a of the storage cluster system 1000 in greater detail. As again depicted, of the nodes 300a and 300b of the HA group 1600ab, the node 300a may be active to engage in communications with a client device 100 and perform operations altering the client device data 130 within the set of storage devices 800ab, while the node 300b may be inactive and awaiting a need to take over for the node 300a. FIG. 4 also depicts various aspects of the generation, duplication and storage of the metadata 630ab within the set of storage devices 800ab alongside the client device data 130 in greater detail.

Each of the sets of storage devices 800ab, 800cd and 800yz may be made up of storage devices based on any of a variety of storage technologies, including and not limited to, ferromagnetic "hard" or "floppy" drives, magneto-optical media drives, optical media drives, non-volatile solid state drives, etc. As depicted, the set of storage devices 800ab may include LUs 862t-v that may be operated together to form one such array. In some embodiments, the processor component 650 of the D-module 600 of the node 300a may operate the storage controller 665 to treat each of the storage devices of the set of storage devices 800ab as a separate LU and/or may be caused to treat a group of those storage devices as a single LU. Multiple LUs may be operated together via the storage controller 665 to implement a level of RAID or other form of array that imparts fault tolerance in the storage of data therein. The manner in which LUs are defined among one or more storage devices of the set of storage devices 800ab, and/or the manner in which multiple LUs may be operated together may be specified within the metadata 630ab.

The processor component 650 may be caused to allocate storage space in any of a variety of ways within a single LU and/or within multiple LUs operated together to form an array. In so doing, the processor component 650 may be caused to subdivide storage space in any of a variety of ways within a single LU and/or within multiple LUs that are operated together. By way of example, such subdivisions may be effected as part of organizing client device data 130 into separate categories based on subject, as part of separating client device data 130 into different versions generated over time, as part of implementing differing access policies to different pieces of client device data 130, etc. In some embodiments, and as depicted, the storage space provided by within the LU 862*t* or within a combination of the LUs 862*t-v* may be designated as an aggregate 872. Further, the aggregate 872 may be subdivided into volumes 873*p-r*. The manner in which aggregates and/or volumes are defined may be selected to conform to the specification(s) of one or more widely known and used file systems, including and not limited to, Write Anywhere File Layout (WAFL). The manner in which aggregates and/or volumes within aggregates are allocated among a single LU or multiple LUs that are operated together may be specified within the metadata 630*ab*.

The client device data 130 may be stored entirely within one of the volumes 873*p-r*, or may be distributed among multiple ones of the volumes 873*p-r* (as depicted). As also depicted, the metadata 630*ab* may also be stored within the set of storage devices 800*ab* along with client device data 130, at least within the same aggregate 872. In some embodiments, the metadata 630*ab* may be stored within one or more of the same volumes 873*p-r* as client device data 130 (as depicted). In other embodiments, the metadata 630*ab* may be stored within one of the volumes 873*p-r* that is separate from one or more others of the volumes 873*p-r* within which client device data 130 may be stored. The manner in which the metadata 630*ab* and/or the client device data 130 are organized within aggregates and/or values may be specified within the metadata 630*ab*.

As previously discussed, the M-module 400 of the active node 300*a* may provide portions of metadata, including updates thereof, to the N-module 500 and/or the D-module 600 in response to receiving configuration information from one of the client devices 100. Also, the N-module 500 of the active node 300*a* may provide portions of metadata, including updates thereof, to the D-module 600 that indicate results of various tests performed by the N-module 500. The metadata 630*ab* and/or updated versions thereof may be generated from these portions of metadata received by the D-module 600 of the active node 300*a*, and may then be stored within the memory 660 for subsequent use by the processor component 650 and/or within the set of storage devices 800*ab* for subsequent retrieval following rebooting of the D-module 600. Alternatively or additionally, a duplicate of the metadata 630*ab* may be generated and stored within the synchronization cache 639*a* as a portion of duplication data 636*ab*, by which the duplicate of the metadata 630*ab* may be transmitted via the interface 690 and the HA interconnect 699*ab* to the D-module 600 of the inactive node 300*b*. Upon receipt via the interface 690 of the D-module 600 of the node 300*b*, the duplication data 636*ab* may be stored within the synchronization cache 639*b* from which the duplicate of the metadata 630*ab* may be retrieved and stored elsewhere within the memory 660 for subsequent use by the processor component 650 of the D-module 600 of the node 300*b*.

Figure 5A:
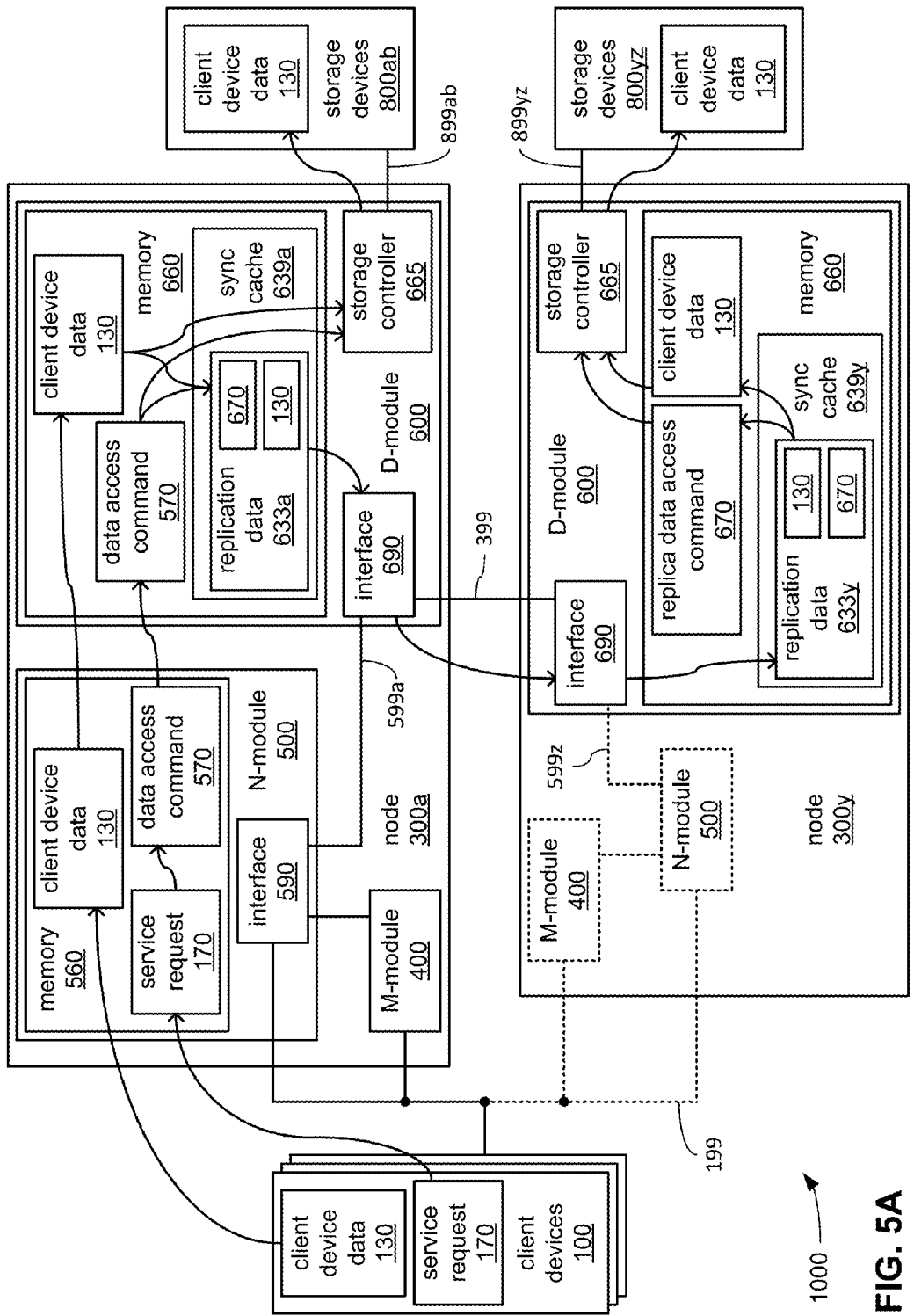
FIG. 5A illustrates an example embodiment of replication of commands between nodes.
Figure 5B:
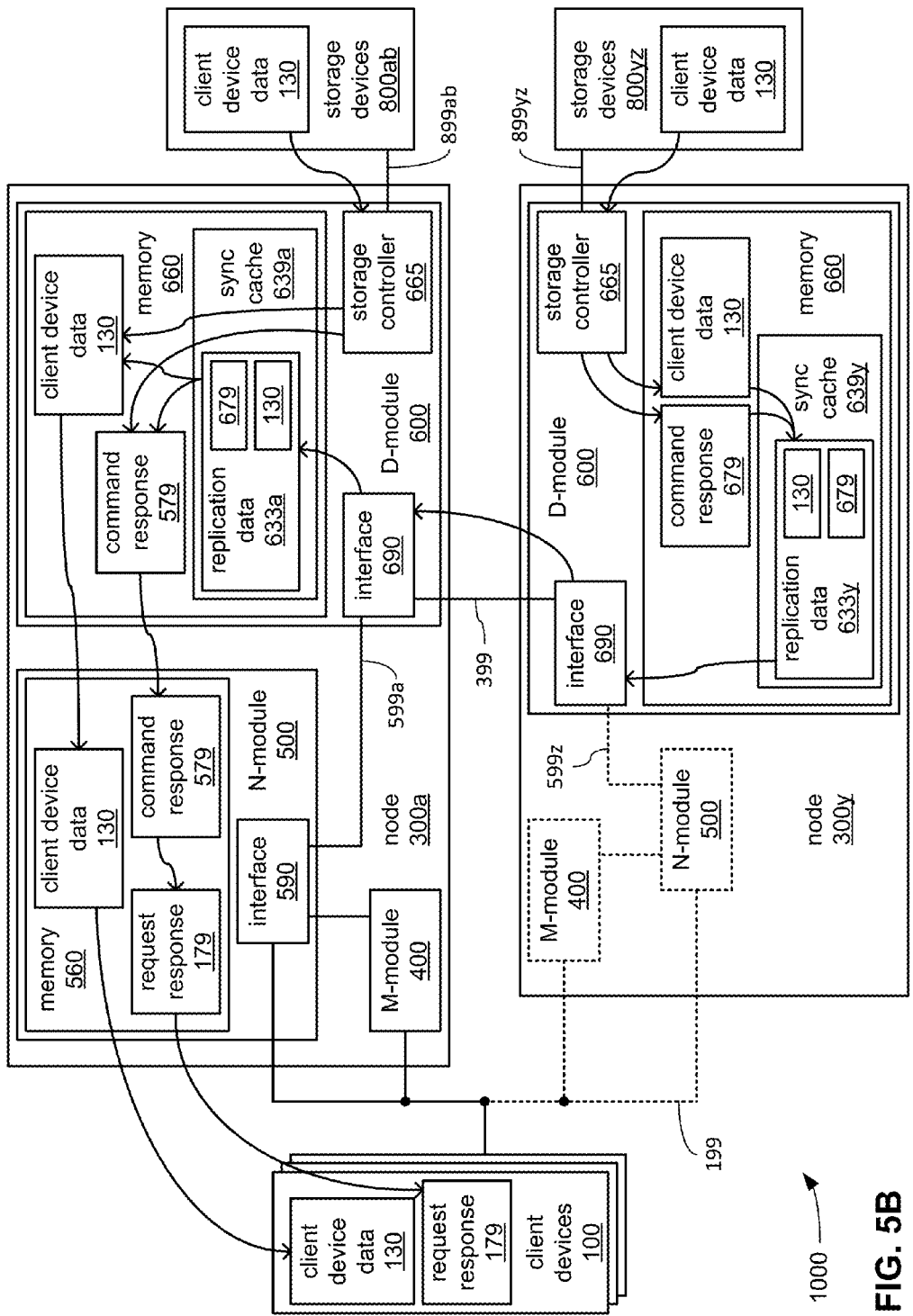
FIG. 5B illustrates an example embodiment of relaying responses to replicated commands between nodes.

FIGS. 5A and 5B both illustrate a block diagram of an example embodiment of the interconnections between active nodes 300*a* and 300*y* of the storage cluster system 1000 in greater detail. More specifically, FIG. 5A depicts aspects of replication and at least partial parallel performance of data access commands between the nodes 300*a* and 300*y* in greater detail. FIG. 5B depicts aspects of combining and relaying responses generated by such at least partial parallel performance by the nodes 300*a* and 300*y* in greater detail. As depicted in both FIGS. 5A and 5B, the node 300*a* may be active to engage in communications with a client device 100 and to perform data access commands altering the client device data 130 within the set of storage devices 800*ab*, while the node 300*y* may be active to engage in communications with the node 300*a* and to perform replica data access commands altering the client device 130 within the set of storage devices 800*yz* at least partly in parallel with the node 300*a*.

Turning to FIG. 5A, as previously discussed, the N-module 500 of the active node 300*a* may receive client device data 130 and/or storage service requests 170 from one of the client devices 100, which may then be temporarily stored within the memory 560. The storage service requests 170 to store and/or retrieve client device data 130 may then be translated into data access commands 570 to store and/or retrieve client device data 130, respectively. Following such translation and/or as such translation occurs, client device data 130 and/or storage service requests 170 may be relayed to the D-module 600 of the active node 300*a*, where the client device data 130 and/or the storage service requests 170 may then be temporarily stored within the memory 660 in preparation for being performed by the D-module 600 of the node 300*a*. However, in addition to such performance, the data access commands 570 may be replicated to generate corresponding replica data access commands 670 that may be stored within the synchronization cache 639*a* as a portion of replication data 633*a*. The replication data 633*a* may serve as a buffer of which the contents are transmitted on a recurring basis to the D-module 600 of the active node 300*y* via the interface 690 and the inter-cluster interconnect 399. Where the replica data access commands 670 include commands to store a piece of the client device data 130, such a piece may be stored within the synchronization cache 639*a* as another portion of the replication data 633*a* to be transmitted to the node 300*y* along with the replica data access commands 670.

Upon receipt via the interface 690 of the D-module 600 of the node 300*y*, the recurringly transmitted contents of the replication data 633*a* may be temporarily stored within the synchronization cache 639*y* as a portion of the replication data 633*y*. The received replica data access commands 670 and/or associated pieces of the client device data 130 may then be retrieved from the replication data 633*y* and temporarily stored elsewhere within the memory 660 in preparation for performance of the replica data access commands 670 by the D-module 600 of the node 300*y*. The D-module 600 of the node 300*y* then performs the replica data access commands 670 to store client device data 130 within and/or retrieve client device data 130 from the set of storage devices 800*yz* at least partly in parallel with the D-module 600 of the node 300*a* performing the data access commands 570 to similarly store client device data 130 within and/or retrieve client device data 130 from the set of storage devices 800*ab*.

Turning to FIG. 5B, as the replica data access commands 670 are performed by the D-module 600 of the node 300*y*, command responses 679 to the performances of those replica data access commands 670 may be generated and may be temporarily stored within the synchronization cache 639*y* as a portion of the replication data 633*y*. The command responses 679 may include one or more of indications of successful commencement and/or completion of performance of replica data access commands 670, and/or indications of failure occurring in attempts to perform replica data access commands 670. The replication data 633*y* may serve as a buffer of which the contents are transmitted on a recurring basis to the D-module 600 of the active node 300*a* via the interface 690 and the inter-cluster interconnect 399. Where the replica data access commands 670 include commands to retrieve a piece of the client device data 130, such a piece may be stored within the synchronization cache 639*y* as another portion of the replication data 633*y* to be transmitted back to the node 300*a* along with the command responses 679.

Upon receipt via the interface 690 of the D-module 600 of the node 300*a*, the recurringly transmitted contents of the replication data 633*y* may be temporarily stored within the synchronization cache 639*a* as a portion of the replication data 633*a*. The received command responses 679 and/or associated pieces of the client device data 130 may then be retrieved from the replication data 633*a* and temporarily stored elsewhere within the memory 660 in preparation for analysis alongside results of performance of the data access commands 570 by the D-module 600 of the node 300*a*. The D-module 600 of the node 300*a* then generates command responses 579 from such analysis and relays the command responses 579 and/or associated pieces of data 130 to the N-module 500 of the node 300*a* where one or both may be temporarily stored within the memory 560. The command responses 579 may then be translated into storage service request responses 179, and then the request responses 179 and/or associated pieces of client device data 130 may be transmitted back to one of the client devices 100.

The storage service request responses 179 may include a portion of the client device data 130 provided to one of the client devices 100 in response to a storage service request 170 to retrieve that portion of the client device data 130. Alternatively or additionally, the storage service request responses 179 may include the earlier described status indications indicating the status of performance of data access command(s) translated from a storage service request 170. Thus, it should be noted that a single storage service request 170 may beget more than one storage service request response 179. By way of example, a single storage service request 170 to retrieve a portion of the client device data 130 may be responded to with a first storage service request response 179 indicating that a retrial of performance is underway due to a short term failure, followed by a second storage service request response 179 that may include both a status indication of successful performance and the portion of the client device data 130 that was requested.

Figure 6:
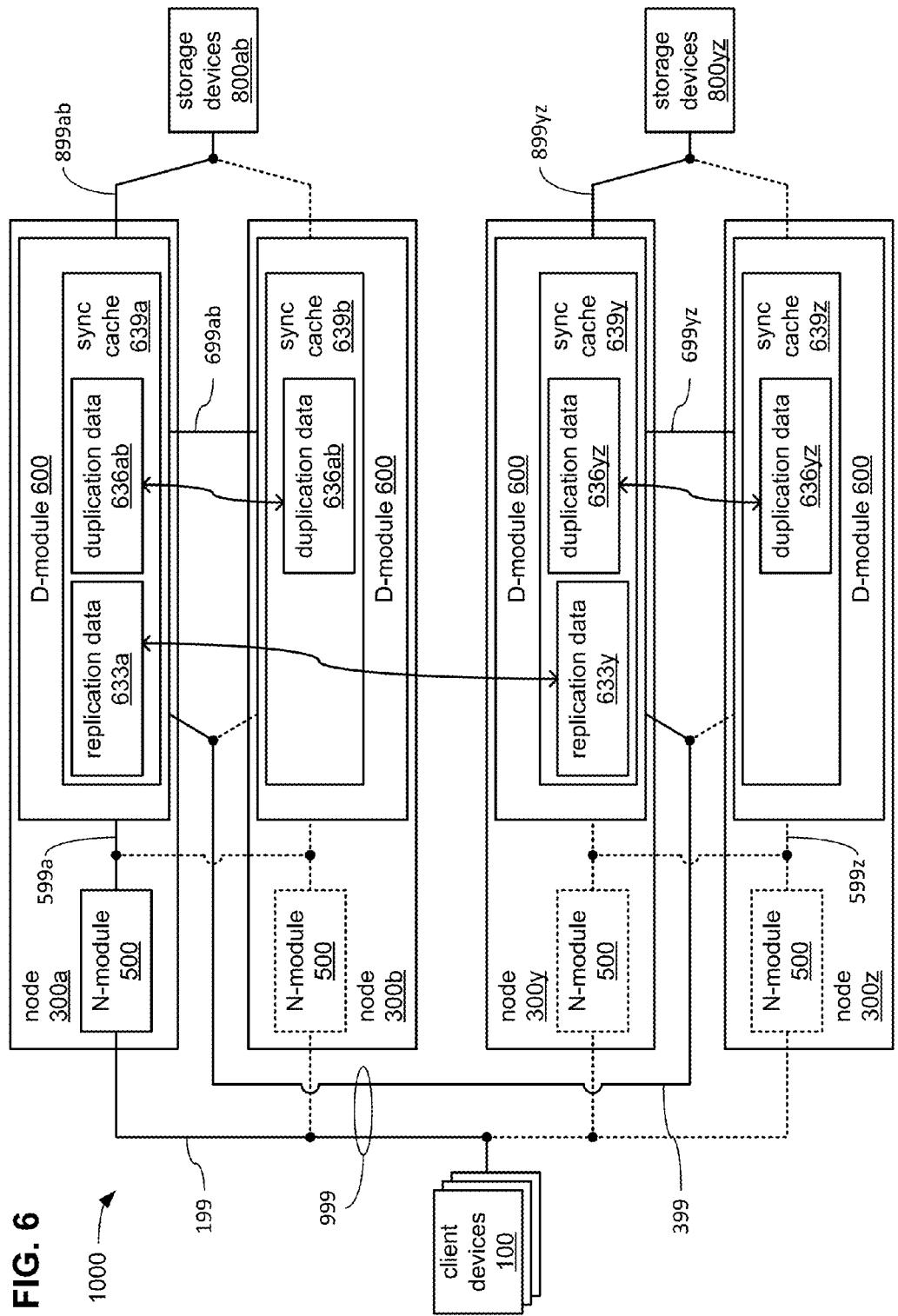
FIG. 6 illustrates an example embodiment of synchronization of commands and metadata among nodes.

FIG. 6 depicts an example embodiment of duplication of metadata within a HA group, and replication of data access commands relating to the client device data 130 between nodes of different HA groups in greater detail. As depicted, the node 300*a* may be active within the HA group 1600*ab* to communicate with the client devices 100 via the client interconnect 199 and with node 300*y*, which may be active within the HA group 1600*yz* to communicate with the node 300*a* via the inter-cluster interconnect 399. The nodes 300*b* and 300*z* may be inactive as each awaits the need to take over for the nodes 300*a* or 300*y*, respectively. The active state of the node 300*a* for communication with the client devices 100 such that the N-module 500 of the node 300*a* is in use to do so is indicated by the portions of the client interconnect 199 coupling the node 300*a* to the client devices 100 being drawn with solid lines, while portions for coupling the nodes 300*b* and 300*y-z* to the client interconnect 199 are drawn with dotted lines. The active states of both the nodes 300*a* and 300*y* for communication with each other are indicated by the portions of the inter-cluster interconnect 399 coupling the nodes 300*a* and 300*y* being drawn with solid lines, while portions for coupling the nodes 300*b* and 300*z* to the inter-cluster interconnect 399 are drawn with dotted lines.

As depicted, synchronization caches 639*a-b* and 639*y-z* may be formed within the memories 660 of the D-modules 600 of each of the nodes 300*a-b* and 300*y-z*, respectively, to enable the duplication of metadata and/or the replication of data access commands described above. As previously discussed, the synchronization caches 639*a* and 639*b* may both include the duplication data 636*ab* as part of enabling cooperation between the D-modules 600 of the partnered nodes 300*a* and 300*b* to exchange the metadata 630*ab*. However, the synchronization caches 639*a-b* and/or the duplication data 636*ab* may also be employed in exchanges of status occurring between the D-modules 600 of the nodes 300*a* and 300*b* as part of each monitoring the other for indications of failure that may necessitate a takeover of one of the nodes 300*a-b* by the other. The synchronization caches 639*a* and 639*b* may be operated in a manner in which they are functionally linked to provide a portal between the D-modules 600 of the nodes 300*a* and 300*b* that may be buffered at both ends of the HA interconnect 699*ab*. Indications of current status of these D-modules 600 and/or duplicates of versions of the metadata 630*ab* may be exchanged by writing such indications and/or metadata into the duplication data 636*ab* of one of the synchronization caches 639*a* or 639*b*, and retrieving such indications and/or pieces of metadata from the duplication data 636*ab* of the other of the synchronization caches 639*a* or 639*b*. Stated differently, the contents of the duplication data 636*ab* may be recurringly "synchronized" between the synchronization caches 639*a* and 639*b*.

As also previously discussed, the synchronization cache 639*y* may include replication data 633*y* as a counterpart to the replication data 633*a* within the synchronization cache 639*a* as part of cooperation between the D-modules 600 of the nodes 300*a* and 300*y* to perform data access commands and replicas thereof at least partially in parallel. The replication data 633*a* and 633*y* may buffer information conveyed between the D-modules 600 of the nodes 300*a* and 300*y* via the inter-cluster interconnect 399. More specifically, indications of current status of the replication of data access commands by the D-module 600 of the node 300*a*, current status of at least partial parallel performance of the replica data access commands by the D-module 600 of at least the node 300*y*, and/or current status of communications therebetween concerning the replica data access commands may be maintained as part of the replication data 633*a*. Alternatively or additionally, replica data access commands transmitted to the D-module 600 of the node 300*y*, portions of client device data 130 conveyed with those replica data access commands and/or in response to those replica data access commands may also be maintained as part of the replication data 633*a*. Correspondingly, the replica data access commands received by the D-module 600 of the node 300*y* via the inter-cluster interconnect 399 from the D-module 600 of the node 300*a* may be buffered within the replication data 633*y*, along with any client device data 130 that accompanies those replica data access commands and/or responses thereto. Indications of the current status of performance of those replica data access commands by the D-module 600 of the node 300*y* may also be buffered within the replication data 633*y* before being transmitted to the D-module 600 of the node 300*a*.

As further depicted, the synchronization caches 639*y* and 639*z* may include duplication data 636*yz* as part of enabling cooperation between the D-modules 600 of the partnered nodes 300*y* and 300*z* to exchange status indications and duplicates of metadata therebetween in much the same manner as described above between the D-modules 600 of the nodes 300*a* and 300*b*. Stated differently, the D-modules 600 of the nodes 300*y* and 300*z* may cooperate to recurringly exchange status indications (e.g., "heartbeat" signals and/or status of performing various operations) therebetween via the HA interconnect 699yz as part of each monitoring the other for indications of failure in a manner not unlike that in which the partnered nodes 300a and 300b exchange signals via the HA interconnect 699ab to monitor each other. Further, the D-module 600 of the active node 300y may transmit versions of metadata to the D-module of the inactive node 300z via the HA interconnect 699yz in a manner not unlike that in which the partnered nodes 300a and 300b exchange versions of metadata, in addition to storing such versions within the set of storage devices 800yz. It should be noted that the metadata used by and exchanged between the nodes 300y and 300z may be at least partly different from the metadata 630ab used by and exchanged between the nodes 300a and 300b. This may arise at least partly due to the nodes 300a-b and the nodes 300y-z belonging to different HA groups and/or belonging to different clusters.

Figure 7:
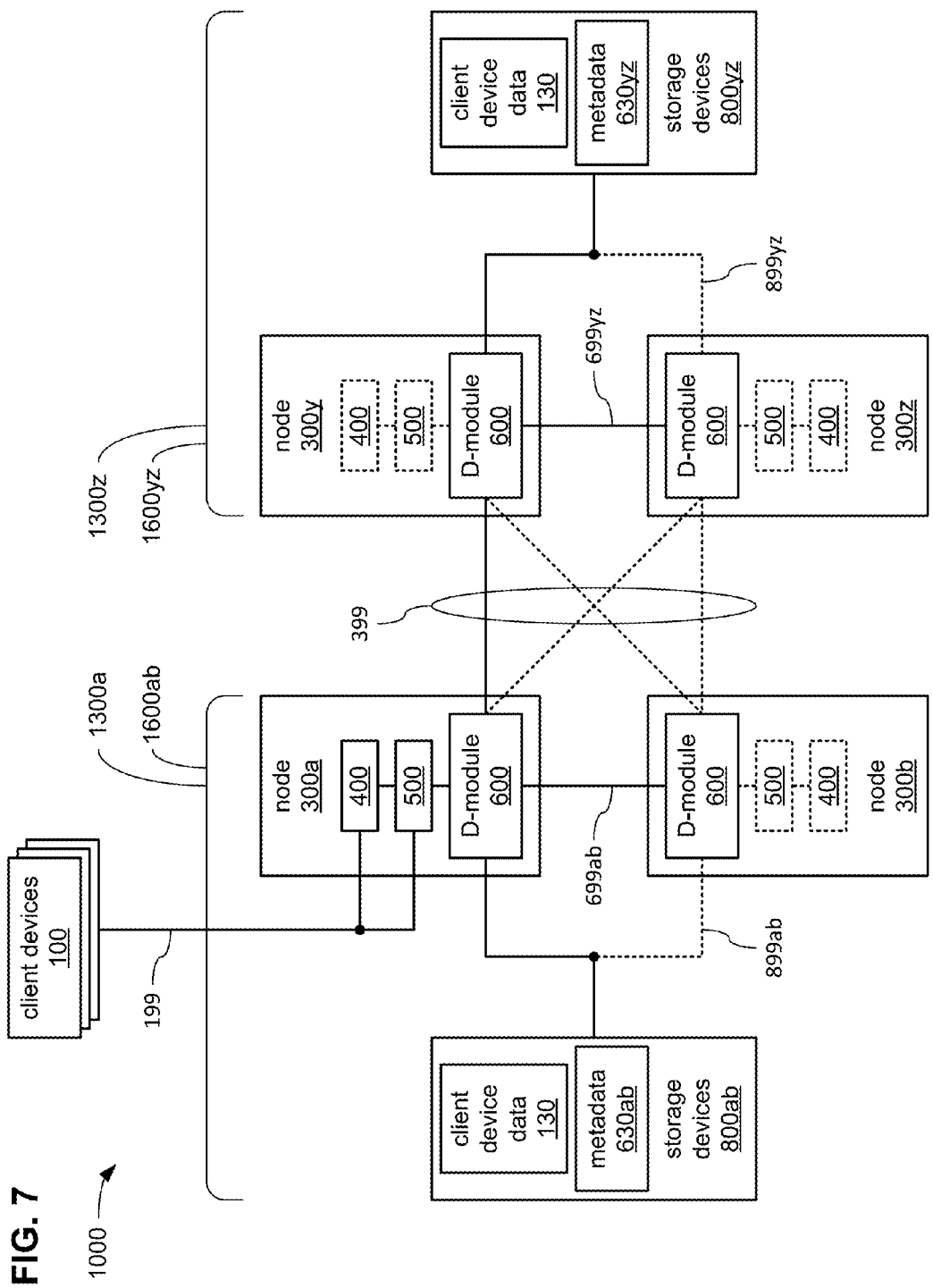
FIG. 7 illustrates an example embodiment of a mesh of communications sessions among nodes.

FIG. 7 depicts an example embodiment of a mesh of communications sessions formed among the nodes 300a-b and 300y-z through the inter-cluster interconnect 399 in greater detail. More specifically, through the inter-cluster interconnect 399, each of the nodes 300a and 300b of the HA group 1600ab forms a communications session with each of the nodes 300y and 300z of the HA group 1600yz, thereby forming the depicted mesh of communications sessions among the nodes 300a-b and 300y-z. As depicted, of these communications sessions, the communications session extending between the nodes 300a and 300y may be an active communications session (as indicated with a solid line), while the others of these communications sessions may be inactive communications sessions (as indicated with dotted lines). This reflects the fact that the nodes 300a and 300y, at least initially, are each the active nodes of the HA groups 1600ab and 1600yz, respectively, that engage in communications to exchange replica data access commands and associated data to enable at least partly parallel performance of data access commands between the HA groups 1600ab and 1600yz.

Thus, during normal operation of the storage cluster system 1000 in which the nodes 300a and 300y are active nodes and no errors occur within either of the nodes 300a or 300y, a request for storage services is received by the node 300a via the client interconnect 199 from one of the client devices 100. Following conversion of the storage services request into a data access command by the N-module 500 of the node 300a, the D-module 600 of the node 300a may both begin performance of the data access command and transmit a replica of that data access command to the node 300y via the active communications session formed through inter-cluster interconnect 399 between the nodes 300a and 300y. The D-module 600 of the node 300y may then perform the replica data access command at least partly in parallel with the performance of the data access command by the D-module 600 of the node 300a.

In preparation for such a transmission, the D-module 600 of the node 300a may cooperate with the D-module 600 of the node 300y to form the active communications session between the nodes 300a to 300y through an exchange of messages requesting and accepting formation of the active communications session. Following its formation, the D-modules 600 of the nodes 300a and 300y may cooperate to maintain the active communications session by recurring exchanges of test signals (e.g., test messages) therethrough to monitor the state of the active communications session.

In addition to the D-modules 600 of the nodes 300a and 300y cooperating to form and maintain the depicted active communications session through the inter-cluster interconnect 399 to support such exchanges of replica data access commands, the D-modules 600 of all of the nodes 300a-b and 300y-z may cooperate to form and maintain the depicted inactive communications sessions through the inter-cluster interconnect 399 in preparation for handling an error condition affecting one of the nodes 300a or 300y. More specifically, test signals (e.g., test messages) may be exchanged through one or more of the inactive communications sessions to monitor their state.

In the event of a failure of at least a portion of the node 300a, the node 300b may take over for the node 300a, and in so doing, may change the state of the inactive communications session extending between the D-modules 600 of the nodes 300b and 300y into an active communications session. By doing so, the node 300b becomes able to transmit replica data access commands to the node 300y in place of the node 300a. Correspondingly, in the event of a failure of at least a portion of the node 300y, the node 300z may take over for the node 300y, and in so doing, may change the state of the inactive communications session extending between the D-modules 600 of the nodes 300a and 300z into an active communications session. By doing so, the node 300z becomes able to receive and perform replica data access commands from the node 300a in place of the node 300y.

In various embodiments, each of the processor components 450, 550 and 650 may include any of a wide variety of commercially available processors. Also, one or more of these processor components may include multiple processors, a multi-threaded processor, a multi-core processor (whether the multiple cores coexist on the same or separate dies), and/or a multi processor architecture of some other variety by which multiple physically separate processors are in some way linked.

In various embodiments, each of the control routines 440, 540 and 640 may include one or more of an operating system, device drivers and/or application-level routines (e.g., so-called "software suites" provided on disc media, "applets" obtained from a remote server, etc.). As recognizable to those skilled in the art, each of the control routines 440, 540 and 640, including the components of which each may be composed, are selected to be operative on whatever type of processor or processors may be selected to implement applicable ones of the processor components 450, 550 or 650, or to be operative on whatever type of processor or processors may be selected to implement a shared processor component. In particular, where an operating system is included, the operating system may be any of a variety of available operating systems appropriate for corresponding ones of the processor components 450, 550 or 650, or appropriate for a shared processor component. Also, where one or more device drivers are included, those device drivers may provide support for any of a variety of other components, whether hardware or software components, of corresponding ones of the modules 400, 500 or 600.

In various embodiments, each of the memories 460, 560 and 660 may be based on any of a wide variety of information storage technologies, possibly including volatile technologies requiring the uninterrupted provision of electric power, and possibly including technologies entailing the use of machine-readable storage media that may or may not be removable. Thus, each of these memories may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these memories is depicted as a single block, one or more of these may include multiple storage devices that may be based on differing storage technologies. Thus, for example, one or more of each of these depicted memories may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these memories may be made up of multiple storage components based on identical storage technology, but which may be maintained separately as a result of specialization in use (e.g., some DRAM devices employed as a main memory while other DRAM devices employed as a distinct frame buffer of a graphics controller).

In various embodiments, the interfaces 490, 590 and 690 may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

As has been discussed in detail, redundancy in storing and accessing the client device data 130 may be provided by effecting at least partly parallel performance of data access operations between at least two nodes that belong to different HA groups of different clusters that may be geographically dispersed. As familiar to those skilled in the art, various challenges are presented in coordinating such performances occurring at geographically distant locations, including delays imposed in transmitting commands across a long distance. Further challenges may be imposed by the use of a network in such long distance transmissions, including receiving duplicates of the commands and/or receiving the commands in an order that differs from the order in which they were transmitted and/or from the order in which they are to be executed.

Figure 8A:
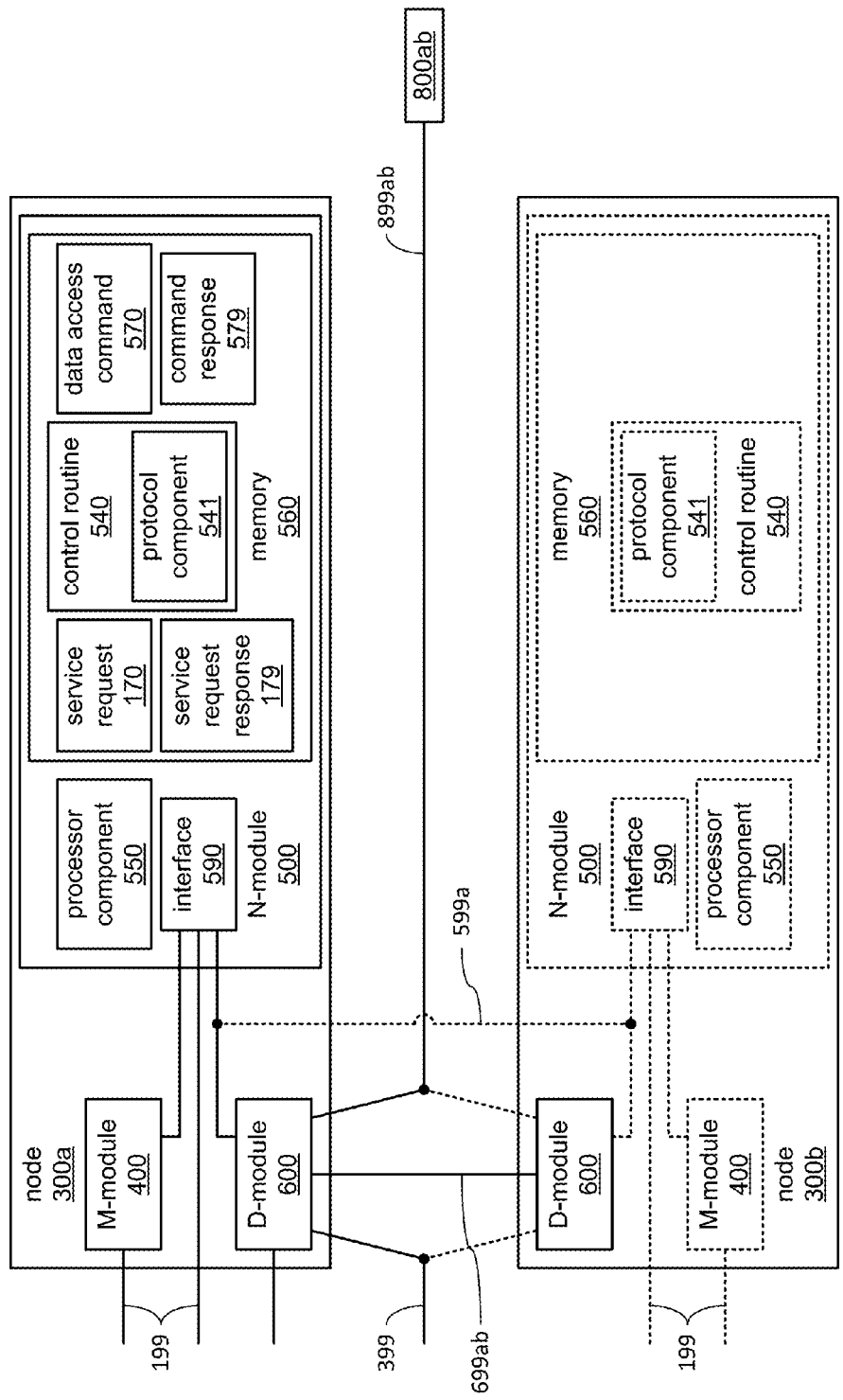
FIGS. 8A, 8B and 8C, together, illustrate an example embodiment of components of active and inactive nodes of different HA groups exchanging replica data access commands.
Figure 8B:
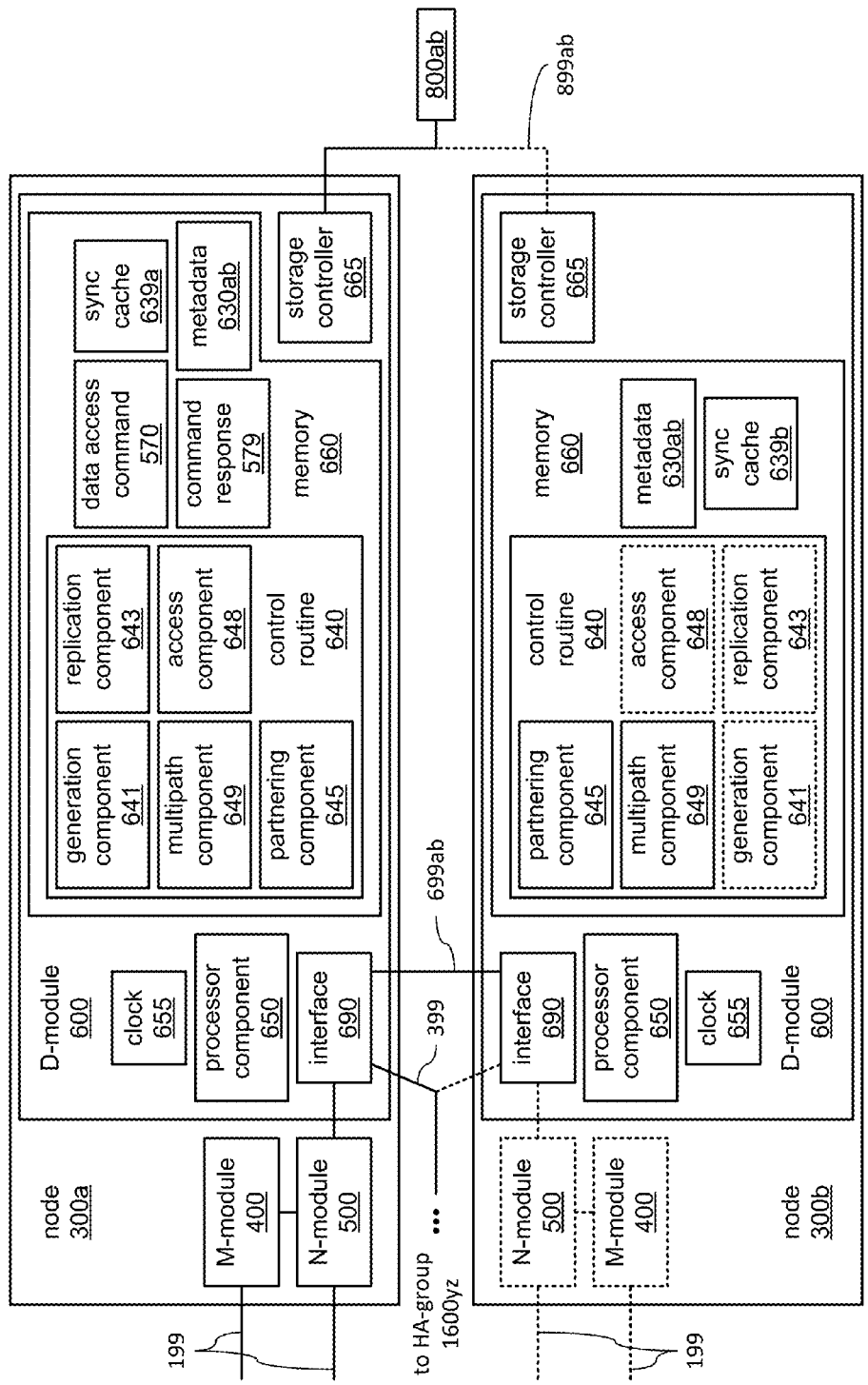
Figure 8C:
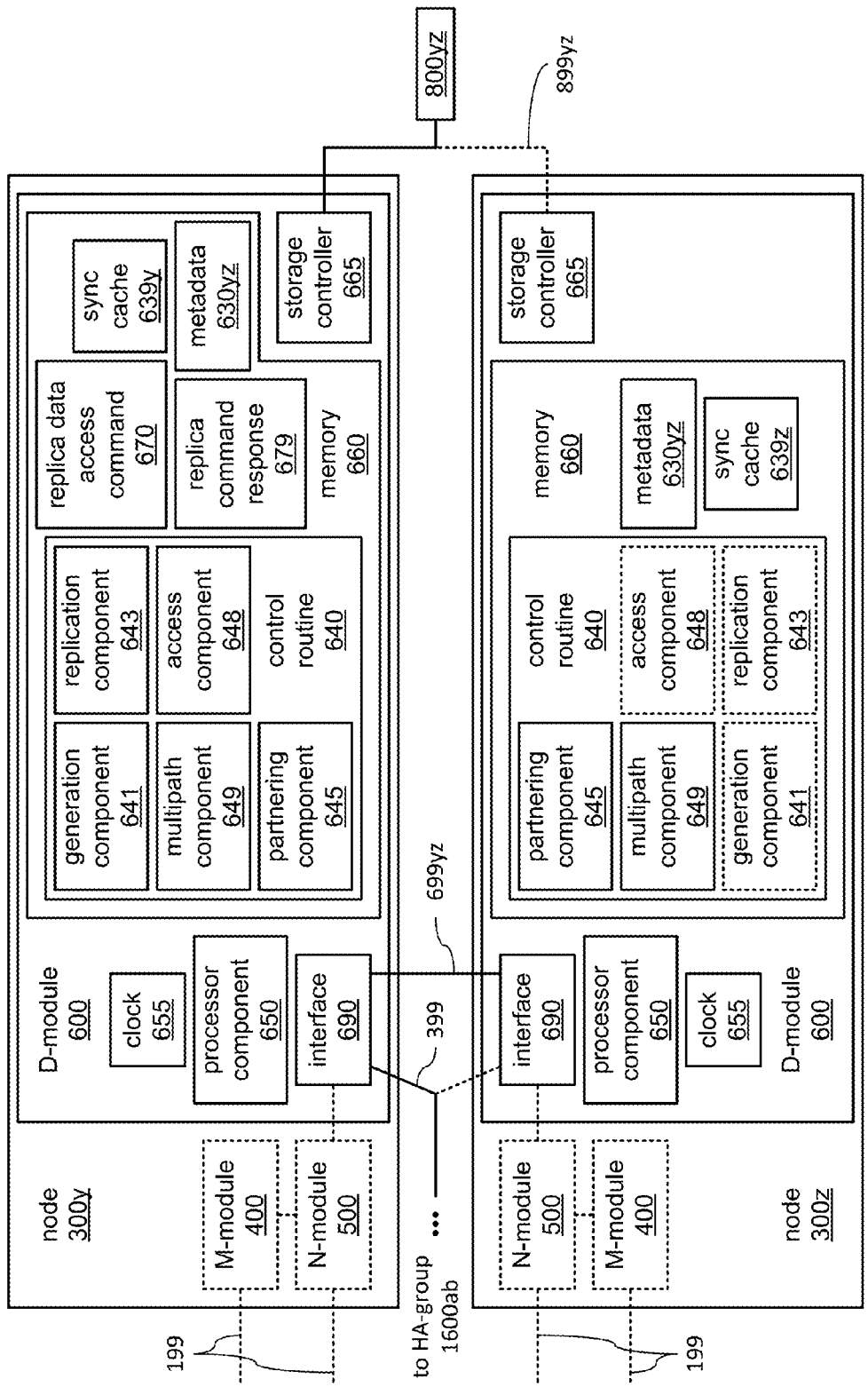

FIGS. 8A, 8B and 8C, together, illustrate example embodiments of the nodes 300a-b and 300y-z of the storage cluster system 1000 in greater detail. More specifically, FIG. 8A depicts components of N-modules 500 of the nodes 300a-b in greater detail, along with aspects of translating between protocols employed in communications with the client devices 100 and communications with a D-module 600. FIG. 8B depicts components of D-modules 600 of the nodes 300a-b in greater detail, along with aspects of performing and replicating data access commands 570. FIG. 8C depicts components of D-modules 600 of the nodes 300y-z in greater detail, along with aspects of performing replica data access commands 670. As depicted, the node 300a may be active within the HA group 1600ab to communicate with the client devices 100 via the client interconnect 199 and with node 300y, which may be active within the HA group 1600yz to communicate with the node 300a via the inter-cluster interconnect 399. The nodes 300b and 300z may be inactive as each awaits an indication of a need to take over for the nodes 300a or 300y, respectively.

Turning to FIG. 8A, as depicted, the control routine 540 within the N-module 500 of at least the node 300a may incorporate a protocol component 541. As depicted, the control routine 540 of the N-module 500 of the node 300b may also incorporate the protocol component 541, and though not specifically shown, the N-modules 500 of the nodes 300y-z may also each incorporate a control routine 540 that incorporates the protocol component 541. As previously discussed, as a result of the node 300a being active to engage in communications with one or more of the client devices 100, the processor component 550 of the N-module 500 of the node 300a may be active to execute the control routine 540 (as indicated with the N-module 500 of the node 300a being drawn with solid lines). In executing the control routine 540, the processor component 550 of the N-module 500 of at least the node 300a may execute the protocol component 541 of the control routine 540. However, as a result of the node 300b being inactive, the processor component 550 may not be active to execute the control routine 540 within the N-module of the node 300b (as indicated with the N-module 500 of the node 300b being drawn with dotted lines). However, if the node 300b takes over for the node 300a, then the control routine 540 within the node 300b may begin to be executed, while the control routine 540 within the node 300a may cease to be executed.

Within the N-module 500 of at least the node 300a, the protocol component 541 may be executable by the processor component 550 to convert protocols between the client interconnect 199 and the intra-cluster interconnect 599a. As has been discussed, various storage service requests 170 that may be received from one or more of the client devices 100 via the client interconnect 199 may include requests to store client device data 130 and/or to retrieve client device data 130. As also previously discussed, the protocols employed in communications with the client devices 100 may include file-based access protocols, including and not limited to, Common Internet File System (CIFS) protocol or Network File System (NFS) protocol, over TCP/IP. Alternatively or additionally, the protocols employed in communications with the client devices 100 may include block-based access protocols, including and not limited to, Small Computer Systems Interface (SCSI) protocol encapsulated over TCP (iSCSI) and/or SCSI encapsulated over Fibre Channel (FCP). Again, the use of one or more of these protocols may reflect the use of a client/server model for the handling of client device data 130 between the client devices 100 and the nodes 300a-d and/or 300y-z.

More specifically, the protocol component 541 may translate storage service requests 170 received from the client devices 100 via the client interconnect 199 into data access commands 570 to provide the requested storage services, before operating the interface 590 to relay those data access commands 570 to a D-module 600 via the interconnect 599a. The protocol component 541 may also convert command responses 579 received from a D-module 600 into an appropriate protocol for responding to a request for storage services, before operating the interface 590 to relay those storage services request responses 179 to one or more of the client devices 100 via the client interconnect 199. The protocol component 541 may further convert the protocols employed in conveying pieces of the client device data 130 as the protocol component 541 relays the pieces of the client device data 130 between the client interconnect 199 and the intra-cluster interconnect 599a.

Turning to FIGS. 8B and 8C, as depicted, the control routine 640 within the D-modules 600 of each of the nodes 300a-b and 300y-z may incorporate one or more of a generation component 641, a replication component 643, a partnering component 645, an access component 648 and a multipath component 649. In executing the control routine 640, the processor component 650 of each of these D-modules 600 may execute one or more of the components 641, 643, 645, 648 or 649 of the control routine 640. However, just as there may be differences in the portions of the control routine 640 that are executed by the processor component 650 in an active node versus an inactive node, there may also be differences in portions of the control routine 640 that are executed by the processor component 650 in a node that is active to perform data access commands 570 versus a node that is active to perform replica data access commands 670. More specifically, the processor component 650 of the D-module 600 of the active node 300a may execute one or more of the components 641, 643, 645, 648 and 649 (drawn with solid lines). The processor component 650 of the D-module 600 of the active node 300y may also execute one or more of the components 641, 643, 645, 648 and 649, but as will be more fully explained, the processor components 650 of the D-modules 600 of the active nodes 300a and 300y may execute different subparts of one or more of these components. Further, the processor component 650 of the D-module 600 of the inactive nodes 300b and 300z may execute one or more of the components 645 and 649 (drawn with solid lines), but may refrain from executing the components 641, 643 and 648 (drawn with dotted lines).

Within the D-module 600 of at least the active node 300a, the generation component 641 may generate versions of the metadata 630ab from metadata portions received from the M-module 400 and/or the N-module 500 of the node 300a as has been described. As has been previously discussed, the metadata 630ab may include both immutable metadata 631ab and mutable metadata 632ab. Again, the information selected for inclusion in the metadata 630ab as mutable metadata 632ab may be deemed likely to change more frequently than the information selected for inclusion within the metadata 630ab as immutable metadata 631ab. Thus, the mutable metadata 632ab may include indications of addresses at which one or more of the nodes 300a-d and/or 300y-z (or at which various components thereof) may be accessible on one or more of the interconnects 199, 399, 599a, 599z, 699ab, 699cd and 699yz. The immutable metadata 631ab may include indications of which of the nodes 300a-d and/or 300y-z are partnered into HA groups (e.g., one of the HA groups 1600ab, 1600cd or 1600yz), or which of the nodes 300a-d and/or 300y-z belong to which of one or more clusters (e.g., one of the clusters 1300a or 1300z). Alternatively or additionally, the immutable metadata 631ab may include indications of what RAID level, what file system is used in storing data within one or more of the sets of storage devices 800ab, 800cd or 800yz, and/or an order of succession by which each inactive node takes over in a HA group made up of more than two nodes.

As has also been discussed, the generation component 641 may request updated metadata portions from one or both of the M-module 400 and/or the N-module 500 of the node 300a as needed to update portions of the immutable metadata 631ab and/or the mutable metadata 632ab making up the metadata 630ab in response to unsuccessful attempts to use the metadata 630ab as retrieved from the set of storage devices 800ab following a rebooting of at least the D-module 600 of the node 300a. Correspondingly, within the D-module 600 of at least the active node 300y, the generation component 641 may generate versions of the metadata 630yz from portions of metadata received from the M-module 400 and/or the N-module 500 of the node 300y. However, in some embodiments, the generation component 641 within the node 300a may transmit a portion of the metadata 630ab via the inter-cluster interconnect 399 to the node 300y for use as another metadata portion by the generation component 641 within the node 300y in generating the metadata 630yz. Further, the generation component 641 within the node 300y may request updated portions of metadata from one or both of the M-module 400 and/or the N-module 500 of the node 300y as needed to update mutable and/or immutable portions of the metadata 630yz in response to unsuccessful attempts to use the metadata 630yz as retrieved from the set of storage devices 800yz following a rebooting of at least the D-module 600 of the node 300y.

Within the D-modules 600 of at least the active nodes 300a and 300y, the access component 648 may operate the storage controller 665 to perform various data access operations on client device data 130 stored within the sets of storage devices 800ab and 800yz, respectively. More specifically, within the node 300a, the access component 648 may perform the data access commands 570 translated from the storage service requests 170 and provided by the N-module 500 of the node 300a. Correspondingly, within the node 300y, the access component 648 may perform the replica data access commands 670 generated by the D-module 600 of the node 300a by replicating the data access commands 570, and provided to the node 300y via the inter-cluster interconnect 399. As previously discussed, the performances of the data access commands 570 and the replica data access commands 670 derived therefrom may occur at least partly in parallel.

The access component 648 may operate the storage controller 665 to recurringly perform tests on a set of storage devices to which the controller 665 may be coupled via a storage interconnect (e.g., the set of storage devices 800ab or 800yz via the storage interconnect 899ab or 899yz, respectively), and/or may monitor the results of performing previous data access commands 570 or replica data access commands 670 to determine whether an error condition exists. The access component 648 may employ the results of such tests and/or of performing previous data access commands 570 or replica data access commands 670 to determine whether to provide an indication to one or more other components of the D-module 600 of successfully accepting and/or performing data access commands 570 or replica data access commands 670. By way of example, the access component 648 may condition providing an indication of successfully accepting a data access command 570 or replica data access command 670 on whether an error was encountered in performing or commencing performance of an earlier data access command 570 or replica data access command 670, respectively.

Where two or more nodes of a HA group share a coupling to a set of storage devices (e.g., the nodes 300a-b sharing the set of storage devices 800ab via the storage interconnect 899ab, or the nodes 300y-z sharing the set of storage devices 800yz via the storage interconnect 899yz), the access components 648 of D-modules 600 of each of those partnered nodes may cooperate to coordinate which node has access to and control over that set of storage devices at any given time. It may be that access to a set of storage devices is to be provided only to whichever node of a HA group is currently active, while the one or more partners of that node in that HA group that are inactive do not have access until one of those partner(s) takes over for the active node. When such a take over occurs, the access components 648 of the node to be taken over from and the node that does the taking over may cooperate to transfer access to that set of storage devices from one to the other.

The control routine 640 within the D-modules 600 of each of the nodes 300a-b and 300y-z may include a partnering component 645 that may be executable by the processor component 650 to cooperate with counterpart ones of the partnering component 645 of each partnered one of these nodes to monitor the status of other partner(s) and to effect a takeover of at least an active partner in response to a failure. More specifically, while the active node 300a engages in communications with client devices 100 and with the active node 300y, the partnering components 645 within the node 300a and the inactive node 300b cooperate to enable at least the status of the node 300a to be recurringly monitored for an indication of failure within the node 300a that may trigger a takeover by the node 300b. Correspondingly, while the active node 300y engages in communications with the active node 300a, the partnering components 645 within the node 300y and the inactive node 300z cooperate to enable at least the status of the node 300y to be recurringly monitored for an indication of failure within the node 300y that may trigger a takeover by the node 300z.

In some embodiments, the cooperation between the partnering components 645 of active and inactive nodes within a HA group may entail recurring exchanges of signals therebetween to enable only the monitoring of the state of the active node by inactive node(s) of each HA group. In other embodiments, such cooperation may entail recurring exchanges of signals therebetween to enable mutual monitoring between active and inactive nodes of a HA group, although a failure occurring within an inactive node may not trigger a takeover as a failure within an active node might. Thus, the partnering component 645 of D-modules 600 of each of the nodes 300a-b may operate corresponding interfaces 690 to exchange indications of the current state of each of the nodes 300a-b on a recurring basis via the HA interconnect 699ab. Correspondingly, the partnering component 645 of D-modules 600 of each of the nodes 300y-z may operate corresponding interfaces 690 to exchange indications of the current state of each of the nodes 300y-z on a recurring basis via the HA interconnect 699yz.

Again, such recurring exchanges may include a "heartbeat" signal transmitted among partnered nodes of a HA group via a HA interconnect extending thereamong. Alternatively or additionally, such exchanges may include indications of the status of performance of a data access command 570, a replica data access command 670 and/or another operation. As yet another alternative, such exchanges may include indications of addresses at which each of the D-modules 600 of the nodes of a HA group are accessible on an intra-cluster interconnect (e.g., the intra-cluster interconnect 599a or 599z) and/or a HA interconnect (e.g., the HA interconnect 699ab or 699yz). The partnering component 645 within at least an active node of a HA group may convey such received indications and/or updates thereto to the generation component 641 within that node for use in generating and/or updating metadata. Further the generating component 641 within an active node may cooperate with the partnering component 645 within that node to convey metadata and/or updates thereto to inactive node(s) of the same HA group.

Absence of receipt of a heartbeat signal and/or other indication within an expected period of time by one of the nodes of a HA group from a partner via a HA interconnect may be taken as an indication of a failure having occurred in that partner. Alternatively or additionally, where a failure has occurred within a node of a HA group, the partnering component 645 of that failing node may transmit an explicit indication of that failure and/or a description of that failure to a non-failing partner. Regardless of the exact form of an indication of a failure within an active one of partnered nodes of a HA group, the partnering component 645 within an inactive partner of the failing active node may take action in response to the indication to effect a takeover of the failing active node by that inactive partner. In contrast, if failure is indicated as occurring within an inactive node of a HA group, there may be no take over performed in response, since inactive nodes, by definition, are not engaged in communications or in performing data access commands that must be taken over by a partner. However, within an active node receiving an indication of a failure within an inactive node of the same HA group in which there are multiple inactive nodes, the partnering component 645 may cooperate with the generating component 641 to update metadata to specify a different inactive node of that HA group to take over for that active node in response to a failure within that active node.

In response to an indication failure in an active node of a HA group, the partnering component 645 within an inactive node of that HA group may signal other components within the D-module 600 and/or signal the N-module 500 of that inactive node to take action to effect a takeover of the failing active node. Thus, an indication of failure within one of the active nodes 300a or 300y may trigger the partnering component 645 within a corresponding one of the inactive nodes 300b and 300z to signal such other components and/or a N-module 500 to take action to effect a takeover. In the case of a failure within the node 300a, such action may include taking over communications with the client devices 100 via the client interconnect 199, taking over performance of the data access commands 570 and/or taking over control of the set of storage devices 800ab through the storage interconnect 899ab. In the case of failure within the node 300y, such action may include taking over communications with the active node 300a via the inter-cluster interconnect 399, taking over performance of replica data access commands 670 and/or taking over control of the set of storage devices 800yz through the storage interconnect 899yz.

The control routine 640 within the D-modules 600 of an active node of each of two different HA groups and/or of two different clusters may include a multipath component 649 that may be executable by a processor component 650 in each of those active nodes to cooperate to form and maintain a mesh of communications sessions among those two nodes and their partners to better support a take over of one of those two nodes in response to a failure. As previously discussed, the inter-cluster interconnect 399 may be implemented as a network coupling D-modules 600 of multiple nodes to enable active ones of those nodes to exchange replica data access commands and/or responses thereto. As also previously discussed, a failure occurring within an active node may cause a change in which node of a HA group is the active node that engages in communications and/or performs data access commands (or replicas thereof). As a result, which node of one HA group generates and transmits replica data access commands may change and/or which node of another HA group that receives and performs the replica data access commands may change.

More specifically, in support of exchanges of replica data access commands 670 between the active nodes 300a and 300y, the multipath components 649 of the D-modules 600 of each of the nodes 300a and 300y may cooperate to form an active communications session therebetween through the inter-cluster interconnect 399. In so doing, the multipath component 649 of the node 300a may retrieve an indication from the metadata 630ab of the node 300y currently being the active node to which the node 300a is to transmit replica data access commands 670 via the inter-cluster interconnect 399. Correspondingly, the multipath component 649 of the node 300y may retrieve an indication from the metadata 630yz of the node 300a currently being the active node from which to receive the replica access commands 670 via the inter-cluster interconnect 399. Thus, the multipath components 649 within each of the active nodes 300a and 300y may retrieve a portion of metadata to obtain an indication of what other active node each is to form an active communications session with for the exchange of the replica data access commands 670. In some embodiments, those indications may include addresses at which the D-modules 600 of each of the nodes 300a and 300y are accessible on the inter-cluster interconnect 399. The multipath component 649 of at least one of the nodes 300a and 300y may then employ such retrieved information concerning the other to exchange messages with the D-module 600 of the other through the inter-cluster interconnect 399 to request and accept formation of the active communications session therebetween.

With the active communications session thereby formed between the D-modules 600 of the nodes 300a and 300y through the inter-cluster interconnect 399, the multipath components 649 of each of those D-modules 600 may then exchange indications of addresses of D-modules 600 of other nodes that are inactive partners of the nodes 300a and 300y through that active communications session. Presuming the partners of nodes 300a and 300y are the inactive nodes 300b and 300z, respectively, then the multipath component 649 of the node 300a transmits an indication of an address of the D-module 600 of the node 300b to the node 300y, and the multipath component 649 of the node 300y transmits an indication of an address of the D-module 600 of the node 300z to the node 300a. Once supplied with an address of the D-module 600 of the node 300z on the inter-cluster interconnect 399, the multipath component 649 of the node 300a may form an inactive communications session between the D-modules 600 of the nodes 300a and 300z through the inter-cluster interconnect 399. Correspondingly, once supplied with an address of the D-module 600 of the node 300b on the inter-cluster interconnect 399, the multipath component 649 of the node 300y may form an inactive communications session between the D-modules 600 of the nodes 300y and 300b through the inter-cluster interconnect 399. The formation of such inactive communications sessions may or may not entail an exchange of messages through the inter-cluster interconnect 399 to request and accept their formation.

With these active and inactive communications sessions formed through the inter-cluster interconnect 399, the multipath components 649 of at least the nodes 300a and 300y may continue to cooperate to at least monitor the status of each of these communications sessions. Such monitoring may entail exchanges of test signals through at least the active communications session formed between the nodes 300a and 300y. Such test signals may be exchanged therebetween either in lieu of in addition to exchanges of replica data access commands 670 and/or replica command responses 679 to the replica data access commands 670. By way of example, where an exchange of a replica data access command 670 and/or a replica command response 679 thereto has not occurred through the active communications session between the nodes 300a and 300y within a specified interval of time, one or both of the multipath components 649 of the nodes 300a and 300y may transmit a test signal (e.g., transmit a test message) through that active communications session to the other to check the status of that active communications session. The multipath components 649 of the nodes 300a and 300y may or may not also transmit test signals through the inactive communications sessions between the nodes 300a and 300z, and/or between the nodes 300y and 300b to check the status of those inactive communications sessions. In embodiments in which there are exchanges of test signals (e.g., test messages) through inactive communications sessions, such exchanges may occur less frequently than the exchanges of test signals through the active communications session. By way of example, exchanges of test signals through inactive communications sessions may occur in response to a circumstance in which an inactive communications session may be deemed at least likely to become active, such as when a possibility arises of retrying an exchange of replica data access commands 670 with an inactive node after failure has occurred in attempting such an exchange with an active node. Where at least the active communications session between the active nodes 300a and 300y is lost due to a change in the address at which one of the nodes 300a or 300y is accessible on the inter-cluster interconnect 399, one or both of the multipath components 649 of the nodes 300a and 300y may update corresponding ones of the metadata 630ab and 630yz with an indication of the changed address.

The multipath component 649 of the node 300a and/or 300y (or of the partner node 300b and/or 300z) may change the state of one or more of the communications sessions formed among the nodes 300a-b and 300y-z through the inter-cluster interconnect 399 in response to a failure in one of the active nodes 300a or 300y. By way of example, where one of the active nodes 300a or 300y is taken over by one of the partner nodes 300b or 300z, respectively, at least the multipath component 649 of the other of the active nodes 300a and 300y may respond by changing the state of the active communications session between the nodes 300a and 300y to an inactive state. Further, where the node 300a is taken over by the node 300b, the multipath component 649 of the node 300y and/or of the node 300b may act to make the communications session between the nodes 300b and 300y active. Correspondingly, where the node 300y is taken over by the node 300z, the multipath component 649 of the node 300a and/or of the node 300z may act to make the communications session between the nodes 300a and 300z active. The change of an inactive communications session into an active communications session may entail an exchange of messages between the nodes coupled through that inactive communications session to agree to make that inactive communications session active. As previously discussed, where an active node is taken over by an inactive partner of that active node, metadata associated with those nodes may be updated to indicate the change in which of those two nodes is now the active node.

By way of another example, where the node 300a initially transmits a replica data access command 670 to the node 300y to be performed, but then retries the replica data access command 670 with the node 300z as a result of a failure in the node 300y, the multipath component 649 of the node 300a may change the state of the communications session between the nodes 300a and 300y from active to inactive, and may change the state of the communications session between the nodes 300a and 300z from inactive to active. Such a change in which of the nodes 300y-z is the node to which the node 300a transmits replica data access commands may either trigger or reflect a takeover of the node 300y by the node 300z, and as previously discussed, the metadata 630ab and/or 630yz may be updated to indicate that the node 300z is now the active node to which replica data access commands 670 are to be transmitted to be performed.

The control routine 640 may include a replication component 643 that may be executable by the processor component 650 within one active node to both control performance of and replicate data access commands 570 received by a D-module 600 from a N-module 500, and to transmit the resulting replica data access commands 670 to a D-module 600 of another active node of a different HA group and/or different cluster. Within the other active node, the replication component 643 may be executable by the processor component 650 to receive and control performance of the replica data access commands 670 to cause such performance to occur at least partly in parallel with the performance of the data access commands 570. Thus, the replication components 643 of D-modules 600 of two active nodes, one of which may be in communication with one of the client devices 100, cooperate via the inter-cluster interconnect 399 to coordinate replication and at least partially parallel performance of data access commands 570 and replica data access components 670 between those two D-modules 600.

More specifically, the replication component 643 of the D-module 600 of the node 300a replicates data access commands 570 received from the N-module 500 of the node 300a and transmits the resulting replica data access commands 670 to the D-module 600 of the node 300y via the inter-cluster interconnect 399, while also relaying the original data access commands 570 to the access component 648 within the D-module 600 of the node 300a to be performed. In contrast, the replication component 643 of the D-module 600 of the node 300y does not perform such replication, and instead, relays the replica data access commands 670 received from the D-module 600 of the node 300a to the access component 648 within the D-module 600 of the node 300y to be performed at least partly in parallel with the performance of the data access commands 570 by the access component 648 within the node 300a.

In some embodiments, the replication component 643 of the D-module 600 of the node 300a may condition the replication of a data access command 570 and/or the transmission of the resulting replica data access command 670 to the node 300y on whether the access component 648 has detected a failure in an earlier access made to the set of storage devices 800ab such that the access component 648 does not accept the data access command 570. As previously discussed, the access component 648 of a D-module 600 of an active node may perform various tests of a set of storage devices to which that active node is coupled and/or may monitor the results of the performance of data access commands 570, replica data access commands 670 and/or other operations on that set of storage devices to determine whether an error condition precluding the performance of subsequent data access commands 570 or replica data access commands 670 exists. As a result of such testing and/or of such monitoring of prior performances, the access component 648 may be ready to provide or may have already provided an indication of an earlier-detected failure in accessing the set of storage devices 800ab to the replication component 643.

Thus, in such embodiments, the replication component 643 of the D-module 600 of the node 300a may refrain from replicating a data access command 570 and/or transmitting the resulting replica data access command 670 to the node 300y in response to an indication from the access component 648 of at least an earlier long term failure. Such a long term failure may be such that the node 300a cannot resolve it within a relatively short period of time (e.g., within a fraction of a second and/or within less than a minute) and/or may be such that intervention by trained personnel is required (e.g., failure of the storage controller 665 such that a portion of the node 300a must be physically repaired or replaced). In such a situation, it may be deemed desirable to not cause the node 300y to perform a replica data access command 670 that corresponds to a data access command 570 that cannot be performed by the node 300a for at least a relatively long period of time. Thus, in such a situation, the replication component 643 of the D-module 600 of the node 300a may respond to an indication of such a long term failure having been earlier detected by the access component 648 within that D-module by generating and relaying a command response 579 to the N-module 500 of the node 300a that includes an indication of failure of performance of that data access command 570. That N-module 500 may then translate such a command response 579 into a service request response 179 that conveys an indication of failure in performing the storage service request 170 from which the data access command 570 was translated, and that N-module 500 may transmit that service request response 179 back to the one of the client devices 100 from which the storage service request 170 was earlier received by that N-module 500. Further, in this situation, the replication component 643 of the D-module 600 of the node 300a may cooperate with the partnering component 645 to provide an indication of the detected long term failure within the node 300a to the inactive node 300b to trigger the node 300b to take over for the node 300a. Causing such a takeover by the node 300b may enable the node 300b to become the active node that receives and acts upon a subsequent retrial of the storage service request 170 when the client device 100 from which it was originally received transmits that storage service request 170, again, in an effort to retry its performance.

Alternatively, in such embodiments, the replication component 643 of the D-module 600 of the node 300a may proceed with replicating a data access command 570 and/or transmitting the resulting replica data access command 670 to the node 300y in response to an indication from the access component 648 of a short term failure, rather than a long term failure. Such a short term failure may be a relatively benign situation that the node 300a is able to resolve within a relatively short period of time (e.g., within a fraction of a second and/or within less than a minute) and without the intervention of personnel (e.g., the set of storage devices 800ab currently being busy completing an earlier operation). In such a situation, there may be an expectation that performance of the data access command 570 by the access component 648 within the node 300a will only be delayed for the relatively short term, but that the data access command 570 will be successfully performed. Thus, in response to such an indication of an earlier detected short term failure by the access component 648 within the node 300a, the replication component 643 within the node 300a may retry relaying the data access command 570 to the access component 648 one or more times until that access component 648 indicates successful acceptance of it. Depending upon how much time and/or how many attempts at retrying the data access command 570 are required, the replication component 643 of the D-module 600 of the node 300a may respond to an indication of such a short term failure having been earlier detected by the access component 648 within that D-module by initially generating and relaying a command response 579 to the N-module 500 of the node 300a that includes an indication of retrial of the data access command 570. The replication component 643 may subsequently generate and relay another command response 579 to the N-module 500 that includes an indication of success in performing the data access command 570, presuming that such a retrial does result in a successful performance of the data access command 570 by the node 300a, and presuming that the node 300y successfully performs the replica data access command 670. The N-module 500 may translate such command response(s) 579 into a service request response(s) 179 that conveys such an indication of retrial and/or success in performing the storage service request 170 from which the data access command 570 was translated, and the N-module 500 may transmit the service request response(s) 179 back to the one of the client devices 100 from which the storage service request 170 was earlier received by that N-module 500.

In other embodiments, the replication component 643 may delay transmitting a replica data access command 670 to the node 300y until provided with an indication of success in commencing performance of the data access command 570 by the access component 648 (after successfully accepting the data access command 570). Again, the access component 648 may provide an indication of successful acceptance of a data access command 570 in response to there currently being no known failure in the access component 648 performing operations on the set of storage devices 800ab or in response to a short term failure having been resolved. Following successfully accepting a data access command 570, the access component 648 may provide an indication of success in commencing performance of that data access command 570 to the replication component 643 in response to being able to successfully access a portion of the storage space associated with that data access command 570 within the set of storage devices 800ab as part of commencing performance of that data access command 570. Use of successful commencement of performance of the data access command 570 as a condition to transmitting the replica data access command 670 to the node 300y may be based on a presumption that successful completion of performance of a data access command 570 is far more likely to occur if its performance is at least able to be successfully commenced.

Thus, in such other embodiments, the replication component 643 within the node 300a may delay transmitting a replica data access command 670 to the node 300y until it receives an indication of successful commencement of performance of the corresponding data access command 570 from the access component 648 within the node 300a. The replication component 643 may also transmit the replica data access command 670 to the node 300y in response to receiving an indication of a short term failure in attempting to commence performance the corresponding data access command 570 from the access component 648. As before, this may be based on a presumption that a short term failure is a benign situation in which the data access command 570 will ultimately be performed. Again, depending on the time required for the data access command 570 to be successfully performed and/or the number of retrials of the data access command 570 to cause such successful performance, the replication component 643 may cause an indication of retrial of the corresponding storage service request 170 to be transmitted back to a client device 100. Also, presuming that such a retrial results in a successful performance of the data access command 570 by the node 300a, and presuming that the node 300y successfully performs the replica data access command 670, the replication component 643 within the node 300a may cause an indication of successful performance of the corresponding storage service request 170 to be transmitted back to the same client device 100.

However, in such other embodiments, where the replication component 643 within the node 300a receives an indication of a long term failure arising from an attempt at commencing performance of a data access command 570 by the access component 648 within the node 300a, the replication component 643 may entirely refrain from transmitting a corresponding replica data access command 670 to the node 300y. Further, the replication component 643 may cause an indication of failure in the performance of the corresponding storage service request 170 to be transmitted back to a client device 100. Still further, the replication component 643 may cooperate with the partnering component 645 within the node 300a to signal the inactive node 300b with an indication of failure occurring within the node 300a to trigger the node 300b to take over for the node 300a.

In still other embodiments, the replication component 643 within the node 300a may replicate a data access command 570 and transmit the resulting replica data access command 670 to the node 300y via the inter-cluster interconnect 399 without awaiting or otherwise conditioning such replication and transmission on any indication whatsoever from the access component 648 within the 300a of success or failure associated with performing the data access command 570. Indeed, in some of such other embodiments, the replication of the data access command 570 and/or the transmission of the replica data access command 670 to the node 300y may be effected before or concurrently with the provision of the data access command 570 to the access component 648 within the node 300a as part of effecting at least partially parallel performance of the data access command 570 and the corresponding replica data access command 670.

Regardless of whether transmission of a replica data access command 670 to the active node 300y is conditioned on the nature of an indication of success or failure in accepting and/or performing the corresponding data access command 570, the act of transmitting the replica data access command 670 to the node 300y may itself elicit an indication of failure in performing the replica data access command 670. More specifically, either prior to or in response to at least attempting to transmit a replica data access command 670 to the node 300y, the multipath component 649 may provide an indication to the replication component 643 that the active communications session between the active nodes 300a and 300y and through which the replica data access command 670 would be transmitted has been lost. As has been previously discussed, the multipath components 649 of the active nodes 300a and 300y may cooperate to exchange test signals through the active communications session formed therebetween on a recurring basis to check the status of that active communications session. Thus, the multipath component 649 within the node 300a may have attempted to engage in such an exchange with its counterpart within the node 300y, and may have failed to receive an expected signal from the node 300y such that the active communications session at least appears to no longer be in place such that the node 300y may not receive the replica data access command 670 if an attempt is made to transmit the replica data access command 670 thereto. Alternatively, there may not be an indication of such a loss of an active communications session, but the node 300y may have failed to acknowledge receipt of at least a portion of the replica data access command 670 as the replication component 643 within the node 300a attempts to transmit the replica data access command 670 to the node 300y. Either such a loss of an active communications session or such a failure to acknowledge receipt of at least a portion of the replica data access command 670 may be taken by the replication component 643 within the node 300a as an indication of a long term failure occurring within the node 300y that precludes the node 300y from being able to perform the replica data access command 670 for a relatively long period of time. In response, the replication component 643 within the node 300a may retry transmission of the replication data access command 670 to the inactive partner of the node 300y, specifically, the node 300z. As previously discussed, such a retrial of the replica data access command 670 to the node 300z may entail and/or trigger a takeover of the active node 300y by the inactive node 300z such that the node 300z becomes the new active node of the HA group 1600yz. Depending on the amount of time required to effect the retrial to the node 300z and/or the amount of time then required for the node 300z to perform the replica data access command 670, the replication component 643 within the node 300a may cause an indication of retrial of the corresponding storage service request 170 to be transmitted back to a client device 100. Also, presuming that such a retrial to the node 300z results in a successful performance of the replica data access command 670 by the node 300z, and presuming that the node 300a successfully performs the data access command 570, the replication component 643 within the node 300a may cause an indication of successful performance of the corresponding storage service request 170 to be transmitted back to the same client device 100.

However, presuming that the node 300y successfully receives a replica data access command 670 from the node 300a, other errors may occur as the replication component 643 within the node 300y may relay it to the access component 648 within the node 300y. More specifically, in some embodiments and in a manner not unlike the access component 648 within the node 300a, the access component 648 within the node 300y may perform various tests on the set of storage devices 800yz. In so doing, the access component 648 within the node 300y may detect a short term or long term failure that may preclude performance of the replica data access command 670 for either a short or long period of time, respectively, and may provide an indication of such a short term failure or long term failure to the replication component 643 within the node 300y. Alternatively or additionally, the access component 648 may encounter either a short term error or a long term error in attempting to perform the replica data access command 670, and may provide an indication of that failure to the replication component 643.

Regardless of whether a long term failure is detected by the access component 648 within the node 300y during testing prior to receipt of replica data access command 670 or during an attempt to perform the data access command 670, the replica component 643 within the node 300y may generate and transmit a replica command response 679 back to the node 300a that includes an indication of a long term failure in performing the replica data access command 670. In response to receiving such an indication of long term failure, the replication component 643 within the node 300a may retry the replica data access command 670 to the inactive node 300z. Again, this may entail and/or trigger a takeover of the active node 300y by the inactive node 300z. And again, the replication component 643 within the node 300a may cause service request responses 179 that initially include an indication of retrying a corresponding storage service request 170 and then include an indication of successful performance of that storage service request 170 to be sent to a client device 100.

Similarly, regardless of whether a short term failure is detected by the access component 648 within the node 300y during testing prior to receipt of replica data access command 670 or during an attempt to perform the data access command 670, the replica component 643 within the node 300y may generate and transmit a replica command response 679 back to the node 300a that includes an indication of a short term failure in performing the replica data access command 670. In response to receiving such an indication of short term failure, the replication component 643 within the node 300a may retry the replica data access command 670 with the active node 300y. Again, the replication component 643 within the node 300a may cause service request responses 179 that initially include an indication of retrying a corresponding storage service request 170 and then include an indication of successful performance of that storage service request 170 to a client device 100.

However, presuming there are no failures precluding or arising from performance of the replica data access command 670 by the access component 648 within the node 300y, then the access component 648 provides the replication component 643 within the node 300y an indication of successful completion of performance of the replica data access command 670. The replication component 643 within the node 300y may then relay the indication of successful performance to the node 300a, where it is received by the replication component 643 within the node 300a. Presuming that the access component 648 within the node 300a was able to similarly successfully complete performance of the data access command 570, the access component 648 may provide an indication of that successful performance to the replication component 643 within the node 300a. Thus, the replication component 643 within the node 300a may be provided within indications of successful completions of the data access command 570 and the corresponding replica data access command 670 from each of the corresponding ones of the access component 648. In response to the receipt of both indications of successful completion, the replication component 648 within the node 300a may generate and provide the N-module 500 with a command response 579 that includes an indication of successful performance of the data access command 570. In turn, the N-module 500 of the node 300a may translate that indication into a service request response 179 that includes an indication of successful performance of the storage service request 170 from which the N-module 500 translated the data access command 570.

However, while the access component 648 within the node 300y may have been successful in performing a replica data access command 670, a long term failure may occur in the performance of the corresponding data access command 570 by the access component 648 within the node 300a, even if there was a successful commencement of performance of the data access command 570. In such a situation, the replication component 643 within the node 300a may transmit a cancel command to the node 300y to cause cancellation of the performance of the replica data access command 670 by the node 300y. The node 300y may incorporate an ability to reverse the changes to the client device data 130 within the set of storage devices 800yz that arose from whatever portion of the data access command 670 that may have already been performed before the cancel command is received and acted upon. Alternatively or additionally, following a takeover of the node 300a by the node 300b, the state of the client device data 130 within the set of storage devices 800yz prior to performance of the replica data access command 670 may be restored with a transfer of a copy of a portion of the client device data 130 from the set of storage devices 800ab through the node 300b and to the set of storage devices 800yz through the node 300y. Still further, the replication component 643 within the node 300a may cause an indication of failure in performing the corresponding storage service request 170 to be transmitted to a client device 100 and/or may signal the node 300b of the failure to trigger the takeover by the node 300b.

In some embodiments, aspects of an operating system, network support software and/or other component of one or more of the client devices 100 may impose a limit on the amount of time that may be allowed to pass from when a storage service request 170 is transmitted by one of the client devices 100 to when a service request response 179 conveying some indication of the status of performance must be received to avoid a malfunction or other undesirable response by that one of the client devices 100. As previously discussed, the M-module 400 of an active node may support the provision of configuration information by one or more the client devices 100, and such configuration information may include an indication of a maximum status response time within which a service request response 179 must be transmitted back to a client device 100 by a N-module 500 following receipt of the storage service request 170 to which that service request response 179 corresponds. The M-module 400 may convey such a maximum status response time to a N-module 500 and/or a D-module 600 of that active node as part of a metadata portion, and that maximum status response time may be incorporated into metadata generated and stored by that D-module 600.

Thus, the replication component 643 of the D-module 600 of the node 300a may retrieve such a maximum status response time from the metadata 630ab, and may monitor the amount of time from when at least a data access command 570 translated from a storage service request 170 is received and/or from when that storage service request 170 is received. In situations in which the data access command 570 and the corresponding replica data access command 670 are both successfully performed, there may be little difficulty in effecting the transmission of a service request response 179 that includes an indication of successful performance to a client device 100 well within the maximum status response time indicated in the metadata 630ab. It should be noted that, while the indication of successful performance relayed to the client device 100 may be based on the successful completion of the performances of both the data access command 570 and the replica data access command 670, other embodiments are possible in which such an indication of successful performance is transmitted to the client device 100 on a more speculative basis. By way of example, the replication component 643 within the node 300a may cause such an indication of successful performance to be transmitted to the client device 100 based on indications of success in commencing performance provided by the access components 648 within both of the active nodes 300a and 300y, instead of waiting for indications of successful completion of performance from both access components 648. By way of another example, such an indication of successful performance may be transmitted to the client device 100 based on indications of successful acceptance of the data access command 570 by the access component 648 within the node 300a and of successful acceptance of the replica data access command 670 by the access component 648 within the node 300y. Such speculative transmission of an indication of successful performance to the client device 100 may be deemed desirable in an effort to ensure that the maximum status response time does not elapse before such an indication of successful performance can be provided to the client device 100.

However, where a short term failure occurs in association with the performance of either of the data access command 570 or the replica data access command 670, the occurrence of one or more retrials may result in the inability to determine if transmission of an indication of successful performance to a client device 100 should occur before the maximum status response time is reached. More specifically, the configuration information provided through the M-module 400 of the node 300a and then made part of the metadata 630ab may include an indication of a retry delay interval that may specify the amount of time to be awaited from the last attempt at performing the data access command 570 and/or the replica data access command 670 before retrying. Depending on the nature of a short term error, the number of retrials of the data access command 570 or the replica data access command 670 that are required, and the amount of time specified for the retry delay interval, the end of the maximum status response time may be reached before one or more retrials brings about successful performances of both of the data access command 570 and the replica data access command 670. By way of example, in a situation where retrial of one of the data access command 570 or the replica data access command 670 is still being attempted as the maximum status response time approaches, the replication component 643 within the node 300a may cause the transmission of a service request response 179 to a client device 100 that includes an indication that retrial of the corresponding storage service request 170 is currently underway.

In some embodiments, such a transmission of an indication of retrial as underway to a client device 100 may effectively "restart" or "reset" the maximum status response time, thereby providing another such period of time within which another service request response 179 must be transmitted to the client device 100. In essence, in some embodiments, the maximum status response time may become a maximum period of time for an interval in which service request responses 179 must be transmitted until a service request response 179 that includes an indication of successful performance is transmitted. In such embodiments, the replication component 643 within the node 300a may monitor the amount of time that elapses following the transmission of each service request response 179 that includes an indication of a retrial as underway to ensure that it is not exceeded before the next such transmission is made.

Also among the configuration information provided through the M-module 400 of the node 300a and then made part of the metadata 630ab may be an indication of a maximum retry period during which the data access command 570 and/or the replica data access command 670 may be repeatedly retried, or a maximum quantity of such retries that may be made. If repeated retrying of the data access command 570 and/or the replica data access command 670 has still not brought about a successful performance before the maximum retry period or the maximum quantity of retries is reached, then the short term failure that led to the repeated retrying may cease to be treated as a short term failure. Instead, that short term failure may be determined by the replication component 643 within the node 300a to be a long term failure, and the replication component 643 may then act in the manner discussed above in response to the long term failure. Specifically, if the short term failure (now deemed a long term failure) is associated with the performance of the replica data access command 670 by the active node 300y, then the replication component 643 within the node 300a may retry the replica data access command 670 with the node 300z, instead of further retrials being made with the node 300y. Correspondingly, if the short term failure (now deemed a long term failure) is associated with the performance of the data access command 570 by the active node 300a, then the replication component 643 within the node 300a may cease all retries of the data access command 570, may cause the transmission of a service request response 179 that includes an indication of failure of performance to the client device 100, and/or may cooperate with the partnering component 645 to transmit an indication of failure within the node 300a to the inactive node 300b.

Figure 9A:
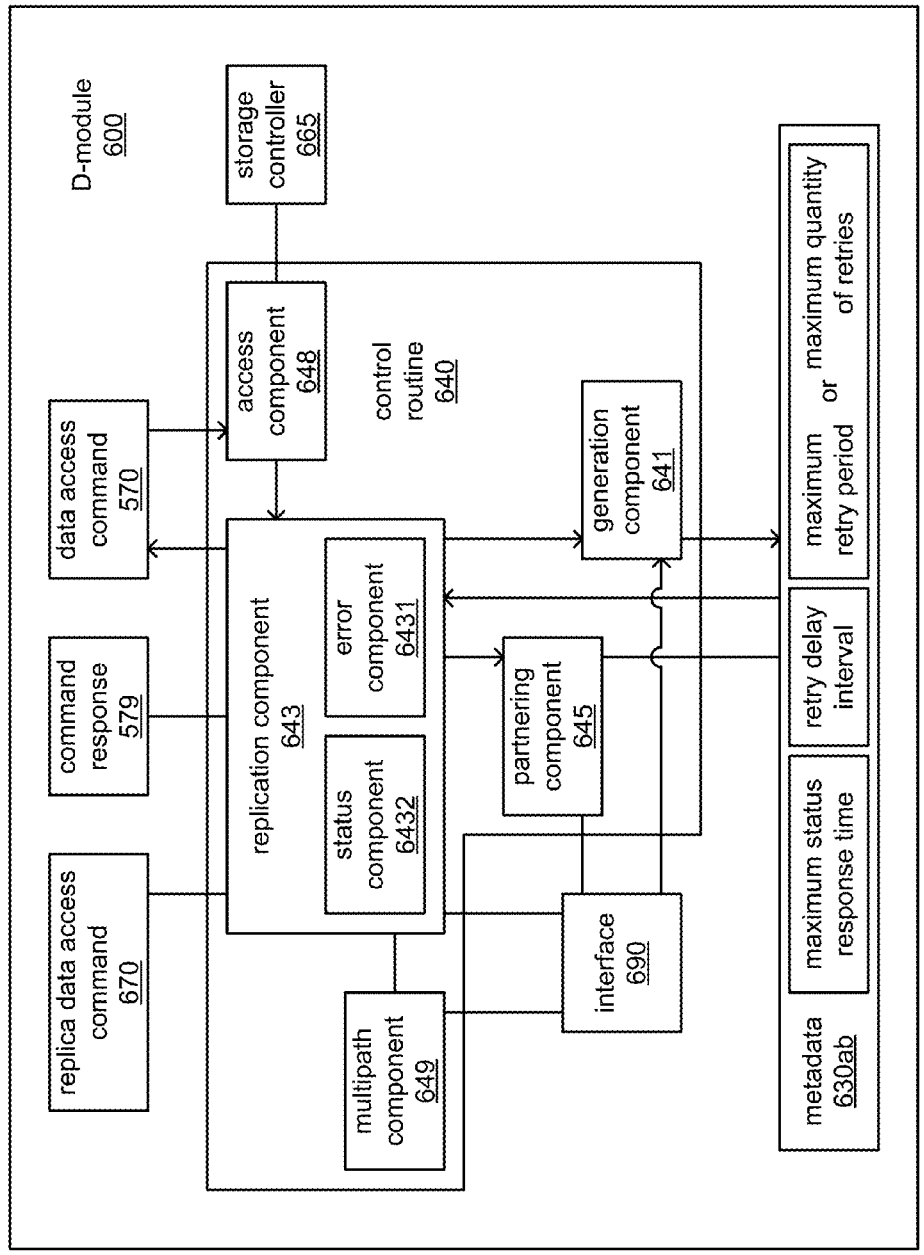
FIGS. 9A and 9B, together, illustrate an example embodiment of responding to failures in the partially parallel performance of data access commands by active nodes.
Figure 9B:
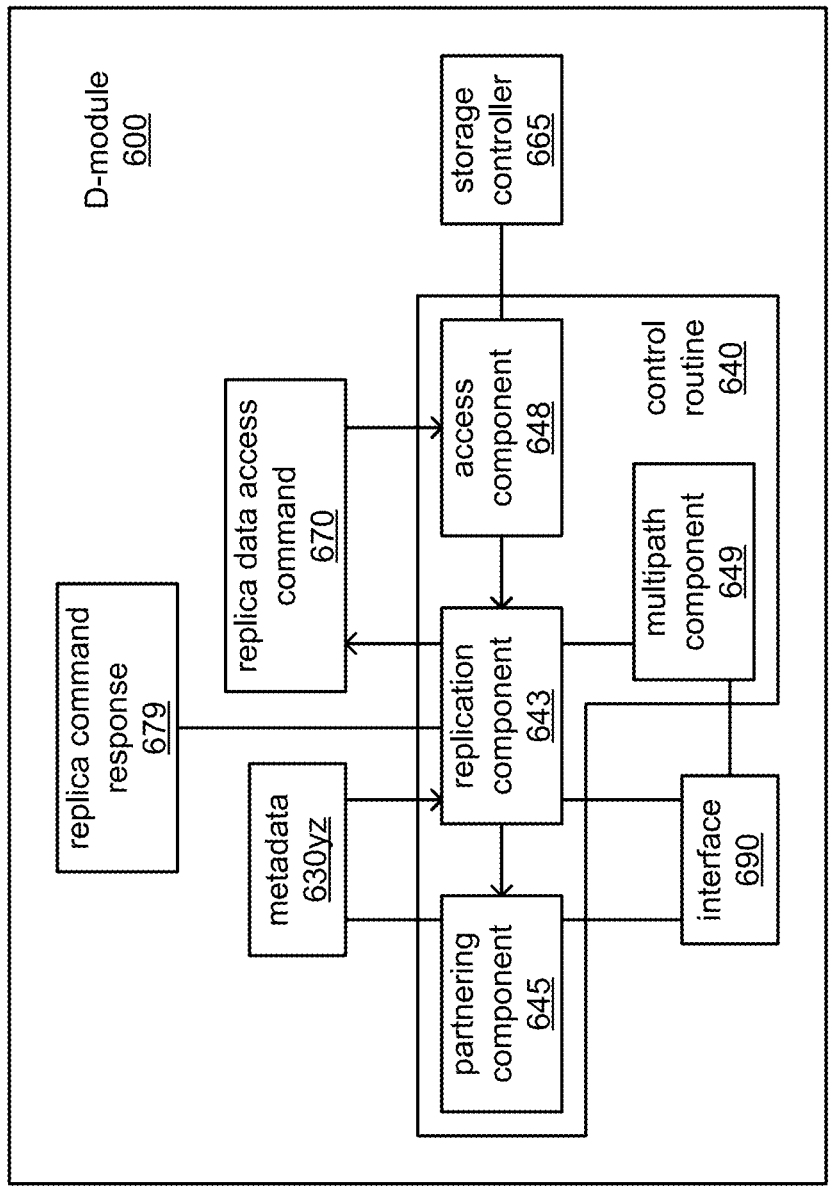

FIGS. 9A and 9B, together, depict aspects of responding to and providing status indications concerning short and/or long term failures that may arise from at least partially parallel performance of data access commands 570 and replica data access commands 670 in greater detail. More specifically, FIG. 9A depicts aspects of detecting, determining responses to and determining status indications for short and/or long term failures from performing data access commands 570 and/or transmitting replica data access commands 670 to be performed. FIG. 9B depicts aspects of detecting and relaying indications of short and/or long term failures from performing replica data access commands 670.

Turning to FIG. 9A, as has been discussed, the generation component 641 within the node 300a may generate the metadata 630ab and/or updates thereto from metadata portions that the generation component 641 may operate the interface 690 to receive from the M-module 400 and/or the N-module 500 of the node 300a via the intra-cluster interconnect 599a. Again, the metadata 630ab may include a maximum status response time indicating a maximum amount from receipt of a storage services request 170 in which to transmit a service request response 179 and/or a retry delay interval indicating an amount of time to wait before attempting a retrial. Alternatively or additionally, the metadata 630ab may include a maximum retry period indicating a maximum amount of time in which multiple retrials may be attempted or a maximum quantity of retrials that may be attempted before a short term failure is determined to be a long term failure.

As depicted, the replication component 643 within at least the node 300a may incorporate one or more of a status component 6432 and an error component 6431. The error component 6431 may analyze indications of short term or long term failure associated with the performance of the data access command 570 and/or the replica data access command 670 to determine one or more actions to take in response. The status component 6432 may analyze the same indications of short term or long term favor along with the determination by the error component 6431 of what action(s) to take to determine what status indication (e.g., an indication of success, an indication of retrial underway or an indication of failure) to include in a command response 579 generated and transmitted by the status component 6432 to the N-module 500 to be relayed to the client device 100 in a service request response 179. As has been discussed, the replication component 643 within the node 300a may operate the interface 690 to receive a data access command 570 from the N-module 500 of the node 300a via the intra-cluster interconnect 599a, and may relay the data access command 570 to the access component 648 within the node 300a. The replication component 643 may also replicate the data access command 570 to generate a corresponding replica data access command 670, and may operate the interface 690 to transmit the replica data access command 670 to the node 300y via the inter-cluster interconnect 399.

However, in other embodiments, the error component 6431 of the replication component 643 may condition such transmission of the replica data access command 670 on an indication of a long term failure, a short term failure and/or successful commencement of performance of the data access command 570 from the access component 648 within the node 300a. Again, the error component 6431 may preclude such transmission of the replica data access command 670 to the node 300y in response to an indication of a long term failure either in the performance of an earlier operation by the access component 648 or in the commencement of performance of the data access command 570. Also in response to such an indication of long term failure, the error component 6431 may cooperate with the status component 6432 of the replication component 643 to generate a command response 579 that includes an indication of failure in performing the data access command 570 and to transmit that command response 579 to the N-module 500 to cause an indication of failure in performance to be transmitted to a client device 100. Further in response to such an indication of long term failure, the error component 6431 may cooperate with the partnering component 645 to transmit an indication of failure to the inactive node 300b via the HA interconnect 699ab to trigger the node 300b to take over for the node 300a. Following such a takeover, the partnering component 645 may receive an updated version of the metadata 630ab indicating that the node 300b is the new active node within the HA group 1600ab from the node 300b via the HA interconnect 699ab.

In contrast, in response to an indication of a short term failure either in the performance of an earlier operation by the access component 648 or in the commencement of performance of the data access command 570, the error component 6431 may allow the replica data access command 670 to be transmitted by the replication component 643 to the node 300y. The error component 6431 may also attempt one or more retries of the data access command 570 with the access component 648 until the access component 648 successfully accepts the data access command 570 after earlier refusing to accept it, or until the access component 648 provides an indication of successfully commencing performance of the data access command 570 after earlier indicating a short term error in attempting the commencement of that performance. In retrying the data access command 570, the error component 6431 may await the amount of time indicated as the retry delay interval within the metadata 630ab before attempting each such retrial. Further, the error component 6431 may cease retrying the data access command 570 in response to reaching the maximum quantity of retries and/or the maximum amount of time specified for retrials that may be indicated as the maximum retry period in metadata 630ab, and instead, the error component 6431 may cooperate with the status component 6431 and/or the partnering component 645 to treat the short term failure as a long term failure, and act in response to the long term failure as described above.

Presuming that the an indication of success in performing the replica data access command 670 is received from the node 300y (or that at least no indication of long term failure in that performance is received from the node 300y), the error component 6431 may further cooperate with the status component 6432 to generate a command response 579 that includes an indication of a retrial of the data access command 570 as underway. In some embodiments, the status component 6432 may monitor the passage of time since the receipt of the storage service request 170 from which the data access command 570 may have been translated to determine whether the maximum status response time that may be indicated within the metadata 630ab has been reached. If such a retrial of the data access command 570 with the access component 648 within the node 300a is still underway at or near the end of the maximum status response time, then the status component 6432 may transmit the command response 579 that includes the indication of retrial underway to the N-module 500 of the node 300a to cause an indication of retrial as underway to be transmitted to the client device 100. However, if such retrial of the data access command 570 has brought about successful performance of the data access command 570 and an indication of successful performance of the replica data access command 670 is received from the node 300y, then the status component 6432 may transmit a command response 579 that includes an indication of successful performance of the data access command 570 to the N-module 500 to cause an indication of successful performance to be transmitted to the client device 100.

Regardless of whether the transmission of the replica data access command 670 to the node 300y is conditioned on an indication of success or failure associated with performance of the data access component 570 from the access component 648 within the node 300a, as has been previously discussed, such transmission of the replica data access command 670 may itself beget a failure. The error component 6431 may receive an indication of the active communications session earlier formed between the D-modules 600 of the nodes 300a and 300y through the inter-cluster interconnect 399 having been lost. Again, the error component 6431 may respond to the loss of that active communications session as a long term failure in the node 300y and associated with the performance of the replica data access command 670, and may respond by retrying the replica data access command 670 with the inactive node 300z that is partnered with the node 300y. Again, the status component 6432 may monitor the passage of time since the receipt of the storage service request 170 from which the data access command 570 was translated, and may transmit a command response 579 to the N-module 500 that includes an indication of retrial underway to relay to the client device 100 if the maximum status response time is reached (or is close to being reached) with the retrial of the replica data access command 670 to the node 300z still underway (and presuming that performance of the data access command 570 is successful). Alternatively, if performance of the data access command 570 is successful and retrial of the replica data access command 670 with the node 300z begets successful performance of the replica data access command 670 by the node 300z before the maximum status response time is reached, then the status component 6432 may transmit a command response 579 to the N-module 500 that includes an indication of successful performance to relay to the client device 100.

Now turning to FIG. 9B in addition to FIG. 9A, the replication component 643 within the node 300y may operate the interface 690 to receive the replica data access command 670 from the node 300a via the inter-cluster interconnect 399, and may relay the replica data access command 670 to the access component 648 within the node 300y. In some embodiments in which the access component 648 may have provided an indication of a failure detected by the access component 648 to the replication component 643 before receipt of the replica data access command 670, the replication component 643 may generate and transmit a replica command response 679 to the node 300a that includes an indication of failure in performing the replica data access command 670, and may do so without relaying the replica data access command 670 to the access component 648. Alternatively or additionally, the replication component 643 within the node 300y may relay the replica data access command 670 to the access component 648 within the node 300y regardless of previous indications of failure received from the access component 648, and may relay whatever indication of failure is provided by the access component 648 at that time back to the node 300a in a replica command response 679. Where the indication of failure in the replica command response 679 is that of a long term failure, then the error component 6431 of the replication component 643 within the node 300a may retry the replica data access command 670 with the inactive partner node 300z.

However, where the indication of failure in the replica command response 679 is that of a short term failure, then the error component 6431 of the replication component 643 within the node 300a may await the retry delay interval that may be indicated in the metadata 630ab, and may retry the replica data access command 670 to the node 300y. Not unlike the earlier described retrying of the data access command 570 with the access component 648 within the node 300a, the error component 6431 may cease retrying the replica data access command 670 to the node 300y in response to reaching the maximum quantity of retries or the end of the maximum retry period without begetting a successful performance of the replica data access command 670 by the node 300y. In such a situation, the error component 643 may deem the short term failure to be a long term failure, and may revert to retrying the replica data access command 670 with the node 300z. Further, during the one or more retries of the replica data access command 670 with at least the node 300y, the status component 6432 of the replication component 643 within the node 300a may monitor the passage of time since receipt of the corresponding storage service request 170 by the node 300a to determine if the maximum status response time has yet been reached. If the maximum status response time has been reached (or is close to being reached), the retrial(s) of the replica data access command 670 to the node 300y are still underway and there is at least no indication of error associated with performing the data access command 570, then the status component 6432 may generate and transmit a command response 579 to the N-module 500 that includes an indication of retrial underway to be relayed to the client device 100. However, if retrial of the replica data access command 670 to the node 300y or to the node 300z is successful by the time the maximum status response time has been reached such that the replica data access command 670 has been successfully performed, and if the data access command 570 has been successfully performed, then the status component 6432 may generate and transmit a command response 579 to the N-module 500 that includes an indication of successful performance to be relayed to the client device 100.

Where, the access component 648 within the node 300y responds to receiving the replica data access command 670 from the replication component 643 with an indication of success, like the access component 648 within the node 300a, that indication of success may be an indication of successful acceptance, successful commencement of performance and/or successful completion of the replica data access command 670. In response, the replica component 643 within the node 300y may generate and transmit a replica command response 679 to the node 300a that includes whichever one of these indications of success that emanates from the access component 648 within the node 300y.

Returning to FIG. 9A, the status component 6432 may be triggered to generate and transmit to the N-module 500 of the node 300a a command response 579 that includes an indication of successful performance of the data access command 570 to be relayed to the client device 100 in response to different types of indications of success received from the access components 648 within the nodes 300a and 300y in different embodiments. By way of example, in some embodiments, the status component 6432 may generate and transmit such an indication of success to the N-module 500 in response to receiving at least indications of successful acceptance of the data access command 570 and the replica data access command 670 from the access components 648 within the nodes 300a and 300y, respectively. In other embodiments, the status component 6432 may generate and transmit such an indication of success to the N-module 500 in response to receiving at least indications of successful commencement of performance of the data access command 570 and the replica data access command 670 from the access components 648 within the nodes 300a and 300y, respectively. In still other embodiments, the status component 6432 may generate and transmit such an indication of success to the N-module 500 in response only to receiving indications of successfully completed performance of the data access command 570 and the replica data access command 670 from the access components 648 within the nodes 300a and 300y, respectively.

Further, as previously discussed, one or more of the client devices 100 may require being provided with service request responses 179 that include an indication of the status of performing the corresponding storage service request 170 on a recurring basis until there is a service request response 179 that includes either an indication of successful performance or an indication of failure. As also previously discussed, in such embodiments, the maximum status response time may become a maximum period of time between repeated transmissions of service request responses 179 to satisfy that requirement. Thus, while a retrial of the data access command 570 or the replica data access command 670 continues, the status component 6432 may recurringly generate and transmit command responses 579 that include an indication of retrial underway to be conveyed by service request responses 179 to such a client device 100 until the retrials end with either a successful performance or long term failure.

Figure 10A:
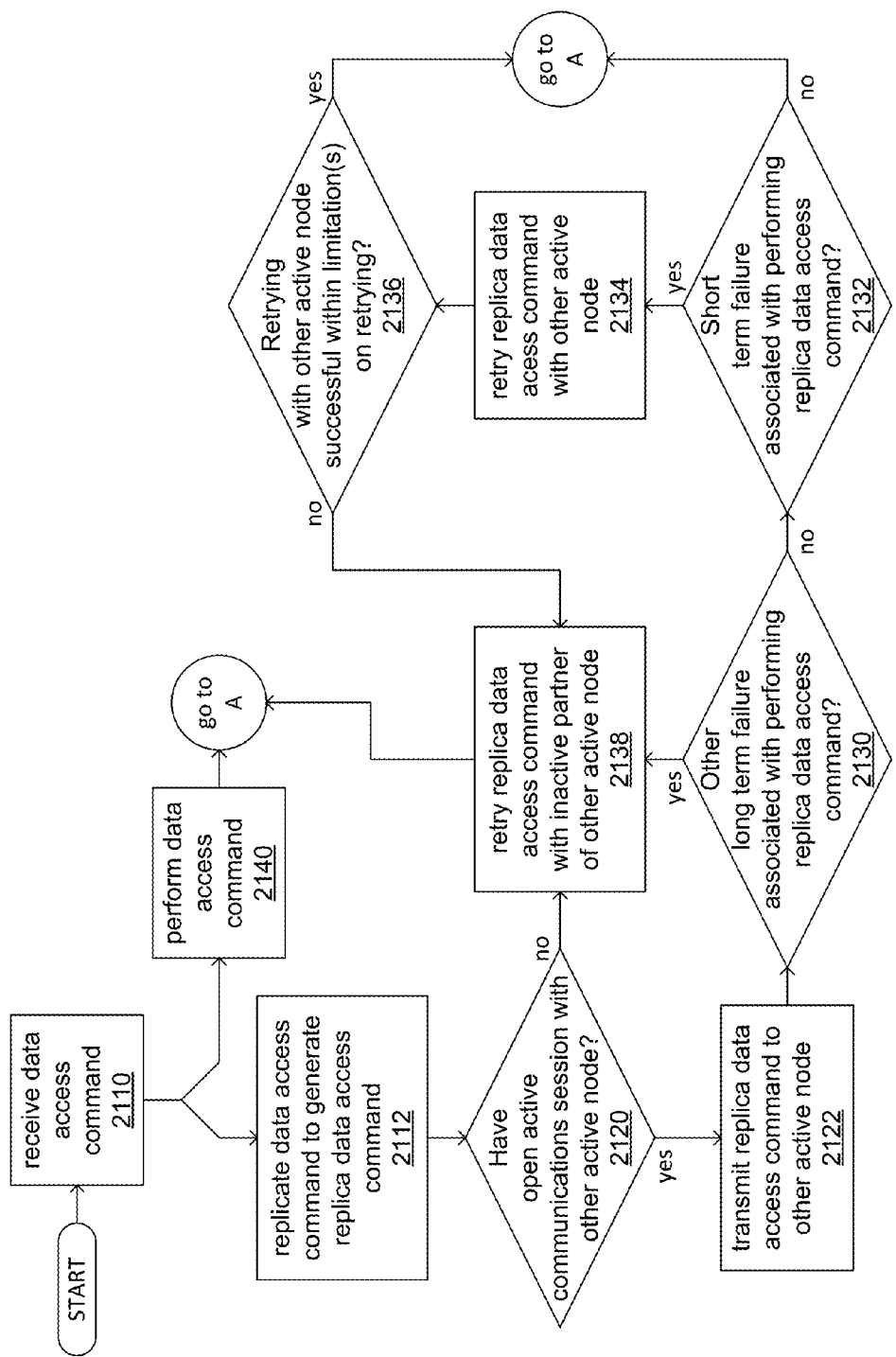
FIGS. 10A and 10B, together, illustrate a logic flow according to an embodiment.
Figure 10B:
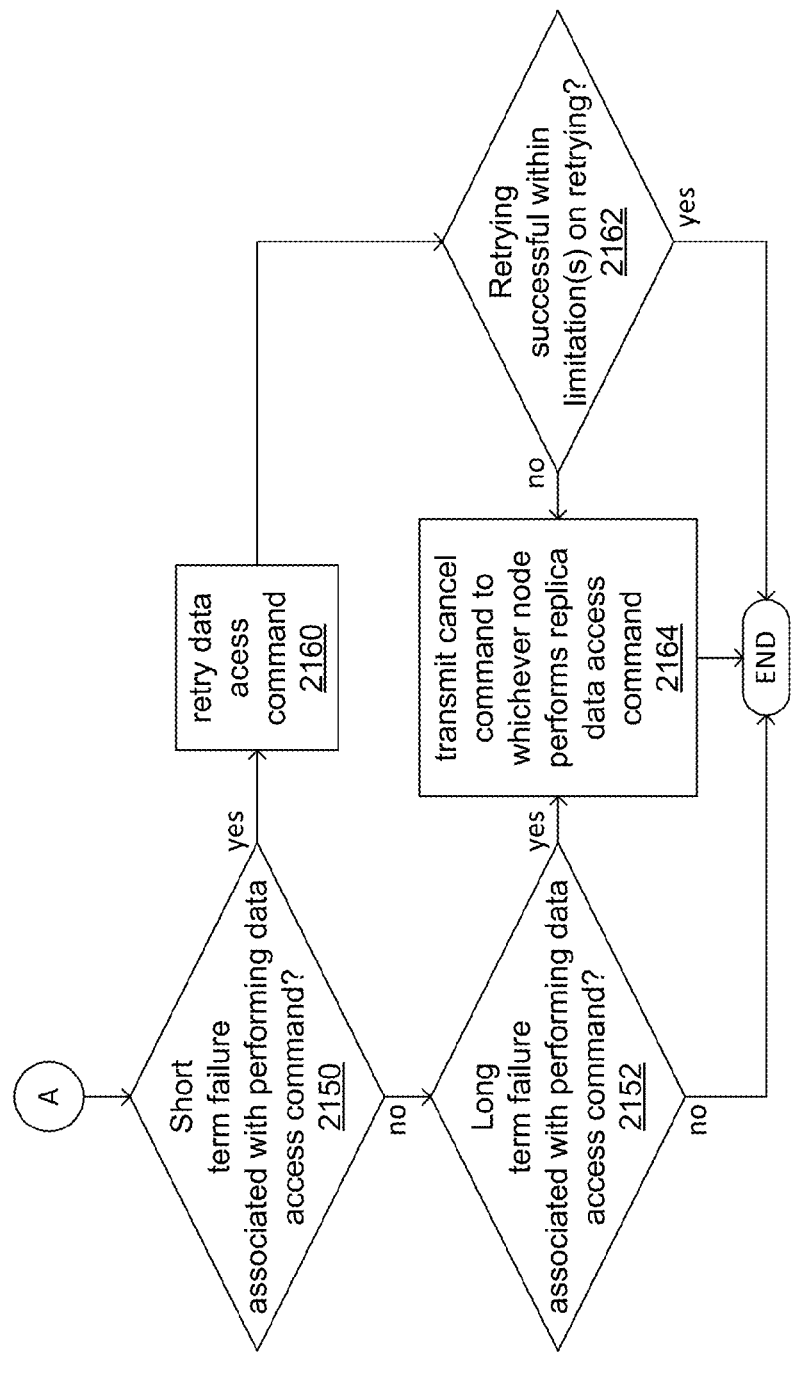

FIGS. 10A and 10B, together, illustrate one embodiment of a logic flow 2100. The logic flow 2100 may be representative of some or all of the operations executed by one or more embodiments described herein. More specifically, the logic flow 2100 may illustrate operations performed by the processor component 650 in executing at least the control routine 640, and/or performed by other component(s) of at least a data storage module (D-module) 600 of an active node of a storage cluster system.

Turning to FIG. 10A, at 2110, a processor component of a D-module of an active node of a first HA group of one cluster of a storage cluster system may receive a data access command from a client device to which that active node is coupled via a client interconnect. More specifically, the D-module may receive the data access command from a N-module of the same node following translation of a storage service request received by the N-module from the client device to generate the data access command. An example of such an active node may be an active one of the nodes 300a-b or 300y-z of one of the HA groups 1600ab or 1600yz of one of the clusters 1300a or 1300z of the storage cluster system 1000, where such a node may include the D-module 600 and a N-module 500 coupling the node to one or more of the client devices 100 via the client interconnect 199.

At 2112, the processor component may replicate the data access command to generate a corresponding replica data access command. As the processor component replicates the data access command at 2112, the processor component may also perform the data access command at 2140. Again, the processor component may seek to cooperate with its counterpart within another active node of a second HA group of another cluster of the storage cluster system to perform the data access command and the replica thereof at least partially in parallel. An example of such another active node may be another one of the nodes 300a-b or 300y-z of the other of the HA groups 1600ab or 1600cd of the other of the clusters 1300a or 1300z of the storage cluster system 1000.

At 2120, the processor component may determine whether there is an active communications session in place between the active node of which the processor component is a part and the other active node. If there is such an active communications session in place at 2120, then the processor component may transmit the replica data access command to that other active node at 2122. However, if there is no such active communications session in place at 2120, then the processor component may retry the replica data access command with an inactive partner of that other active node (e.g., may transmit the replica data access command to the inactive partner node) at 2138.

At 2130, presuming that the active communications session was in place, the processor component may determine whether there is another long term failure associated with performing the replica data access command. If there is, then the processor component may retry the replica data access command with the inactive partner of the other active node at 2138.

However, if there is no other long term failure at 2130, then the processor component may determine whether there is a short term failure associated with performing the replica data access command at 2132. If there is a short term failure at 2132, then the processor component may retry the replica data access command with the other active node at 2134, and the processor component may do so more than once at 2134. The processor component may then determine whether the retrying of the replica data access command with the other active node resulted in at least a successful commencement of performance of the replica data access command before limitation(s) on the retrying of the replica data access command were reached at 2136. Examples of such limits may be a specified maximum quantity of retries that may be performed and/or a maximum retry period of time in which such retries may be performed that may be indicated in metadata (e.g., the metadata 630*ab*). If no such success resulted from such retrying at 2136, then the processor component may retry the replica data access command at 2138.

Turning to FIG. 10B, having attempted performance of the data access command at 2140, and having also retried the replica data access command at 2138, or determined that there is no short term failure associated with performing the replica data access command at 2132, or determined that retrying the replica data access command with the other active node did achieve at least a successful commencement of performance at 2136, the processor component may determine whether there is a short term failure associated with performing the data access command at 2150.

If there is such a short term failure at 2150, then the processor component may retry the data access command at 2160, and the processor component may do so more than once at 2160. The processor component may then determine whether the retrying of the data access command resulted in successful performance of the data access command before limitation(s) on the retrying of the data access command were reached at 2162. If no such success resulted from such retrying at 2162, then the processor component may transmit a cancel command to the whichever one of the other active node or its inactive partner node either has performed or is performing the replica data access command at 2164. As has been discussed, the node that performs the replica data access command may be capable of undoing whatever changes were made to stored client device data as a result of performing the replica data access command.

However, if there is no short term failure at 2150, then the processor component may determine whether there is a long term failure associated with the performance of the data access command at 2152. If there is such a long term failure at 2152, then the processor component may transmit a cancel command to the whichever one of the other active node or its inactive partner node either has performed or is performing the replica data access command at 2164.

Figure 11A:
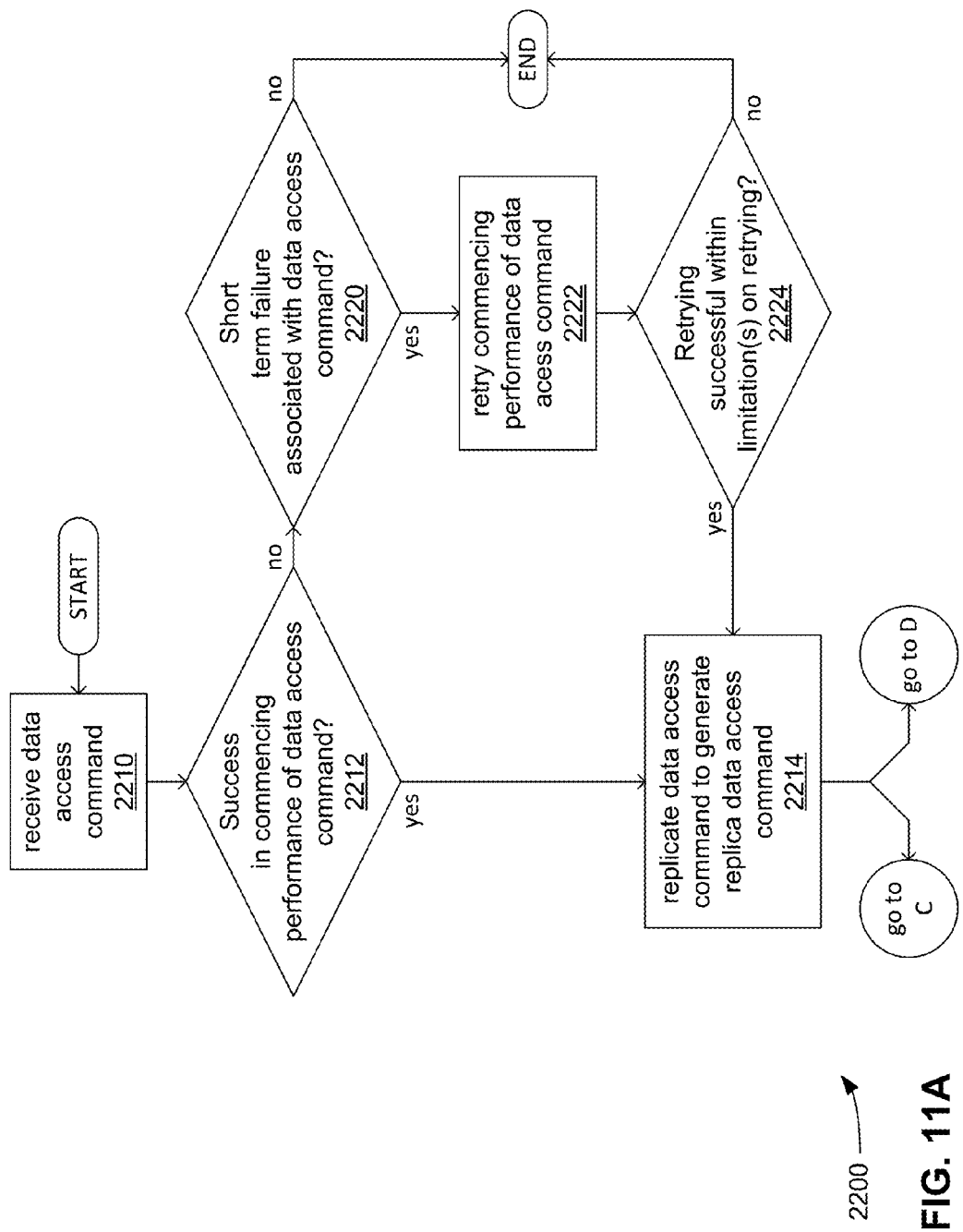
FIGS. 11A, 11B and 11C, together, illustrate a logic flow according to an embodiment.
Figure 11B:
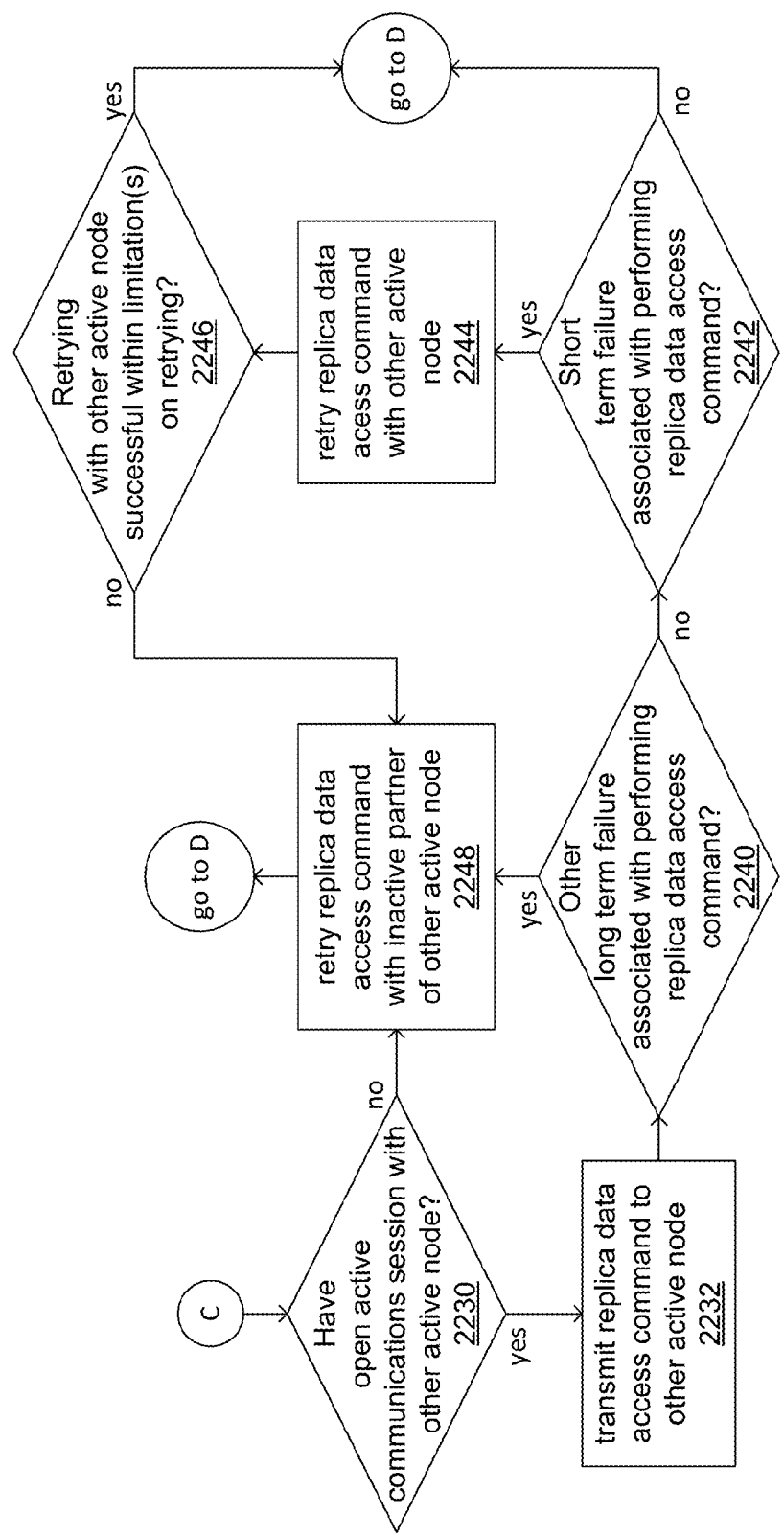
Figure 11C:
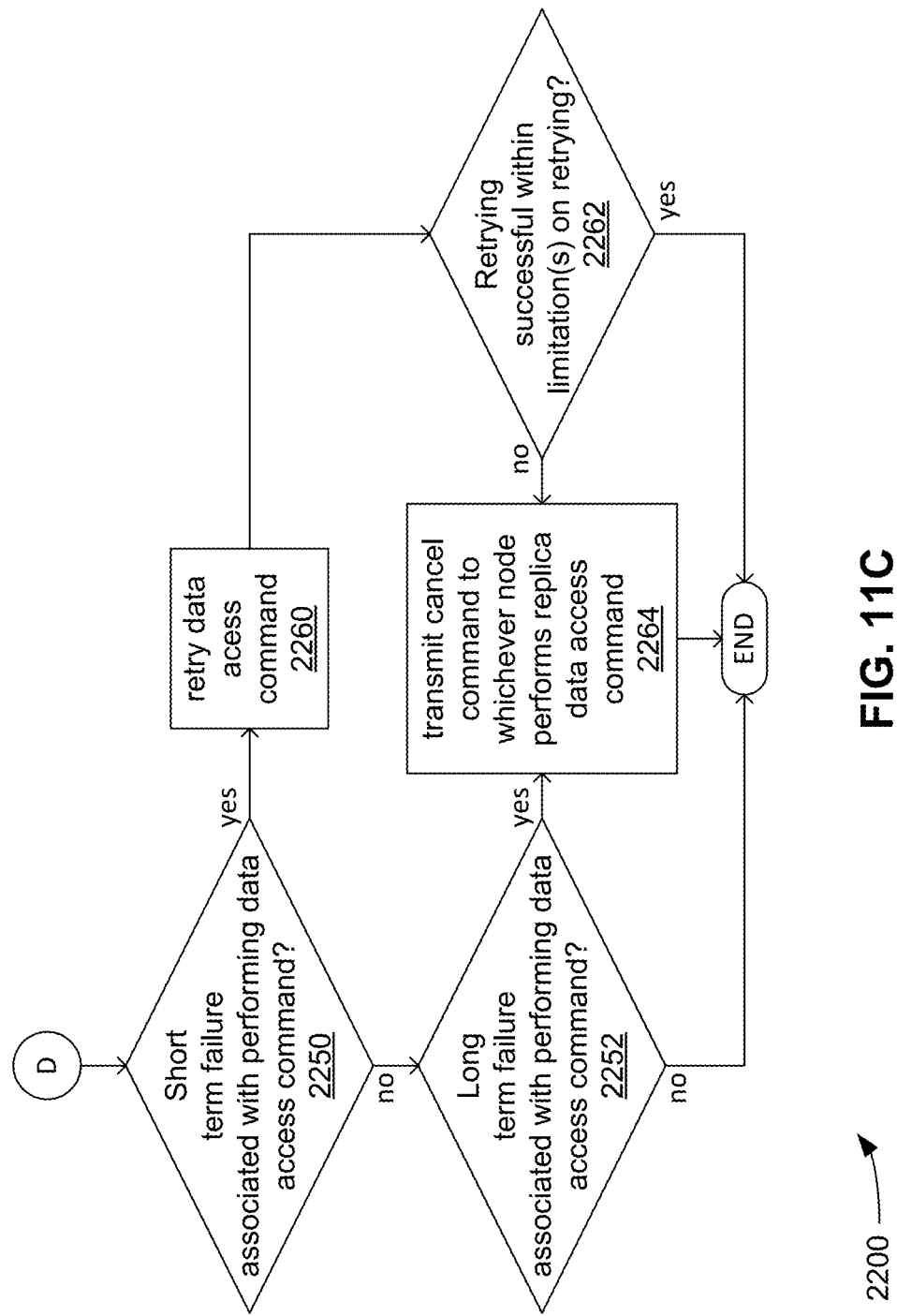

FIGS. 11A, 11B and 11C, together, illustrate one embodiment of a logic flow 2200. The logic flow 2200 may be representative of some or all of the operations executed by one or more embodiments described herein. More specifically, the logic flow 2200 may illustrate operations performed by the processor component 650 in executing at least the control routine 640, and/or performed by other component(s) of at least a data storage module (D-module) 600 of an active node of a storage cluster system.

Turning to FIG. 11A, at 2210, a processor component of a D-module of an active node of a first HA group of one cluster of a storage cluster system may receive a data access command from a client device to which that active node is coupled via a client interconnect. More specifically, the D-module may receive the data access command from a N-module of the same node following translation of a storage service request received by the N-module from the client device to generate the data access command. Again, an example of such an active node may be an active one of the nodes 300*a-b* or 300*y-z* of one of the HA groups 1600*ab* or 1600*yz* of one of the clusters 1300*a* or 1300*z* of the storage cluster system 1000, where such a node may include the D-module 600 and a N-module 500 coupling the node to one or more of the client devices 100 via the client interconnect 199.

At 2212, the processor component may determine whether performance of the data access command has successfully commenced. If not, then the processor component may determine whether there is a short term failure associated with attempting to commence performance of the data access command at 2220. If there is no such short term failure at 2220, then a presumption may be made in this logic that there is a long term failure with attempting to commence performance of the data access command. As previously discussed, if there is a long term failure associated with performing the data access command, then no replica of the data access command may ever be transmitted to another active node to be performed, further attempts at performing the data access command may be stopped, and an indication of failure of performance may be transmitted back to a client device.

However, if there is a short term failure in attempting to commence performance of the data access command at 2220, then the processor component may retry commencing performance of the data access command at 2222, and may do so more than once at 2222. The processor component may then determine whether such retrying of the data access command resulted in successful commencement of performance of the data access command before limitation(s) on the retrying of the data access command were reached at 2224. If no such success resulted from such retrying at 2224, then again, a presumption may be made in this logic that there is a long term failure with attempting to commence performance of the data access command.

However, if the processor component determines that success was achieved in commencing performance of the data access command as a result of the retrying at 2224, then the processor component may replicate the data access command to generate a corresponding replica data access command at 2214. As the processor component replicates the data access command at 2112, the processor component may continue performance of the data access command as part of cooperating with its counterpart within another active node of a second HA group of another cluster of the storage cluster system to perform the data access command and the replica thereof at least partially in parallel. An example of such another active node may be another one of the nodes 300*a-b* or 300*y-z* of the other of the HA groups 1600*ab* or 1600*cd* of the other of the clusters 1300*a* or 1300*z* of the storage cluster system 1000.

Turning to FIGS. 11B and 11C, the remainder of the depicted logic of the logic flow 2200 starting at 2230 is substantially similar to the depicted logic of the logic flow 2100 starting at 2120.

Figure 12:
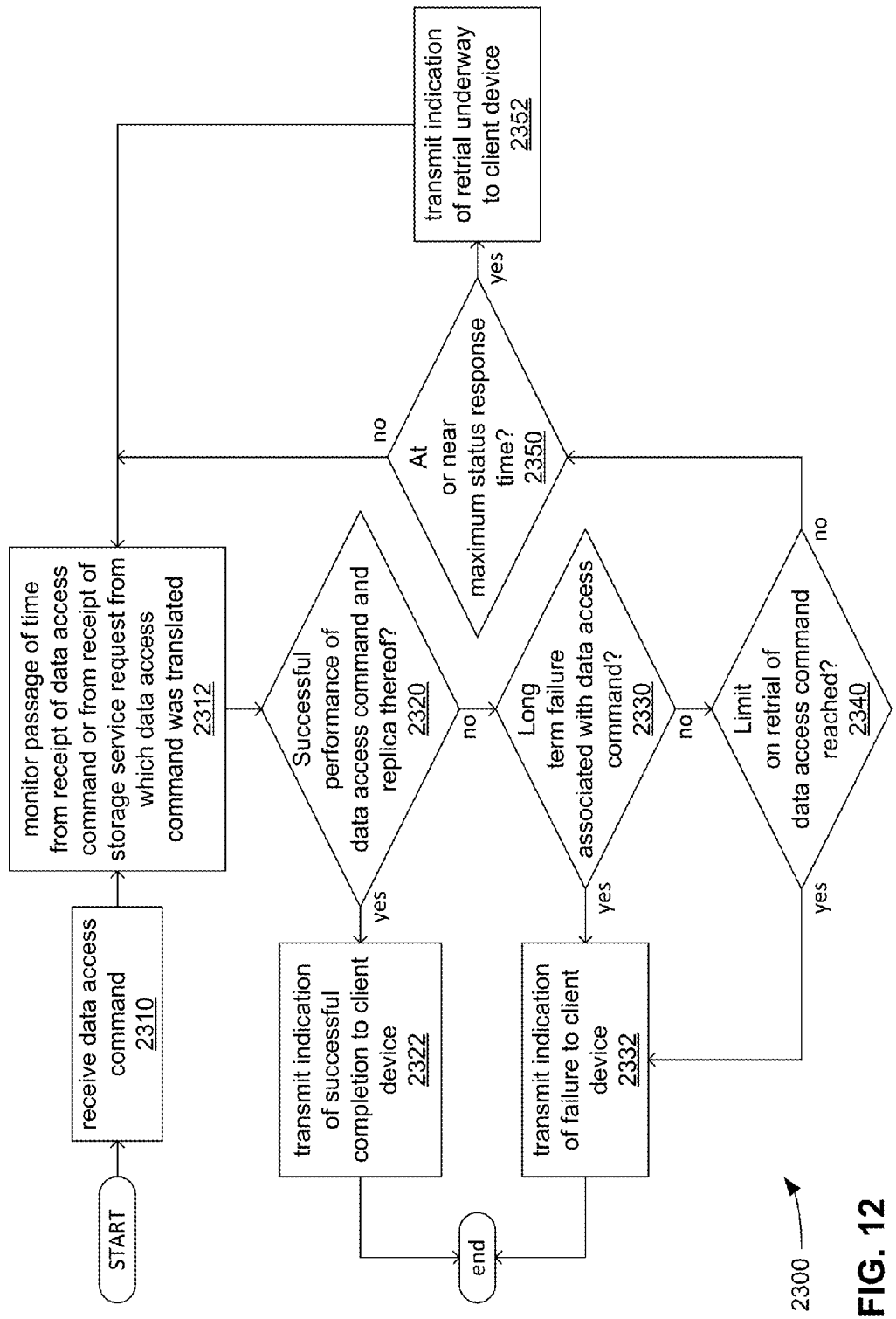
FIG. 12 illustrates a logic flow according to an embodiment.

FIG. 12, together, illustrate one embodiment of a logic flow 2300. The logic flow 2300 may be representative of some or all of the operations executed by one or more embodiments described herein. More specifically, the logic flow 2300 may illustrate operations performed by the processor component 650 in executing at least the control routine 640, and/or performed by other component(s) of at least a data storage module (D-module) 600 of an active node of a storage cluster system.

At 2310, a processor component of a D-module of an active node of a first HA group of one cluster of a storage cluster system may receive a data access command from a client device to which that active node is coupled via a client interconnect. More specifically, the D-module may receive the data access command from a N-module of the same node following translation of a storage service request received by the N-module from the client device to generate the data access command. Again, an example of such an active node may be an active one of the nodes 300*a-b* or 300*y-z*, where such a node may include the D-module 600 and a N-module 500 coupling the node to one or more of the client devices 100 via the client interconnect 199. At 2312, the processor component may monitor the passage of time since receipt by the active node (e.g., by the N-module of the active node) of a storage service request from a client device from which the data access command is translated by the N-module, or from receipt of the data access command by the D-module.

At 2320, the processor component may determine whether there has yet been a successful performance of both the data access command by the active node and a corresponding replica data access command by another active node of a second HA group of another cluster of the storage cluster system. Again, the processor component may seek to cooperate with its counterpart within another active node of a second HA group of another cluster of the storage cluster system to perform the data access command and the replica thereof at least partially in parallel. Again, an example of such another active node may be another one of the nodes 300*a-b* or 300*y-z* of the other of the HA groups 1600*ab* or 1600*cd* of the other of the clusters 1300*a* or 1300*z* of the storage cluster system 1000.

If there has been such successful performance of both the data access command and the corresponding replica data access command at 2320, then the processor component may transmit an indication of successful performance to the client device from which the original storage service request was received at 2322. As has been previously discussed, transmitting a status indication to a client device, such as an indication of failure, successful performance or retrial underway, may entail transmitting a command response that includes the status indication to a N-module of the active node via an intra-cluster interconnect, and may also entail that N-module translating that command response into a service request response that includes such a status indication and transmitting the service request response to the client device.

However, if there has been no such successful performance of either or both of the data access command and the corresponding replica data access command at 2320, then the processor component may determine whether there has been a long term failure associated with performing the data access command at 2330. If there has been such a failure associated with the data access command at 2330, then the processor component may transmit an indication of failure of performance to the client device from which the original storage service request was received at 2332.

However, if there has been no such long term failure associated with the data access command at 2330, then the processor component may determine at 2340 whether there is a short term failure associated with performing the data access command and whether a limit on retrying the data access command to overcome that short term failure has been reached at 2340. Again, examples of such limits may be a specified maximum quantity of retrials that may be performed and/or a maximum retry period of time in which such retries may be performed that may be indicated in metadata (e.g., the metadata 630*ab*). If there is such a short term failure and retries have been made up to such a limit without a successful performance of the data access command resulting therefrom at 2340, then the processor component may transmit an indication of failure of performance to the client device at 2332.

However, if there is no such short term failure or the number of retries to overcome such a short term failure has not yet reached such a limit at 2340, then the processor component may determine whether enough time has passed since reception of the data access command or the corresponding storage services request that the maximum status response time has been reached or is near to being reached at 2350. If not, then the processor component may return to monitoring the passage of time since such a reception. However, if the maximum status response time has been reached, or is near to being reached at 2350, then the processor component may transmit an indication of a retrial underway to the client device at 2352 before returning to monitoring the passage of time since such a reception. As has been discussed, the transmitting of service request response to a client device that includes an indication of a retrial underway may start a new interval of time in which another service request response must be transmitted to the client device within maximum status response time. Thus, the determination made at 2350 may apply to each new such interval until a service request response that includes an indication of success or failure is transmitted.

Figure 13:
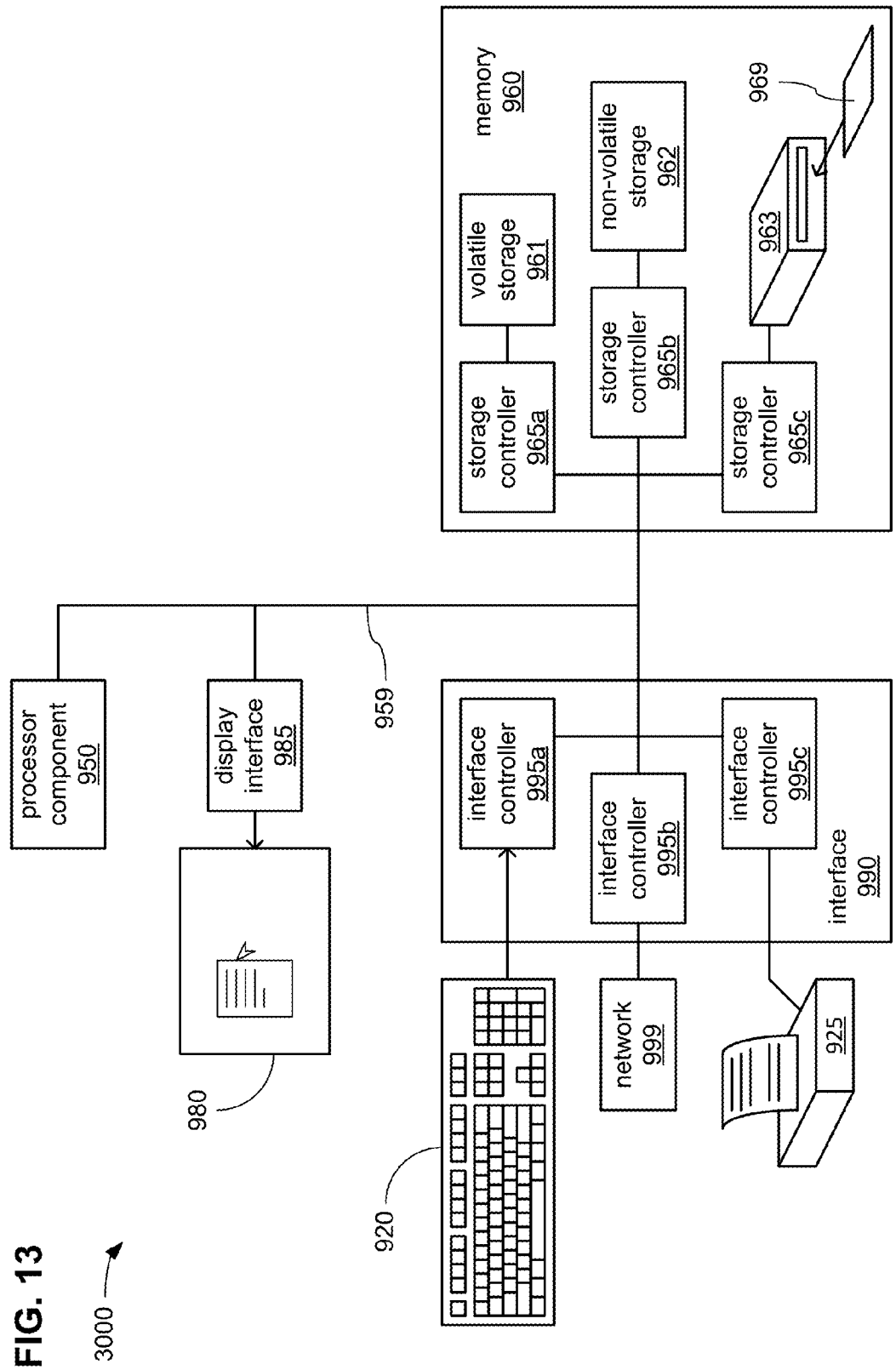
FIG. 13 illustrates a processing architecture according to an embodiment.

FIG. 13 illustrates an embodiment of an exemplary processing architecture 3000 suitable for implementing various embodiments as previously described. More specifically, the processing architecture 3000 (or variants thereof) may be implemented as part of one or more of the client devices 100, the M-modules 400, the N-modules 500, the D-modules 600 or the sets of storage devices 800*ab*, 800*cd* or 800*yz*. It should be noted that components of the processing architecture 3000 are given reference numbers in which the last two digits correspond to the last two digits of reference numbers of at least some of the components earlier depicted and described as part of the modules 400, 500 and 600. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, a software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, an internal storage 960, an interface 990 to other devices, and a coupling 959. As will be explained, depending on various aspects of a computing device implementing the processing architecture 3000, including its intended use and/or conditions of use, such a computing device may further include additional components, such as without limitation, a display interface 985.

The coupling 959 includes one or more buses, point-to-point interconnects, transceivers, buffers, crosspoint switches, and/or other conductors and/or logic that communicatively couples at least the processor component 950 to the internal storage 960. Coupling 959 may further couple the processor component 950 to one or more of the interface 990 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 450, 550 and 650) may include any of a wide variety of commercially available processors, employing any of a wide variety of technologies and implemented with one or more cores physically combined in any of a number of ways.

As previously discussed, the internal storage 960 (corresponding to the storages 460, 560 and 660) may be made up of one or more distinct storage devices based on any of a wide variety of technologies or combinations of technologies. More specifically, as depicted, the internal storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the internal storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data.

Thus, a routine including a sequence of instructions to be executed by the processor component 950 may initially be stored on the machine-readable storage medium 969, and the removable media storage 963 may be subsequently employed in copying that routine to the non-volatile storage 962 for long-term storage not requiring the continuing presence of the machine-readable storage medium 969 and/or the volatile storage 961 to enable more rapid access by the processor component 950 as that routine is executed.

As previously discussed, the interface 990 (possibly corresponding to the interfaces 490 or 590) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

The invention claimed is:

1. A method comprising:
   performing at a first node of a storage cluster system a command received from a client device via a network to alter client device data stored in a first storage device coupled to the first node;
   transmitting a replica of the command to a second node of the storage cluster system via the network to enable performance of the replica by the second node at least partially in parallel with the command;
   retrying transmission of the replica based on a failure indication by the second node; and
   selecting a status indication of performance of the command to transmit to the client device based on the failure indication and results of retrial of transmission of the replica, wherein an indication of successful performance of the command is selected as the status indication based upon a determination that a failure is a short-term failure and successful commencement of performance of the replica by the second node following retrial of transmission of the replica to the second node.

2. The method of claim 1, comprising:
   responsive to determining that the failure is the short-term failure that the second node is able to correct, retrying transmission of the replica to the second node.

3. The method of claim 1, comprising:
   selecting the indication of successful performance of the command as the status indication based on the determination that the failure is the short-term failure and based on successful acceptance to retry performance of the replica by the second node following retrial of transmission of the replica to the second node.

4. The method of claim 1, comprising:
   determining whether a predetermined status time period has elapsed since receipt of the command; and
   selecting an indication of retrial of the command as currently underway as the status indication based on the determination that the failure is the short-term failure and on an elapsing of the status time period as retrial of the transmission of the replica to the second node is underway.

5. The method of claim 1, comprising:
   responsive to determining that the failure is a long-term failure that the second node is unable to correct based on a limit of multiple retrials of the replica with the second node being met, retrying transmission of the replica to a third node comprising a partner node of the second node in a high availability group that comprises the second node and the third node.

6. The method of claim 1, comprising:
   responsive to determining that the failure is a long-term failure that the second node is unable to correct, retrying transmission of the replica to a third node comprising a partner node of the second node in a high availability group that comprises the second node and the third node.

7. The method of claim 6, comprising:
   selecting the indication of successful performance of the command as the status indication based on the determination that the failure is the long-term failure and based on at least one of successful acceptance, successful commencement of performance, and successful performance of the replica by the third node following the retrial of transmission of the replica to the third node.

8. The method of claim 6, comprising:
   determining whether a predetermined status time period has elapsed since receipt of the command; and
   selecting an indication of retrial of the command as currently underway as the status indication based on the determination that the failure is the long-term failure and on an elapsing of the status time period as retrial of the transmission of the replica to the third node is underway.

9. The method of claim 1, comprising:
   transmitting the status indication to the client device at least partially in parallel with performing of the command at the first node.

10. A non-transitory machine-readable storage medium having stored thereon instructions for performing a method comprising computing code which when executed by at least one machine, causes the machine to:
    perform at a first node of a storage cluster system a command received from a client device via a network to alter client device data stored in a first storage device coupled to the first node;
    transmit a replica of the command to a second node of the storage cluster system via the network to enable performance of the replica by the second node at least partially in parallel with the command;
    retry transmission of the replica based on a failure indication by the second node; and
    select a status indication of performance of the command to transmit to the client device based on the failure indication and results of retrial of transmission of the replica, wherein an indication of successful performance of the command is selected as the status indication based upon a determination that a failure is a short-term failure and successful acceptance to retry performance of the replica by the second node following retrial of transmission of the replica to the second node.

11. The non-transitory machine-readable storage medium of claim 10, wherein the computing code causes the machine to:
    responsive to determining that the failure is the short-term failure that the second node is able to correct, retry transmission of the replica to the second node.

12. The non-transitory machine-readable storage medium of claim 10, wherein the computing code causes the machine to:
    select the indication of successful performance of the command as the status indication based on the determination that the failure is the short-term failure and based on successful commencement of performance of the replica by the second node following retrial of transmission of the replica to the second node.

13. The non-transitory machine-readable storage medium of claim 10, wherein the computing code causes the machine to:
    determine whether a predetermined status time period has elapsed since receipt of the command; and
    select an indication of retrial of the command as currently underway as the status indication based on the determination that the failure is the short-term failure and on an elapsing of the status time period as retrial of the transmission of the replica to the second node is underway.

14. The non-transitory machine-readable storage medium of claim 10, wherein the computing code causes the machine to:
responsive to determining that the failure is a long-term failure that the second node is unable to correct based on a limit of multiple retrials of the replica with the second node being met, retry transmission of the replica to a third node comprising a partner node of the second node in a high availability group that comprises the second node and the third node.

15. The non-transitory machine-readable storage medium of claim 10, wherein the computing code causes the machine to:
responsive to determining that the failure is a long-term failure that the second node is unable to correct, retry transmission of the replica to a third node comprising a partner node of the second node in a high availability group that comprises the second node and the third node.

16. The non-transitory machine-readable storage medium of claim 15, wherein the computing code causes the machine to:
select the indication of successful performance of the command as the status indication based on the determination that the failure is the long-term failure and based on at least one of successful acceptance, successful commencement of performance, and successful performance of the replica by the third node following the retrial of transmission of the replica to the third node.

17. The non-transitory machine-readable storage medium of claim 15, wherein the computing code causes the machine to:
determine whether a predetermined status time period has elapsed since receipt of the command; and
select an indication of retrial of the command as currently underway as the status indication based on the determination that the failure is the long-term failure and on an elapsing of the status time period as retrial of the transmission of the replica to the third node is underway.

18. The non-transitory machine-readable storage medium of claim 10, wherein the computing code causes the machine to:
transmit the status indication to the client device at least partially in parallel with performing of the command at the first node.

19. The non-transitory machine-readable storage medium of claim 10, wherein the computing code causes the machine to:
condition transmission of the replica to the second node on at least one of successful acceptance and successful commencement of performance of the command.

20. A computing device comprising:
a memory containing machine-readable storage medium comprising computing code having stored thereon instructions for performing a method; and
a processor component coupled to the memory, the processor component configured to execute the computing code to cause the processor component to:
perform a command, received by a first node of a storage cluster system from a client device via a network, to alter client device data stored in a first storage device coupled to the first node;
transmit a replica of the command to a second node of the storage cluster system via the network to enable performance of the replica by the second node at least partially in parallel with the command;
retry transmission of the replica based on a failure indication by the second node; and
select a status indication of performance of the command to transmit to the client device based on the failure indication and results of retrial of transmission of the replica, wherein an indication of successful performance of the command is selected as the status indication based upon a determination that a failure is a short-term failure and successful acceptance to retry performance of the replica by the second node following retrial of transmission of the replica to the second node.

21. The computing device of claim 20, wherein the computing code causes the processor component to:
responsive to determining that the failure is the short-term failure that the second node is able to correct, retry transmission of the replica to the second node.

22. The computing device of claim 20, wherein the computing code causes the processor component to:
select the indication of successful performance of the command as the status indication based on the determination that the failure is the short-term failure and based on successful commencement of performance of the replica by the second node following retrial of transmission of the replica to the second node.

23. The computing device of claim 20, wherein the computing code causes the processor component to:
determine whether a predetermined status time period has elapsed since receipt of the command; and
select an indication of retrial of the command as currently underway as the status indication based on the determination that the failure is the short-term failure and on an elapsing of the status time period as retrial of the transmission of the replica to the second node is underway.

24. The computing device of claim 20, wherein the computing code causes the processor component to:
responsive to determining that the failure is a long term failure that the second node is not able to correct based on a limit of multiple retrials of the replica with the second node being met, retry the replica with a third node comprising a partner node of the second node in a high availability group that comprises the second node and the third node.

25. The computing device of claim 20, wherein the computing code causes the processor component to:
responsive to determining that the failure is a long-term failure that the second node is unable to correct, retry transmission of the replica to a third node comprising a partner node of the second node in a high availability group that comprises the second node and the third node.

26. The computing device of claim 25, wherein the computing code causes the processor component to:
select the indication of successful performance of the command as the status indication based on the determination that the failure is the long-term failure and based on at least one of successful acceptance, successful commencement of performance, and successful performance of the replica by the third node following the retrial of transmission of the replica to the third node.

27. The computing device of claim 25, wherein the computing code causes the processor component to:

determine whether a predetermined status time period has elapsed since receipt of the command; and select an indication of retrial of the command as currently underway as the status indication based on the determination that the failure is the long-term failure and on an elapsing of the status time period as retrial of the transmission of the replica to the third node is underway.

28. The computing device of claim 25, wherein the computing code causes the processor component to:

responsive to detecting an absence of an active communications session coupling the first node and the second node through the network, determine that the failure is the long term failure.

29. The computing device of claim 20, wherein the computing code causes the processor component to:

translate the command from a storage service request as received from the client device to a data access command; and translate the status indication from a command response associated with the data access command to a service request response associated with the storage service request as transmitted to the client device.

* * * * *